US012136329B2

(12) United States Patent
Hwang et al.

(10) Patent No.: US 12,136,329 B2
(45) Date of Patent: Nov. 5, 2024

(54) METHOD FOR RECEIVING SIGNAL, BY TERMINAL OF VULNERABLE ROAD USER, IN WIRELESS COMMUNICATION SYSTEM

(71) Applicant: LG ELECTRONICS INC., Seoul (KR)

(72) Inventors: Jaeho Hwang, Seoul (KR); Myoungseob Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 218 days.

(21) Appl. No.: 17/756,297

(22) PCT Filed: Nov. 22, 2019

(86) PCT No.: PCT/KR2019/016125
§ 371 (c)(1),
(2) Date: May 20, 2022

(87) PCT Pub. No.: WO2021/100933
PCT Pub. Date: May 27, 2021

(65) Prior Publication Data
US 2022/0415153 A1    Dec. 29, 2022

(51) Int. Cl.
*G08B 21/22*    (2006.01)
*G08B 21/02*    (2006.01)
(Continued)

(52) U.S. Cl.
CPC .......... *G08B 21/02* (2013.01); *G08B 25/007* (2013.01); *H04W 4/90* (2018.02)

(58) Field of Classification Search
USPC ...... 340/573.1, 568.1, 571, 686.6, 3.1, 5.91, 340/7.51, 7.52, 7.53, 10.33
See application file for complete search history.

(56) References Cited

U.S. PATENT DOCUMENTS 4,145,569 A *   3/1979  Ehrat ................. G09C 1/00
                                                     380/47
10,986,689 B2 * 4/2021  Rayavarapu .......... H04W 76/27
(Continued)

FOREIGN PATENT DOCUMENTS

KR    10-2010-0132581    12/2010
KR    10-1343816         12/2013
WO    2015-072621        5/2015

OTHER PUBLICATIONS

PCT International Application No. PCT/KR2019/016125, International Search Report dated Aug. 20, 2020, 4 pages.
(Continued)

*Primary Examiner* — Daniel Previl
(74) *Attorney, Agent, or Firm* — LEE, HONG, DEGERMAN, KANG & WAIMEY

(57) ABSTRACT

Disclosed herein is a method of receiving, by a terminal of a vulnerable road user (VRU), a signal in a wireless communication system. The method include receiving a message related to a safety service of the VRU from a network, and outputting a warning message based on comparing a field defining a geographic area, in which the safety service is provided, in the message and a position of the terminal, wherein the warning message is output based on determining that the terminal exists within the geographic area.

20 Claims, 53 Drawing Sheets

(51) Int. Cl.
*G08B 25/00* (2006.01)
*H04W 4/90* (2018.01)

(56) References Cited

U.S. PATENT DOCUMENTS

| | | | | |
|---|---|---|---|---|
| 2009/0225940 | A1* | 9/2009 | Aoyama | A61B 6/503 |
| | | | | 378/62 |
| 2011/0169647 | A1* | 7/2011 | Morley | G01C 21/3697 |
| | | | | 701/408 |
| 2012/0322445 | A1* | 12/2012 | Kwon | H04W 52/04 |
| | | | | 455/436 |
| 2018/0109937 | A1* | 4/2018 | Lee | H04W 4/046 |
| 2018/0132208 | A1* | 5/2018 | Pan | H04W 72/20 |
| 2020/0267670 | A1* | 8/2020 | Åström | H04W 48/10 |
| 2022/0417923 | A1* | 12/2022 | Uchiyama | H04W 4/40 |

OTHER PUBLICATIONS

Mediatek Inc., "Support of VRUs," R2-1906026, 3GPP TSG-RAN WG2 Meeting #106, May 2019, 5 pages.
ETSI TR 103 300-1 V2.1.1, "Intelligent Transport System (ITS); Vulnerable Road Users (VRU) awareness; Part 1: Use Cases definition; Release 2," Sep. 2019, 76 pages.
Korean Intellectual Property Office Application No. 10-2022-7017116, Office Action dated Dec. 6, 2023, 11 pages.

* cited by examiner

FIG. 1
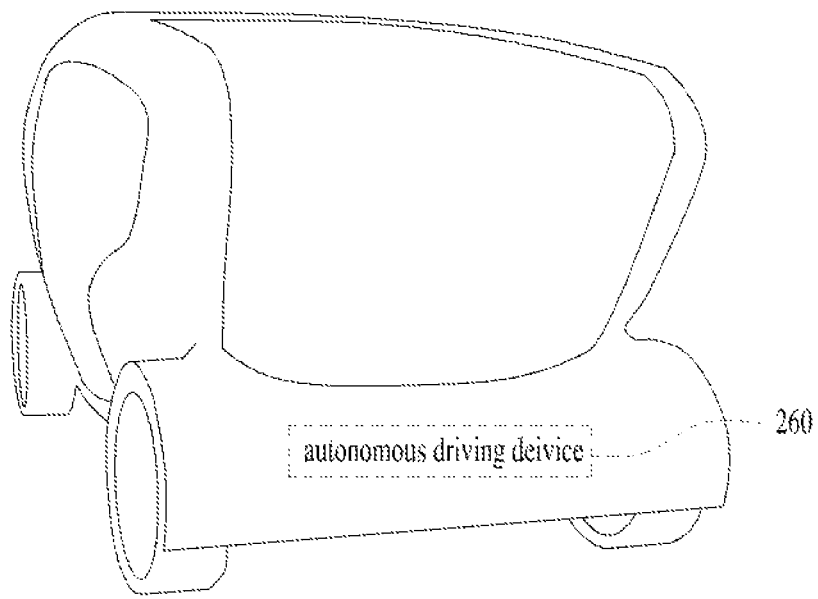
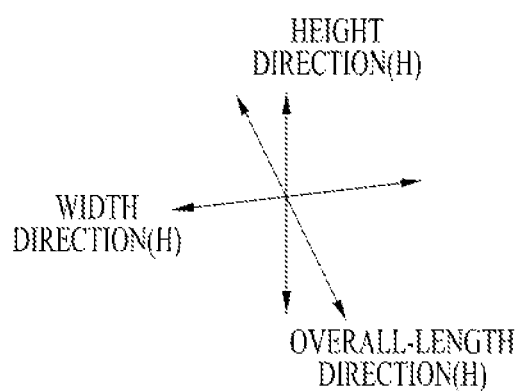

FIG. 9

| Application classification | Application | Use case |
|---|---|---|
| Road safety | Driving assistance-Cooperative Awareness | - Emergency vehicle warning<br>- Slow vehicle indication<br>- Intersection collision warning<br>- Motorcycle approaching indication<br>- assistance-Road<br>Warning (RHW)<br>- Emergency electronic brake lights<br>- Wrong way driving warning<br>- Stationary vehicle accident<br>- Stationary vehicle-vehicle problem<br>- Traffic condition warning<br>- Signal violation warning<br>- Roadwork warning<br>- Collision risk warning |
| Traffic efficiency | Speed Management | - Regulatory/ contextual speed limits notification<br>- Traffic light optimal speed advisory |
| | Co-operative Navigation | - Traffic information and recommended itinerary<br>- Enhanced route guidance and navigation<br>- Limited access warning and detour notification<br>- In-vehicle signage |
| Local services | Location Based Services | - Point of Interest notification<br>- 7.Automatic access control and parking management<br>- ITS local electronic commerce<br>- Media downloading |

ITS Application Layer

Application classification:
- Road safety
- Traffic efficiency
- Local services
- Other applications Layer Management

MA, SA, FA

FIG. 27
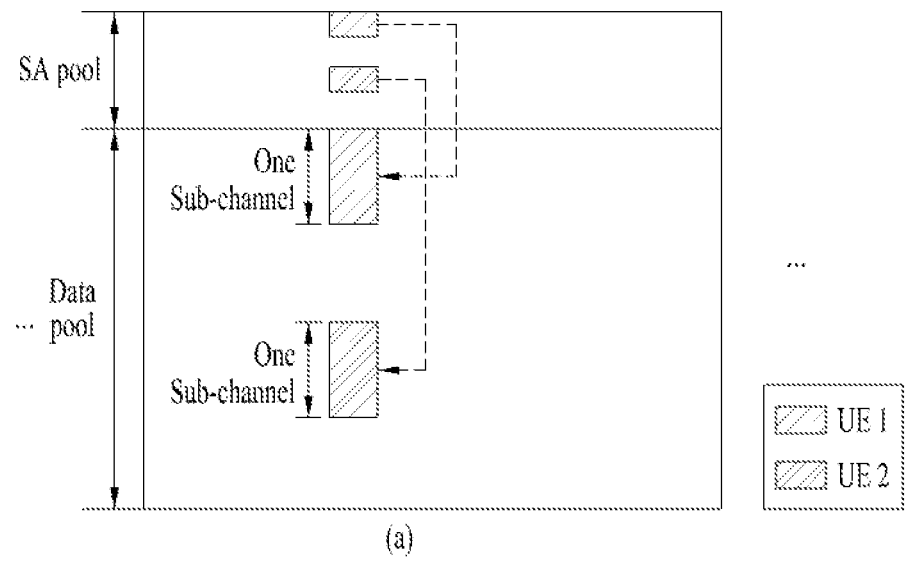
(a)
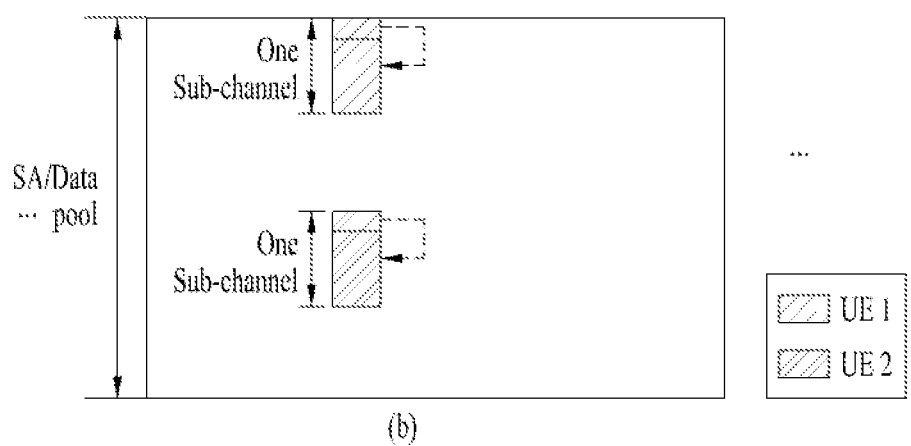
(b)

FIG. 36
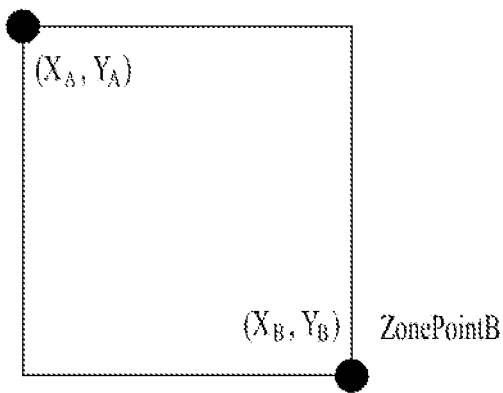
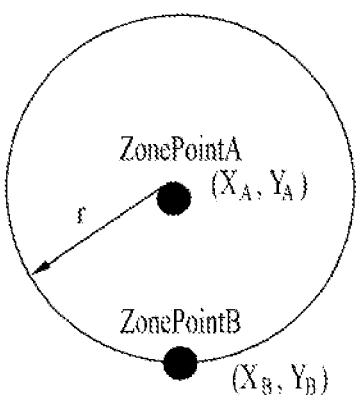
ZoneType = 1 (rectangular Type)    ZoneType = 2 (Circle Type)

FIG. 38

| ASN.1 Representation | |
|---|---|
| DF_VRUPublicsafetyMessage | ::= SEQUENCE { |
| BasicContiner | INTEGER |
| CommonSafetyContiner | INTEGER |
| ZoneBasedSafetyContiner | SEQUENCE(SIZE(1..10)) OF DF_ZoneBasedSafetyContainer |
| } | |

FIG. 39

| ASN.1 Representation | |
|---|---|
| DF_BasicContainer | ::= SEQUENCE { |
| StationID | INTEGER |
| MessageID | INTEGER |
| MessageGenTime | INTEGER |
| } | |

Fig A) ASN.1 Structure of basicContainer

| ASN.1 Representation | |
|---|---|
| DF_CommonSafetyContainer | ::=SEQUENCE{ |
| WarningID | INTEGER |
| WarningCode | INTEGER |
| WarningSubCode | INTEGER |
| } | |

Fig B) ASN.1 Structure of CommonSafetyContainer

| ASN.1 Representation | |
|---|---|
| DF_ZoneBasedSafetyContainer | ::=SEQUENCE{ |
| ZoneID | INTEGER |
| ZoneType | INTEGER |
| ZonePointA | DF_Position |
| ZonePointB | DF_Position |
| WarningCode | INTEGER |
| WarningSubCode | INTEGER |
| ControlType | INTEGER |
| ControlData | INTEGER |
| } | |

Fig C) ASN.1 Structure of ZoneBasedSafetyContainer

FIG. 41

| ControlType | ControlData |
|---|---|
| 201(AlwaysWakeUp) | Micro second value ( e.g 10,000 value means 10 sec ) |
| 202(AlwaysWakeUp release) | N/A |
| 203~299 | reserved |

Fig) Table of Control Type & Data for Wake-up

FIG. 42

| ControlType | ControlData |
|---|---|
| 301(MSG genTime) | Micro second value ( e.g 10,000 value means 0.100 sec ) |
| 302~399 | reserved |

Fig) Table of Control Type & Data for massage genration time (GenTime)

FIG. 45

| ControlType | ControlData |
|---|---|
| 401(OptionFieldOn) | Text (e.g. PathPrediction) |
| 402(OptionFieldOff) | Text (e.g. PathHistory) |
| 403(ControlRelease) | Time out value msec (unit 1 = 1 msec) |
| 404~499 | reserved |

Fig) Table of Control Type & Data for Optional field control

METHOD FOR RECEIVING SIGNAL, BY TERMINAL OF VULNERABLE ROAD USER, IN WIRELESS COMMUNICATION SYSTEM

CROSS-REFERENCE TO RELATED APPLICATIONS

This application is the National Stage filing under 35 U.S.C. 371 of International Application No. PCT/KR2019/016125, filed on Nov. 22, 2019, the contents of which is hereby incorporated by reference herein in its entirety.

BACKGROUND OF THE INVENTION

Field of the Invention

The present disclosure relates to a method of receiving a signal by a terminal in a wireless communication system and, more particularly, to a method of receiving, by a terminal of a vulnerable road user (VRU), a message related to a security service of the VRU.

Description of the Related Art

A vulnerable road user (VRU) terminal according to a conventional system is operated to periodically transfer state information of VRU around through a predetermined message (e.g., personal safety message (PSM)). When notifying a state of the VRU through transport of the message, the VRU terminal encourages vehicles running nearby to efficiently recognize the VRU and to operate in safety.

However, the VRU terminal according to the conventional system does nothing but passively or only periodically send a message in a single direction. Furthermore, since the VRU terminal repeats sleep & wakeup at a specific time and interval to reduce power consumption, the state of the VRU in a specific environment cannot be efficiently transferred around so that the safety of the VRU cannot be efficiently ensured.

SUMMARY

In order to solve the above-described problem of the conventional system, in a method of receiving a signal by a terminal of a vulnerable road user (VRU) in a wireless communication system according to the present disclosure, it is disclosed that, when a message related to a safety service of the VRU within a predetermined geographic area is received from a network, a warning message is output or a configuration of the terminal is modified so that the safety service of the VRU is provided more efficiently.

The technical objects to be achieved in an example or embodiment are not limited to the above-mentioned technical objects, and other technical objects not mentioned herein will be clearly understood by those skilled in the art, to which an example or embodiment belongs, through the following descriptions.

In order to achieve the above technical object, a method of receiving a signal by a terminal of a vulnerable road user (VRU) in a wireless communication system may include: receiving, from a network, a message related to a safety service of the VRU; and outputting a warning message based on comparing a field defining a geographic area, in which the safety service is provided, in the message with a position of the terminal. In addition, the warning message may be output based on determining that the terminal exists within the geographical area.

Meanwhile, the field defining the geographic area may include a value related to a type or size of the geographic area.

Meanwhile, the message may include a field related to a wakeup setting of the terminal. In addition, based on the field related to the wakeup setting, the terminal may maintain a wakeup state for a predetermined time in the geographic area.

Meanwhile, the message may include a field that enables the terminal to modify a creation interval of a message for the safety of the VRU. In addition, based on the field for modifying the creation interval of the message, the terminal may create a message for the safety of the VRU in the geographic area at a modified creation interval.

The message may include a field that requests a moving path of the terminal. In addition, based on the field that requests the moving path, the terminal may transmit, to the network, a message including a position of the terminal within the geographic area, a moving path for a predetermined time or an expected moving path in the predetermined time.

A method of transmitting, by a network, a signal to a terminal in a wireless communication system according to the present disclosure may include: receiving traffic information in a preset geographic area from a server; and based on the traffic information, transmitting a message related to a safety service of a vulnerable road user (VRU) within the geographic area.

Meanwhile, the message may include a field defining the geographic area, and the field defining the geographic area may include a value related to a type or size of the geographic area.

Meanwhile, the message may include a field related to a wakeup setting of the terminal, and the field related to the wakeup setting may indicate that the terminal will maintain a wakeup state for a predetermined time in the geographic area.

Meanwhile, the message may include a field that enables the terminal to modify a creation interval of a message for safety of the VRU, and the field for modifying the creation interval of the message may indicate that the terminal will create the message for safety of the VRU in the geographic area at a modified creation interval.

Meanwhile, the message may include a field that requests a moving path of the terminal, and the field, which requests the moving path, may indicate that the terminal will transmit a message including a position of the terminal within the geographic area, a moving path for a predetermined time or an expected moving path in the predetermined time.

According to the present disclosure, it is possible to provide real-time safety information to a vulnerable road user (VRU) by transmitting safety-related warning to a VRU terminal with stand-alone operation. In addition, safety of neighboring vehicles around a VRU as well as that of the VRU may be efficiently ensured by controlling a transmission mode of a VRU terminal that uses a manual transmission method. In addition, a further optimized safety service may be provided by controlling an operation of an application layer and a facility layer, which are independently operated by a VRU terminal, at a VRU public safety center. The control of the VRU public safety center may include AlwaysWakeUp control, genTime control, and Optional Field On/Off control.

The effects to be obtained in an example or embodiment are not limited to the above-mentioned effects, and other effects not mentioned herein will be clearly understood by those skilled in the art, to which an example or embodiment belongs, through the following descriptions.

BRIEF DESCRIPTION OF THE DRAWINGS

The accompanying drawings, which are included to provide a further understanding of embodiment(s), illustrate various embodiments and together with the description of the specification serve to explain the principle of the specification.

FIG. 1 is a diagram illustrating a vehicle according to embodiment(s).

FIG. 9 discloses an exemplary structure of the applications layer.

FIG. 27 discloses an example in which a PSCCH is transmitted in sidelink transmission mode 3 or 4 to which an example or implementation is applied.

FIG. 36 illustrates an example of a method of expressing a zone.

FIGS. 37 to 39 disclose a VSM configuration for a system operation.

FIG. 41 is a view for explaining a configuration of ControlType and ControlData.

FIG. 42 is a view for explaining a change of MessageGenTime of a VRU terminal through ControlType and ControlData at a VRU public safety center.

FIGS. 44 to 45 disclose a transmission method with an optional field being on/off according to zones.

DETAILED DESCRIPTION

In this document, the term "/" and "," should be interpreted to indicate "and/or". For instance, the expression "A/B" may mean "A and/or B". Further, "A, B" may mean "A and/or B". Further, "A/B/C" may mean "at least one of A, B, and/or C". Also, "A, B, C" may mean "at least one of A, B, and/or C".

Further, in the document, the term "or" should be interpreted to indicate "and/or". For instance, the expression "A or B" may comprise 1) only A, 2) only B, and/or 3) both A and B. In other words, the term "or" in this document should be interpreted to indicate "additionally or alternatively".

1. Driving

(1) Exterior of Vehicle

FIG. 1 is a diagram illustrating a vehicle according to embodiment(s). Referring to FIG. 1, a vehicle 10 according to embodiment(s) is defined as a transportation means traveling on roads or railroads. The vehicle 10 includes a car, a train, and a motorcycle. The vehicle 10 may include an internal combustion engine vehicle having an engine as a power source, a hybrid vehicle having an engine and a motor as a power source, and an electric vehicle having an electric motor as a power source. The vehicle 10 may be a privately owned vehicle. The vehicle 10 may be a shared vehicle. The vehicle 10 may be an autonomous driving vehicle.

(2) Components of Vehicle

Figure 2:
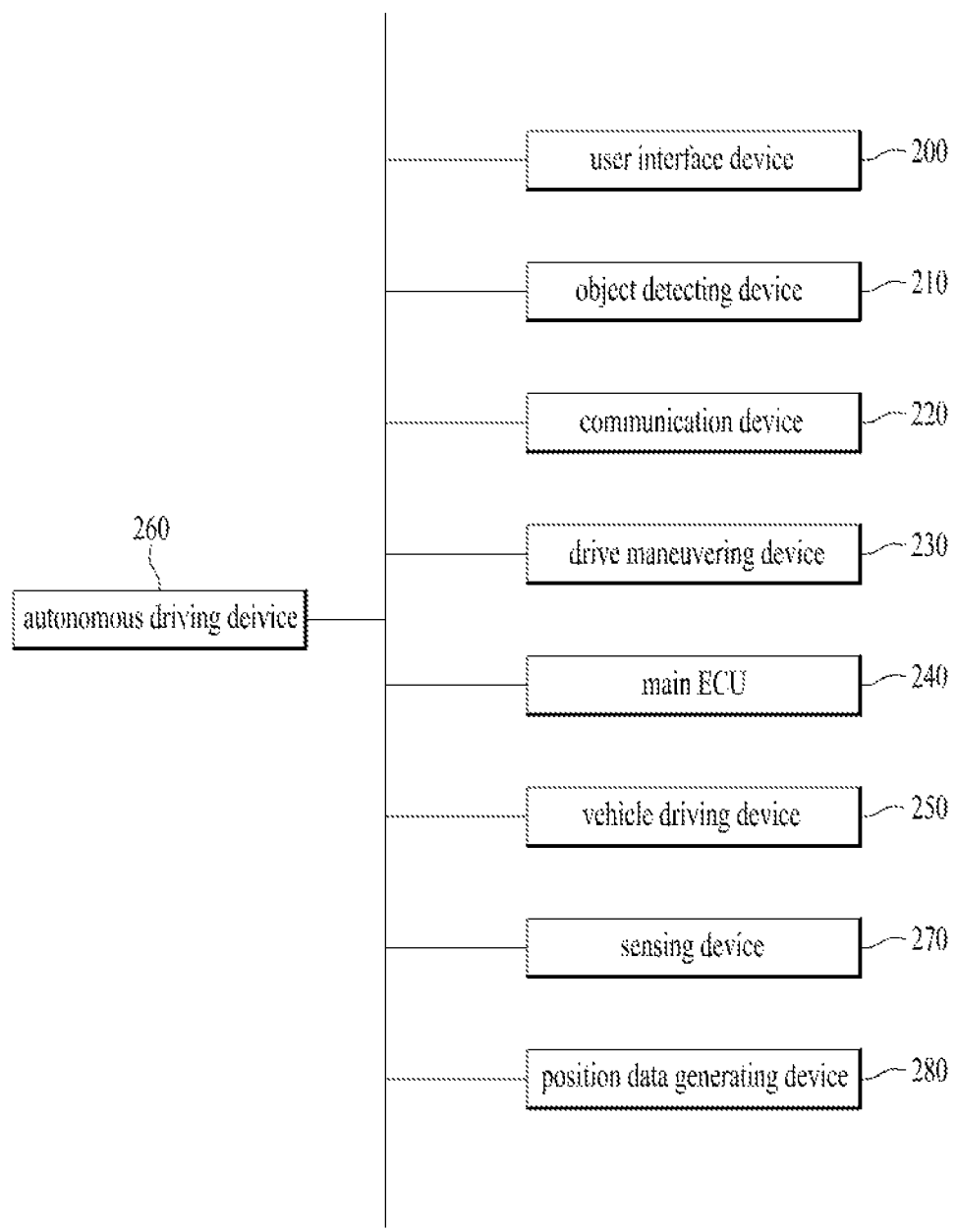
FIG. 2 is a control block diagram of the vehicle according to embodiment(s).

FIG. 2 is a control block diagram of the vehicle according to embodiment(s). Referring to FIG. 2, the vehicle 10 may include a user interface device 200, an object detection device 210, a communication device 220, a driving operation device 230, a main electronic control unit (ECU) 240, a driving control device 250, an autonomous driving device 260, a sensing unit 270, and a position data generation device 280. The object detection device 210, the communication device 220, the driving operation device 230, the main ECU 240, the driving control device 250, the autonomous driving device 260, the sensing unit 270 and the position data generation device 280 may be implemented by electronic devices which generate electric signals and exchange the electric signals with one another.

1) User Interface Device

The user interface device 200 is a device for communication between the vehicle 10 and a user. The user interface device 200 may receive user input and provide information generated in the vehicle 10 to the user. The vehicle 10 may implement a user interface (UI) or user experience (UX) through the user interface device 200. The user interface device 200 may include an input device, an output device, and a user monitoring device.

2) Object Detection Device

The object detection device 210 may generate information about objects outside the vehicle 10. Information about an object may include at least one of information about presence or absence of the object, information about the position of the object, information about a distance between the vehicle 10 and the object, or information about a relative speed of the vehicle 10 with respect to the object. The object detection device 210 may detect objects outside the vehicle 10. The object detection device 210 may include at least one sensor which may detect objects outside the vehicle 10. The object detection device 210 may include at least one of a camera, a radar, a lidar, an ultrasonic sensor, or an infrared sensor. The object detection device 210 may provide data about an object generated based on a sensing signal generated from a sensor to at least one electronic device included in the vehicle.

2.1) Camera

The camera may generate information about objects outside the vehicle 10 using images. The camera may include at least one lens, at least one image sensor, and at least one processor which is electrically connected to the image sensor, processes received signals, and generates data about objects based on the processed signals.

The camera may be at least one of a mono camera, a stereoscopic camera, or an around view monitoring (AVM) camera. The camera may acquire information about the position of an object, information about a distance to the object, or information about a relative speed with respect to the object using various image processing algorithms. For example, the camera may acquire information about a distance to an object and information about a relative speed with respect to the object from an acquired image based on change in the size of the object over time. For example, the camera may acquire information about a distance to an object and information about a relative speed with respect to the object through a pin-hole model, road profiling, or the like. For example, the camera may acquire information about a distance to an object and information about a relative speed with respect to the object from a stereoscopic image acquired from a stereoscopic camera based on disparity information.

The camera may be mounted in a portion of the vehicle at which field of view (FOV) may be secured in order to capture the outside of the vehicle. The camera may be disposed in proximity to a front windshield inside the vehicle in order to acquire front view images of the vehicle. The camera may be disposed near a front bumper or a radiator grill. The camera may be disposed in proximity to a rear glass inside the vehicle in order to acquire rear view images of the vehicle. The camera may be disposed near a rear bumper, a trunk, or a tail gate. The camera may be disposed in proximity to at least one of side windows inside the vehicle in order to acquire side view images of the vehicle. Alternatively, the camera may be disposed near a side mirror, a fender, or a door.

2.2) Radar

The radar may generate information about an object outside the vehicle 10 using electromagnetic waves. The radar may include an electromagnetic wave transmitter, an electromagnetic wave receiver, and at least one processor which is electrically connected to the electromagnetic wave transmitter and the electromagnetic wave receiver, processes received signals, and generates data about an object based on the processed signals. The radar may be implemented as a pulse radar or a continuous wave radar in terms of electromagnetic wave emission. The continuous wave radar may be implemented as a frequency modulated continuous wave (FMCW) radar or a frequency shift keying (FSK) radar according to signal waveform. The radar may detect an object through electromagnetic waves based on time of flight (TOF) or phase shift and detect the position of the detected object, a distance to the detected object, and a relative speed with respect to the detected object. The radar may be disposed at an appropriate position outside the vehicle in order to detect objects positioned in front of, behind, or on the side of the vehicle.

2.3) Lidar

The lidar may generate information about an object outside the vehicle 10 using a laser beam. The lidar may include a light transmitter, a light receiver, and at least one processor which is electrically connected to the light transmitter and the light receiver, processes received signals, and generates data about an object based on the processed signals. The lidar may be implemented as a TOF type or a phase shift type. The lidar may be implemented as a driven type or a non-driven type. A driven type lidar may be rotated by a motor and detect an object around the vehicle 10. A non-driven type lidar may detect an object positioned within a predetermined range from the vehicle according to light steering. The vehicle 10 may include a plurality of non-driven type lidars. The lidar may detect an object through a laser beam based on the TOF type or the phase shift type and detect the position of the detected object, a distance to the detected object, and a relative speed with respect to the detected object. The lidar may be disposed at an appropriate position outside the vehicle in order to detect objects positioned in front of, behind, or on the side of the vehicle.

3) Communication Device

The communication device 220 may exchange signals with devices disposed outside the vehicle 10. The communication device 220 may exchange signals with at least one of infrastructure (e.g., a server and a broadcast station), another vehicle, or a terminal. The communication device 220 may include at least one of a transmission antenna, a reception antenna, or a radio frequency (RF) circuit or an RF element which may implement various communication protocols, in order to perform communication.

For example, the communication device may exchange signals with external devices based on cellular V2X (C-V2X). For example, C-V2X may include side-link communication based on LTE and/or side-link communication based on NR. Details related to C-V2X will be described later.

For example, the communication device may exchange signals with external devices based on dedicated short range communications (DSRC) or wireless access in vehicular environment (WAVE) based on IEEE 802.11p physical (PHY)/media access control (MAC layer technology and IEEE 1609 network/transport layer technology. DSRC (or WAVE) is communication specification for providing an intelligent transport system (ITS) service through short-range dedicated communication between vehicle-mounted devices or between a roadside device and a vehicle-mounted device. DSRC may be a communication scheme that may use a frequency of 5.9 GHz and have a data transmission rate in the range of 3 Mbps to 27 Mbps. IEEE 802.11p may be combined with IEEE 1609 to support DSRC (or WAVE).

The communication device of embodiment(s) may exchange signals with external devices using only one of C-V2X and DSRC. Alternatively, the communication device of embodiment(s) may exchange signals with external devices using a hybrid of C-V2X and DSRC.

4) Driving Operation Device

The driving operation device 230 is a device for receiving user input for driving. In a manual mode, the vehicle 10 may be driven based on a signal provided by the driving operation device 230. The driving operation device 230 may include a steering input device (e.g., a steering wheel), an acceleration input device (e.g., an accelerator pedal), and a brake input device (e.g., a brake pedal).

5) Main ECU

The main ECU 240 may control the overall operation of at least one electronic device included in the vehicle 10.

6) Driving Control Device

The driving control device 250 is a device for electrically controlling various vehicle driving devices included in the vehicle 10. The driving control device 250 may include a powertrain driving control device, a chassis driving control device, a door/window driving control device, a safety device driving control device, a lamp driving control device, and an air-conditioner driving control device. The powertrain driving control device may include a power source driving control device and a transmission driving control device. The chassis driving control device may include a steering driving control device, a brake driving control device, and a suspension driving control device. Meanwhile, the safety device driving control device may include a seat belt driving control device for seat belt control.

The driving control device 250 includes at least one electronic control device (e.g., an ECU).

The driving control device 250 may control vehicle driving devices based on signals received by the autonomous device 260. For example, the driving control device 250 may control a powertrain, a steering device, and a brake device based on signals received by the autonomous device 260.

7) Autonomous Driving Device

The autonomous driving device 260 may generate a route for self-driving based on acquired data. The autonomous driving device 260 may generate a driving plan for traveling along the generated route. The autonomous driving device 260 may generate a signal for controlling movement of the vehicle according to the driving plan. The autonomous driving device 260 may provide the generated signal to the driving control device 250.

The autonomous driving device 260 may implement at least one advanced driver assistance system (ADAS) function. The ADAS may implement at least one of adaptive cruise control (ACC), autonomous emergency braking (AEB), forward collision warning (FCW), lane keeping assist (LKA), lane change assist (LCA), target following assist (TFA), blind spot detection (BSD), adaptive high beam assist (HBA), automated parking system (APS), a pedestrian collision warning system, traffic sign recognition (TSR), traffic sign assist (TSA), night vision (NV), driver status monitoring (DSM), or traffic jam assist (TJA).

The autonomous driving device 260 may perform switching from a self-driving mode to a manual driving mode or switching from the manual driving mode to the self-driving mode. For example, the autonomous driving device 260 may switch the mode of the vehicle 10 from the self-driving mode to the manual driving mode or from the manual driving mode to the self-driving mode, based on a signal received from the user interface device 200.

8) Sensing Unit

The sensing unit 270 may detect a state of the vehicle. The sensing unit 270 may include at least one of an internal measurement unit (IMU) sensor, a collision sensor, a wheel sensor, a speed sensor, an inclination sensor, a weight sensor, a heading sensor, a position module, a vehicle forward/backward movement sensor, a battery sensor, a fuel sensor, a tire sensor, a steering sensor, a temperature sensor, a humidity sensor, an ultrasonic sensor, an illumination sensor, or a pedal position sensor. Further, the IMU sensor may include one or more of an acceleration sensor, a gyro sensor, and a magnetic sensor.

The sensing unit 270 may generate vehicle state data based on a signal generated from at least one sensor. The vehicle state data may be information generated based on data detected by various sensors included in the vehicle. The sensing unit 270 may generate vehicle attitude data, vehicle motion data, vehicle yaw data, vehicle roll data, vehicle pitch data, vehicle collision data, vehicle orientation data, vehicle angle data, vehicle speed data, vehicle acceleration data, vehicle tilt data, vehicle forward/backward movement data, vehicle weight data, battery data, fuel data, tire pressure data, vehicle internal temperature data, vehicle internal humidity data, steering wheel rotation angle data, vehicle external illumination data, data of a pressure applied to an acceleration pedal, data of a pressure applied to a brake pedal, etc.

9) Position Data Generation Device

The position data generation device 280 may generate position data of the vehicle 10. The position data generation device 280 may include at least one of a global positioning system (GPS) or a differential global positioning system (DGPS). The position data generation device 280 may generate position data of the vehicle 10 based on a signal generated from at least one of the GPS or the DGPS.

According to an embodiment, the position data generation device 280 may correct position data based on at least one of the IMU sensor of the sensing unit 270 or the camera of the object detection device 210. The position data generation device 280 may also be called a global navigation satellite system (GNSS).

The vehicle 10 may include an internal communication system 50. A plurality of electronic devices included in the vehicle 10 may exchange signals through the internal communication system 50. The signals may include data. The internal communication system 50 may use at least one communication protocol (e.g., CAN, LIN, FlexRay, MOST or Ethernet).

(3) Components of Autonomous Driving Device

Figure 3:
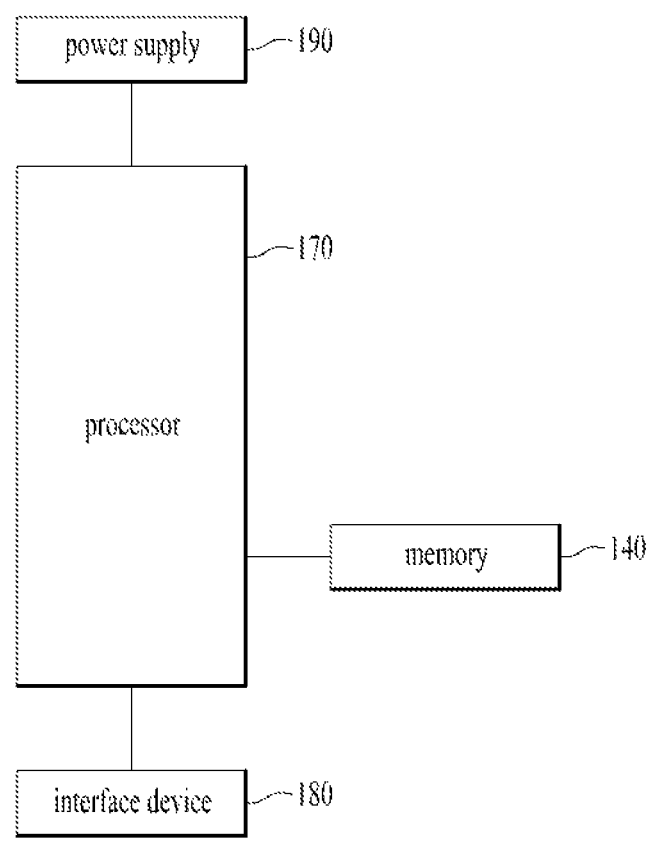
FIG. 3 is a control block diagram of an autonomous device according to embodiment(s).

FIG. 3 is a control block diagram of the autonomous driving device according to embodiment(s). Referring to FIG. 3, the autonomous driving device 260 may include a memory 140, a processor 170, an interface 180, and a power supply 190.

The memory 140 is electrically connected to the processor 170. The memory 140 may store basic data with respect to units, control data for operation control of units, and input/output data. The memory 140 may store data processed in the processor 170. Hardware-wise, the memory 140 may be configured as at least one of a ROM, a RAM, an EPROM, a flash drive, or a hard drive. The memory 140 may store various types of data for overall operation of the autonomous driving device 260, such as a program for processing or control of the processor 170. The memory 140 may be integrated with the processor 170. According to an embodiment, the memory 140 may be categorized as a subcomponent of the processor 170.

The interface 180 may exchange signals with at least one electronic device included in the vehicle 10 by wire or wirelessly. The interface 180 may exchange signals with at least one of the object detection device 210, the communication device 220, the driving operation device 230, the main ECU 240, the driving control device 250, the sensing unit 270, or the position data generation device 280 in a wired or wireless manner. The interface 180 may be configured using at least one of a communication module, a terminal, a pin, a cable, a port, a circuit, an element, or a device.

The power supply 190 may provide power to the autonomous driving device 260. The power supply 190 may be provided with power from a power source (e.g., a battery) included in the vehicle 10 and supply the power to each unit of the autonomous driving device 260. The power supply 190 may operate according to a control signal supplied from the main ECU 240. The power supply 190 may include a switched-mode power supply (SMPS).

The processor 170 may be electrically connected to the memory 140, the interface 180, and the power supply 190 and exchange signals with these components. The processor 170 may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or electronic units for executing other functions.

The processor 170 may be operated by power supplied from the power supply 190. The processor 170 may receive data, process the data, generate a signal, and provide the signal while power is being supplied thereto.

The processor 170 may receive information from other electronic devices included in the vehicle 10 through the interface 180. The processor 170 may provide control signals to other electronic devices in the vehicle 10 through the interface 180.

The autonomous driving device 260 may include at least one printed circuit board (PCB). The memory 140, the interface 180, the power supply 190, and the processor 170 may be electrically connected to the PCB.

(4) Operation of Autonomous Driving Device

Figure 4:
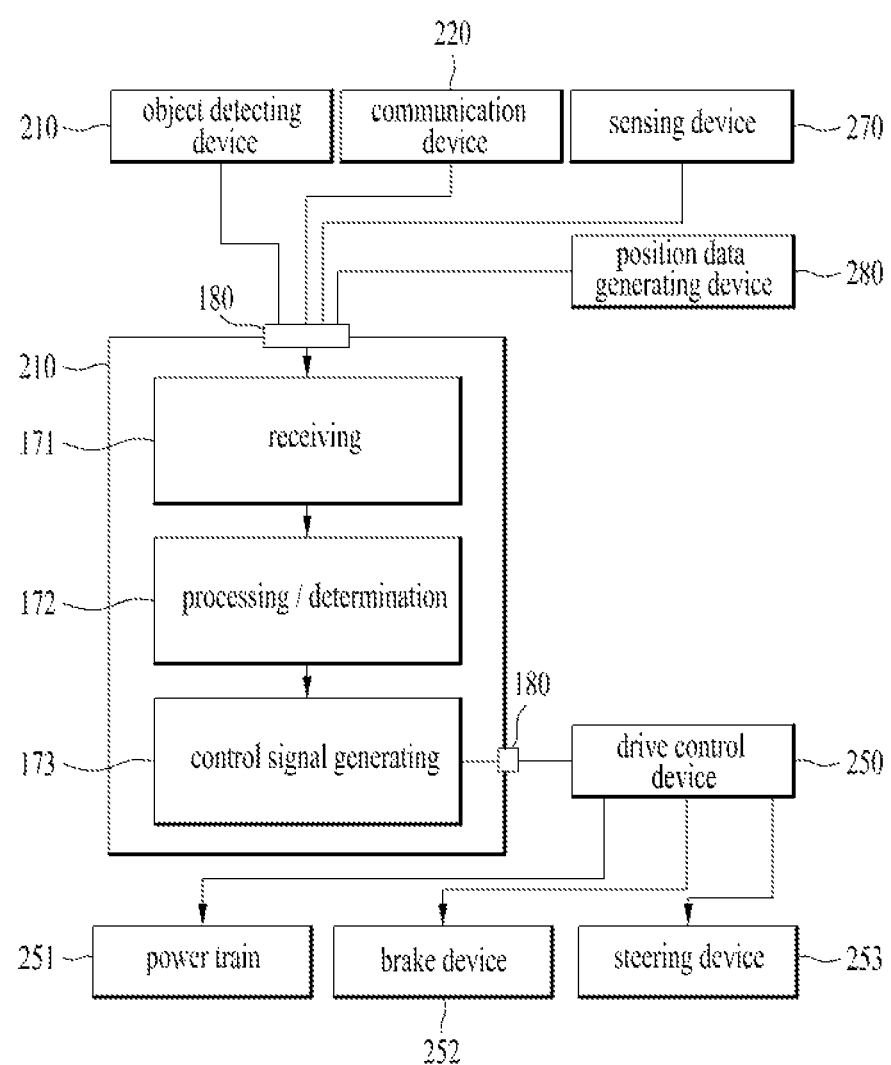
FIG. 4 is a block diagram of the autonomous device according to embodiment(s).

FIG. 4 is a block diagram of the autonomous device according to embodiment(s).

1) Reception Operation

Referring to FIG. 4, the processor 170 may perform a reception operation. The processor 170 may receive data from at least one of the object detection device 210, the communication device 220, the sensing unit 270, or the position data generation device 280 through the interface 180. The processor 170 may receive object data from the object detection device 210. The processor 170 may receive HD map data from the communication device 220. The processor 170 may receive vehicle state data from the sensing unit 270. The processor 170 may receive position data from the position data generation device 280.

2) Processing/Determination Operation

The processor 170 may perform a processing/determination operation. The processor 170 may perform the processing/determination operation based on traveling situation information. The processor 170 may perform the processing/determination operation based on at least one of the object data, the HD map data, the vehicle state data, or the position data.

2.1) Driving Plan Data Generation Operation

The processor 170 may generate driving plan data. For example, the processor 170 may generate electronic horizon data. The electronic horizon data may be understood as driving plan data in a range from a position at which the vehicle 10 is located to a horizon. The horizon may be understood as a point a predetermined distance before the position at which the vehicle 10 is located based on a predetermined traveling route. The horizon may refer to a point at which the vehicle may arrive after a predetermined time from the position at which the vehicle 10 is located along a predetermined traveling route.

The electronic horizon data may include horizon map data and horizon path data.

2.1.1) Horizon Map Data

The horizon map data may include at least one of topology data, road data, HD map data, or dynamic data. According to an embodiment, the horizon map data may include a plurality of layers. For example, the horizon map data may include a first layer that matches the topology data, a second layer that matches the road data, a third layer that matches the HD map data, and a fourth layer that matches the dynamic data. The horizon map data may further include static object data.

The topology data may be explained as a map created by connecting road centers. The topology data is suitable for approximate display of a location of a vehicle and may have a data form used for navigation for drivers. The topology data may be understood as data about road information other than information on driveways. The topology data may be generated based on data received from an external server through the communication device 220. The topology data may be based on data stored in at least one memory included in the vehicle 10.

The road data may include at least one of road slope data, road curvature data, or road speed limit data. The road data may further include no-passing zone data. The road data may be based on data received from an external server through the communication device 220. The road data may be based on data generated in the object detection device 210.

The HD map data may include detailed topology information in units of lanes of roads, connection information of each lane, and feature information for vehicle localization (e.g., traffic signs, lane marking/attribute, road furniture, etc.). The HD map data may be based on data received from an external server through the communication device 220.

The dynamic data may include various types of dynamic information which may be generated on roads. For example, the dynamic data may include construction information, variable speed road information, road condition information, traffic information, moving object information, etc. The dynamic data may be based on data received from an external server through the communication device 220. The dynamic data may be based on data generated in the object detection device 210.

The processor 170 may provide map data in a range from a position at which the vehicle 10 is located to the horizon.

2.1.2) Horizon Path Data

The horizon path data may be explained as a trajectory through which the vehicle 10 may travel in a range from a position at which the vehicle 10 is located to the horizon. The horizon path data may include data indicating a relative probability of selecting a road at a decision point (e.g., a fork, a junction, a crossroad, or the like). The relative probability may be calculated based on a time taken to arrive at a final destination. For example, if a time taken to arrive at a final destination is shorter when a first road is selected at a decision point than that when a second road is selected, a probability of selecting the first road may be calculated to be higher than a probability of selecting the second road.

The horizon path data may include a main path and a sub-path. The main path may be understood as a trajectory obtained by connecting roads having a high relative probability of being selected. The sub-path may be branched from at least one decision point on the main path. The sub-path may be understood as a trajectory obtained by connecting at least one road having a low relative probability of being selected at least one decision point on the main path.

3) Control Signal Generation Operation

The processor 170 may perform a control signal generation operation. The processor 170 may generate a control signal based on the electronic horizon data. For example, the processor 170 may generate at least one of a powertrain control signal, a brake device control signal, or a steering device control signal based on the electronic horizon data.

The processor 170 may transmit the generated control signal to the driving control device 250 through the interface 180. The driving control device 250 may transmit the control signal to at least one of a powertrain 251, a brake device 252, or a steering device 253.

2. Cabin

Figure 5:
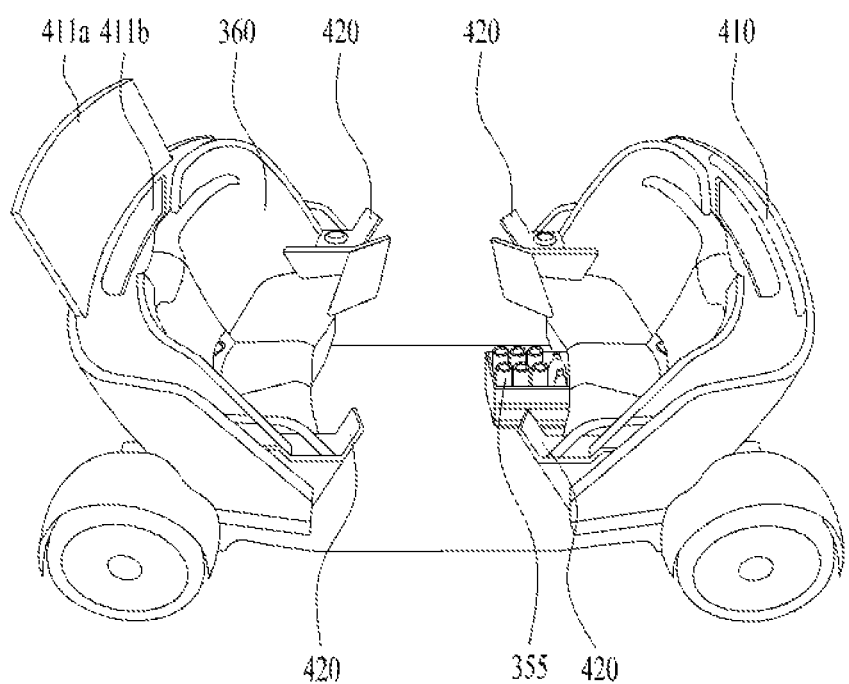
FIG. 5 is a diagram showing the interior of the vehicle according to embodiment(s).
Figure 6:
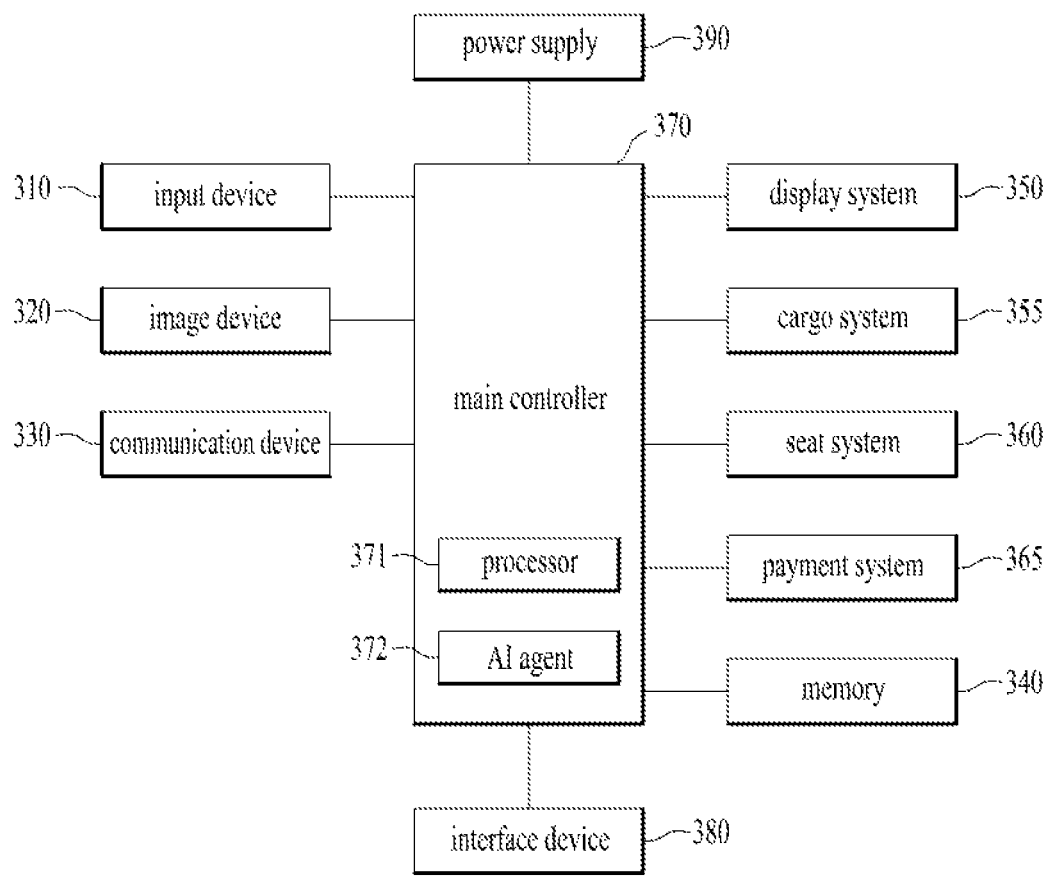
FIG. 6 is a block diagram referred to in description of a cabin system for the vehicle according to embodiment(s).

FIG. 5 is a diagram showing the interior of the vehicle according to embodiment(s). FIG. 6 is a block diagram referred to in description of a cabin system for a vehicle according to embodiment(s).

Referring to FIGS. 5 and 6, a cabin system 300 for a vehicle (hereinafter, a cabin system) may be defined as a convenience system for a user who uses the vehicle 10. The cabin system 300 may be explained as a high-end system including a display system 350, a cargo system 355, a seat system 360, and a payment system 365. The cabin system 300 may include a main controller 370, a memory 340, an interface 380, a power supply 390, an input device 310, an imaging device 320, a communication device 330, the display system 350, the cargo system 355, the seat system 360, and the payment system 365. According to embodiments, the cabin system 300 may further include components in addition to the components described in this specification or may not include some of the components described in this specification.

1) Main Controller

The main controller 370 may be electrically connected to the input device 310, the communication device 330, the display system 350, the cargo system 355, the seat system 360, and the payment system 365 and exchange signals with these components. The main controller 370 may control the input device 310, the communication device 330, the display system 350, the cargo system 355, the seat system 360, and the payment system 365. The main controller 370 may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or electronic units for executing other functions.

The main controller 370 may be configured as at least one sub-controller. The main controller 370 may include a plurality of sub-controllers according to an embodiment. Each of the sub-controllers may individually control grouped devices and systems included in the cabin system 300. The devices and systems included in the cabin system 300 may be grouped by functions or grouped based on seats on which a user may sit.

The main controller 370 may include at least one processor 371. Although FIG. 6 illustrates the main controller 370 including a single processor 371, the main controller 371 may include a plurality of processors. The processor 371 may be categorized as one of the above-described sub-controllers.

The processor 371 may receive signals, information, or data from a user terminal through the communication device 330. The user terminal may transmit signals, information, or data to the cabin system 300.

The processor 371 may identify a user based on image data received from at least one of an internal camera or an external camera included in the imaging device. The processor 371 may identify a user by applying an image processing algorithm to the image data. For example, the processor 371 may identify a user by comparing information received from the user terminal with the image data. For example, the information may include at least one of route information, body information, fellow passenger information, baggage information, position information, preferred content information, preferred food information, disability information, or use history information of a user.

The main controller 370 may include an artificial intelligence (AI) agent 372. The AI agent 372 may perform machine learning based on data acquired through the input device 310. The AI agent 371 may control at least one of the display system 350, the cargo system 355, the seat system 360, or the payment system 365 based on machine learning results.

2) Essential Components

The memory 340 is electrically connected to the main controller 370. The memory 340 may store basic data about units, control data for operation control of units, and input/output data. The memory 340 may store data processed in the main controller 370. Hardware-wise, the memory 340 may be configured using at least one of a ROM, a RAM, an EPROM, a flash drive, or a hard drive. The memory 340 may store various types of data for the overall operation of the cabin system 300, such as a program for processing or control of the main controller 370. The memory 340 may be integrated with the main controller 370.

The interface 380 may exchange signals with at least one electronic device included in the vehicle 10 by wire or wirelessly. The interface 380 may be configured using at least one of a communication module, a terminal, a pin, a cable, a port, a circuit, an element, or a device.

The power supply 390 may provide power to the cabin system 300. The power supply 390 may be provided with power from a power source (e.g., a battery) included in the vehicle 10 and supply the power to each unit of the cabin system 300. The power supply 390 may operate according to a control signal supplied from the main controller 370. For example, the power supply 390 may be implemented as a switched-mode power supply (SMPS).

The cabin system 300 may include at least one PCB. The main controller 370, the memory 340, the interface 380, and the power supply 390 may be mounted on at least one PCB.

3) Input Device

The input device 310 may receive user input. The input device 310 may convert the user input into an electrical signal. The electrical signal converted by the input device 310 may be converted into a control signal and provided to at least one of the display system 350, the cargo system 355, the seat system 360, or the payment system 365. The main controller 370 or at least one processor included in the cabin system 300 may generate a control signal based on the electrical signal received from the input device 310.

The input device 310 may include at least one of a touch input unit, a gesture input unit, a mechanical input unit, or a voice input unit. The touch input unit may convert a user's touch input into an electrical signal. The touch input unit may include at least one touch sensor for detecting a user's touch input. According to an embodiment, the touch input unit may realize a touchscreen through integration with at least one display included in the display system 350. Such a touchscreen may provide both an input interface and an output interface between the cabin system 300 and a user. The gesture input unit may convert a user's gesture input into an electrical signal. The gesture input unit may include at least one of an infrared sensor or an image sensor to sense a user's gesture input. According to an embodiment, the gesture input unit may detect a user's three-dimensional gesture input. To this end, the gesture input unit may include a plurality of light output units for outputting infrared light or a plurality of image sensors. The gesture input unit may detect a user's three-dimensional gesture input using TOF, structured light, or disparity. The mechanical input unit may convert a user's physical input (e.g., press or rotation) through a mechanical device into an electrical signal. The mechanical input unit may include at least one of a button, a dome switch, a jog wheel, or a jog switch. Meanwhile, the gesture input unit and the mechanical input unit may be integrated. For example, the input device 310 may include a jog dial device that includes a gesture sensor and is formed such that it may be inserted into/ejected from a part of a surrounding structure (e.g., at least one of a seat, an armrest, or a door). When the jog dial device is parallel to the surrounding structure, the jog dial device may serve as a gesture input unit. When the jog dial device is protruded from the surrounding structure, the jog dial device may serve as a mechanical input unit. The voice input unit may convert a user's voice input into an electrical signal. The voice input unit may include at least one microphone. The voice input unit may include a beam forming microphone.

4) Imaging Device

The imaging device 320 may include at least one camera. The imaging device 320 may include at least one of an internal camera or an external camera. The internal camera may capture an image of the inside of the cabin. The external camera may capture an image of the outside of the vehicle. The internal camera may acquire an image of the inside of the cabin. The imaging device 320 may include at least one internal camera. It is desirable that the imaging device 320 include as many cameras as the number of passengers who can be accommodated in the vehicle. The imaging device 320 may provide an image acquired by the internal camera. The main controller 370 or at least one processor included in the cabin system 300 may detect a motion of a user based on an image acquired by the internal camera, generate a signal based on the detected motion, and provide the signal to at least one of the display system 350, the cargo system 355, the seat system 360, or the payment system 365. The external camera may acquire an image of the outside of the vehicle. The imaging device 320 may include at least one external camera. It is desirable that the imaging device 320 include as many cameras as the number of doors through which passengers can enter the vehicle. The imaging device 320 may provide an image acquired by the external camera. The main controller 370 or at least one processor included in the cabin system 300 may acquire user information based on the image acquired by the external camera. The main controller 370 or at least one processor included in the cabin system 300 may authenticate a user or acquire body information (e.g., height information, weight information, etc.) of a user, fellow passenger information of a user, and baggage information of a user based on the user information.

5) Communication Device

The communication device 330 may wirelessly exchange signals with external devices. The communication device 330 may exchange signals with external devices through a network or directly exchange signals with external devices. External devices may include at least one of a server, a mobile terminal, or another vehicle. The communication device 330 may exchange signals with at least one user terminal. The communication device 330 may include an antenna and at least one of an RF circuit or an RF element which may implement at least one communication protocol in order to perform communication. According to an embodiment, the communication device 330 may use a plurality of communication protocols. The communication device 330 may switch communication protocols according to a distance to a mobile terminal.

For example, the communication device may exchange signals with external devices based on cellular V2X (C-V2X). For example, C-V2X may include LTE based sidelink communication and/or NR based sidelink communication. Details related to C-V2X will be described later.

For example, the communication device may exchange signals with external devices based on dedicated short range communications (DSRC) or wireless access in vehicular environment (WAVE) based on IEEE 802.11p PHY/MAC layer technology and IEEE 1609 network/transport layer technology. DSRC (or WAVE) is communication specification for providing an intelligent transport system (ITS) service through short-range dedicated communication between vehicle-mounted devices or between a roadside device and a vehicle-mounted device. DSRC may be a communication scheme that may use a frequency of 5.9 GHz and have a data transfer rate in the range of 3 Mbps to 27 Mbps. IEEE 802.11p may be combined with IEEE 1609 to support DSRC (or WAVE).

The communication device of embodiment(s) may exchange signals with external devices using only one of C-V2X and DSRC. Alternatively, the communication device of embodiment(s) may exchange signals with external devices using a hybrid of C-V2X and DSRC.

6) Display System

The display system 350 may display graphical objects. The display system 350 may include at least one display device. For example, the display system 350 may include a first display device 410 for common use and a second display device 420 for individual use.

6.1) Display Device for Common Use

The first display device 410 may include at least one display 411 which outputs visual content. The display 411 included in the first display device 410 may be realized by at least one of a flat panel display, a curved display, a rollable display, or a flexible display. For example, the first display device 410 may include a first display 411 which is positioned behind a seat and formed to be inserted/ejected into/from the cabin, and a first mechanism for moving the first display 411. The first display 411 may be disposed so as to be inserted into/ejected from a slot formed in a seat main frame. According to an embodiment, the first display device 410 may further include a flexible area control mechanism. The first display may be formed to be flexible and a flexible area of the first display may be controlled according to user position. For example, the first display device 410 may be disposed on the ceiling inside the cabin and include a second display formed to be rollable and a second mechanism for rolling or unrolling the second display. The second display may be formed such that images may be displayed on both sides thereof. For example, the first display device 410 may be disposed on the ceiling inside the cabin and include a third display formed to be flexible and a third mechanism for bending or unbending the third display. According to an embodiment, the display system 350 may further include at least one processor which provides a control signal to at least one of the first display device 410 or the second display device 420. The processor included in the display system 350 may generate a control signal based on a signal received from at least one of the main controller 370, the input device 310, the imaging device 320, or the communication device 330.

A display area of a display included in the first display device 410 may be divided into a first area 411a and a second area 411b. The first area 411a may be defined as a content display area. For example, the first area 411 may display at least one of graphical objects corresponding to entertainment content (e.g., movies, sports, shopping, music, etc.), video conferences, food menus, or augmented reality screens. The first area 411a may display graphical objects corresponding to traveling situation information of the vehicle 10. The traveling situation information may include at least one of object information outside the vehicle, navigation information, or vehicle state information. The object information outside the vehicle may include information about presence or absence of an object, positional information of the object, information about a distance between the vehicle and the object, and information about a relative speed of the vehicle with respect to the object. The navigation information may include at least one of map information, information about a set destination, route information according to setting of the destination, information about various objects on a route, lane information, or information about the current position of the vehicle. The vehicle state information may include vehicle attitude information, vehicle speed information, vehicle tilt information, vehicle weight information, vehicle orientation information, vehicle battery information, vehicle fuel information, vehicle tire pressure information, vehicle steering information, vehicle indoor temperature information, vehicle indoor humidity information, pedal position information, vehicle engine temperature information, etc. The second area 411b may be defined as a user interface area. For example, the second area 411b may display an AI agent screen. The second area 411b may be located in an area defined by a seat frame according to an embodiment. In this case, a user may view content displayed in the second area 411b between seats. The first display device 410 may provide hologram content according to an embodiment. For example, the first display device 410 may provide hologram content for each of a plurality of users such that only a user who requests the content may view the content.

6.2) Display Device for Individual Use

The second display device 420 may include at least one display 421. The second display device 420 may provide the display 421 at a position at which only an individual passenger may view display content. For example, the display 421 may be disposed on an armrest of a seat. The second display device 420 may display graphic objects corresponding to personal information of a user. The second display device 420 may include as many displays 421 as the number of passengers who may ride in the vehicle. The second display device 420 may realize a touchscreen by forming a layered structure along with a touch sensor or being integrated with the touch sensor. The second display device 420 may display graphical objects for receiving user input for seat adjustment or indoor temperature adjustment.

7) Cargo System

The cargo system 355 may provide items to a user at the request of the user. The cargo system 355 may operate based on an electrical signal generated by the input device 310 or the communication device 330. The cargo system 355 may include a cargo box. The cargo box may be hidden, with items being loaded in a part under a seat. When an electrical signal based on user input is received, the cargo box may be exposed to the cabin. The user may select a necessary item from articles loaded in the cargo box. The cargo system 355 may include a sliding moving mechanism and an item pop-up mechanism in order to expose the cargo box according to user input. The cargo system 355 may include a plurality of cargo boxes in order to provide various types of items. A weight sensor for determining whether each item is provided may be embedded in the cargo box.

8) Seat System

The seat system 360 may provide a user customized seat to a user. The seat system 360 may operate based on an electrical signal generated by the input device 310 or the communication device 330. The seat system 360 may adjust at least one element of a seat based on acquired user body data. The seat system 360 may include a user detection sensor (e.g., a pressure sensor) for determining whether a user sits on a seat. The seat system 360 may include a plurality of seats on which a plurality of users may sit. One of the plurality of seats may be disposed to face at least one other seat. At least two users may set facing each other inside the cabin.

9) Payment System

The payment system 365 may provide a payment service to a user. The payment system 365 may operate based on an electrical signal generated by the input device 310 or the communication device 330. The payment system 365 may calculate a price for at least one service used by the user and request the user to pay the calculated price.

3. Vehicular Communications for ITS

Overview

ITS (Intelligent Transport System) using V2X (Vehicle-to-Everything) is mainly Access layer (access layer), Network & Transport layer (networking and transport layer), Facilities layer (facility layer), Application layer (application layer), Security (security) and Management (management) may be composed of Entity (entity).

Vehicle-to-vehicle communication (V2V), vehicle-to-base station communication (V2N, N2V), vehicle-to-RSU (Road-Side Unit) communication (V2I, I2V), RSU-to-RSU communication (I2I), vehicle-to-human communication It can be applied to various scenarios such as communication (V2P, P2V) and RSU-to-human communication (I2P, P2I). A vehicle, a base station, an RSU, a person, etc., which are the subject of vehicle communication, are referred to as ITS stations.

Architecture

Figure 7:
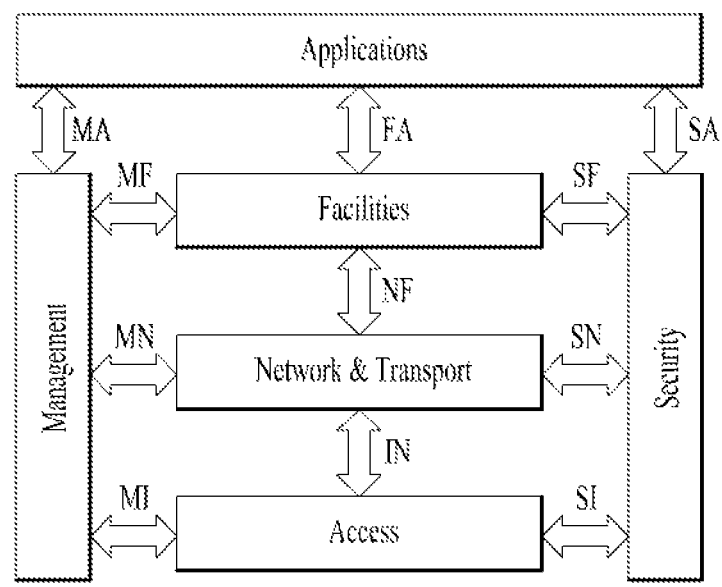
FIG. 7 is a diagram illustrating a reference structure of an Intelligent Transport System (ITS) station.

FIG. 7 is an ITS station reference architecture (reference structure) defined in ISO 21217/EN 302 665, and consists of an access layer, network & transport layer, facilities layer, entity for security and management, and an application layer at the top. It follows the layered OSI model.

The following describes the features of the ITS station reference structure based on the OSI model of FIG. 7. The access layer of the ITS station corresponds to OSI layer 1 (physical layer) and layer 2 (data link layer), and the network & transport layer of the ITS station corresponds to OSI layer 3 (network layer) and layer 4 (transport layer), and the facilities layer of the ITS station corresponds to OSI layer 5 (session layer), layer 6 (presentation layer) and layer 7 (application layer).

The application layer located at the top of the ITS station implements and supports the use-case and can be selectively used according to the use-case. Management entity plays a role in managing all layers including communication and operation of ITS station. Security entity provides security service for all layers. Each layer of ITS station exchanges data transmitted or received through vehicle communication and additional information for various purposes through mutual interface. The following is an abbreviated description of the various interfaces.

MA: Interface between management entity and application layer

MF: Interface between management entity and facilities layer

MN: Interface between management entity and networking & transport layer

MI: Interface between management entity and access layer

FA: Interface between facilities layer and ITS-S applications

NF: Interface between networking & transport layer and facilities layer

IN: Interface between access layer and networking & transport layer

SA: Interface between security entity and ITS-S applications

SF: Interface between security entity and facilities layer

SN: Interface between security entity and networking & transport layer

SI: Interface between security entity and access layer

Figure 8:
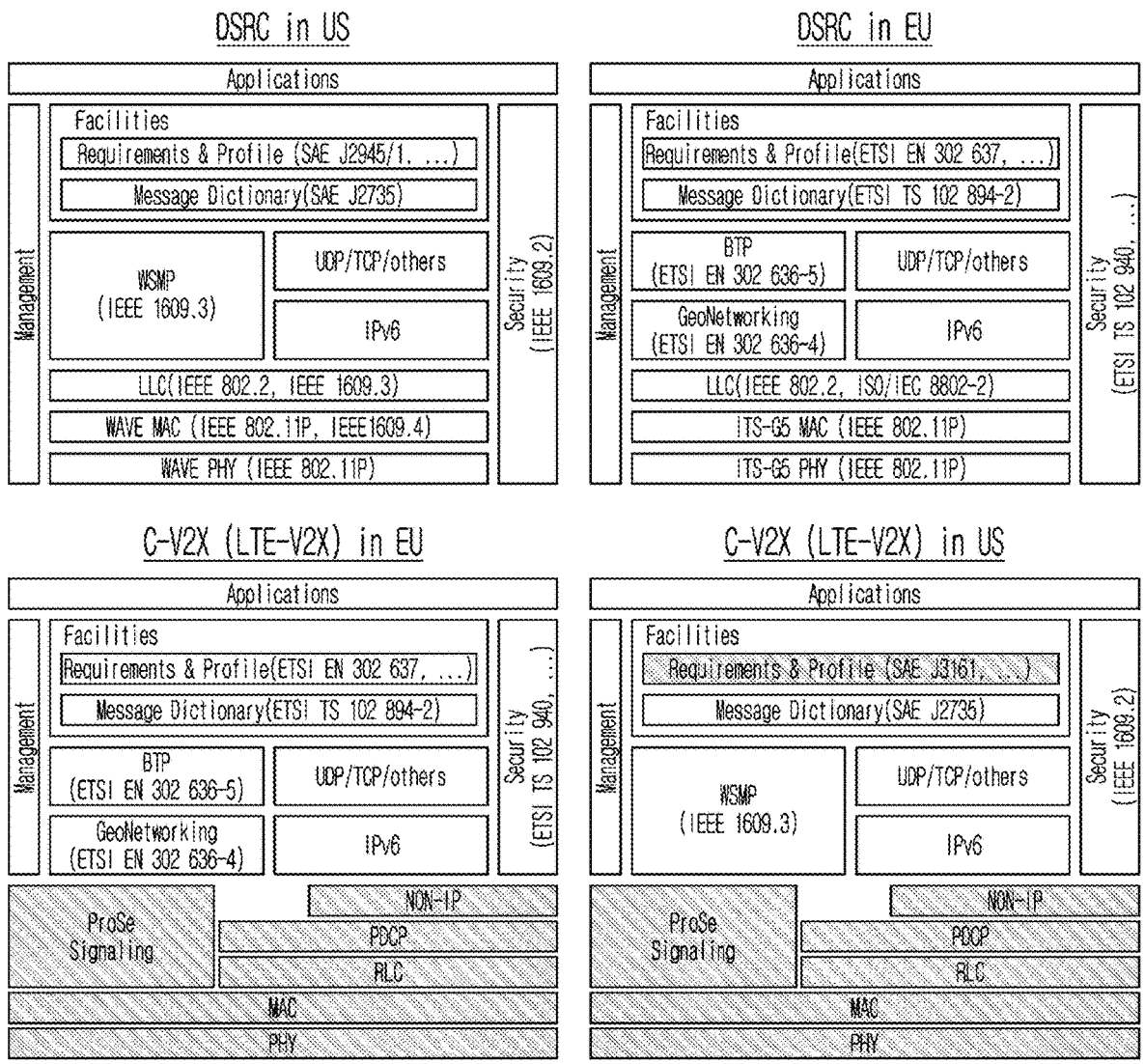
FIG. 8 is an exemplary structure of an ITS station that is designed and applied based on the reference structure of the ITS station described in FIG. 7.

FIG. 8 is an exemplary structure of an ITS station that can be designed and applied based on the reference structure of the ITS station described in FIG. 7. The main concept of the structure of FIG. 7 is to allow communication processing to be divided into layers with a special function possessed by each layer between two end vehicles/users composed of a communication network. That is, when a vehicle-to-vehicle message is generated, data is passed through each layer down one layer at a time in the vehicle and the ITS system (or other ITS-related terminals/systems), and on the other side, the vehicle receiving the message when the message arrives or ITS (or other ITS-related terminals/systems) is passed through one layer at a time.

The ITS system through vehicle communication and network is organically designed in consideration of various access technologies, network protocols, communication interfaces, etc. to support various use-cases, and the roles and functions of each layer described below may be changed according to circumstances. The following briefly describes the main functions of each layer:

Applications Layer

The application layer implements and supports various use-cases, and provides, for example, safety and efficient traffic information and other entertainment information.

FIG. 9 discloses an example structure of an applications layer. The application layer provides services by controlling the ITS station to which the application belongs in various forms, or by delivering a service message to the end vehicle/user/infrastructure through vehicle communication through the lower access layer, network & transport layer, and facilities layer. In this case, the ITS application may support various use cases, and these use-cases may be grouped and supported by other applications such as road-safety, traffic efficiency, local services, and infotainment. The application classification, use-case, etc. of FIG. 9 may be updated when a new application scenario is defined. In FIG. 9, layer management serves to manage and service information related to operation and security of the application layer, and related information includes MA (interface between management entity and application layer) and SA (interface between security entity and ITS-S). applications) (or SAP: Service Access Point, e.g. MA-SAP, SA-SAP) through bidirectional delivery and sharing. The transfer of service messages and related information from the application layer to the facilities layer or from the facilities layer to the application layer is performed through FA (interface between facilities layer and ITS-S applications or FA-SAP).

Facilities Layer

The Facilities layer plays a role in supporting the effective realization of various use-cases defined in the upper application layer, for example, application support, information support, and session/communication support.

Figure 10:
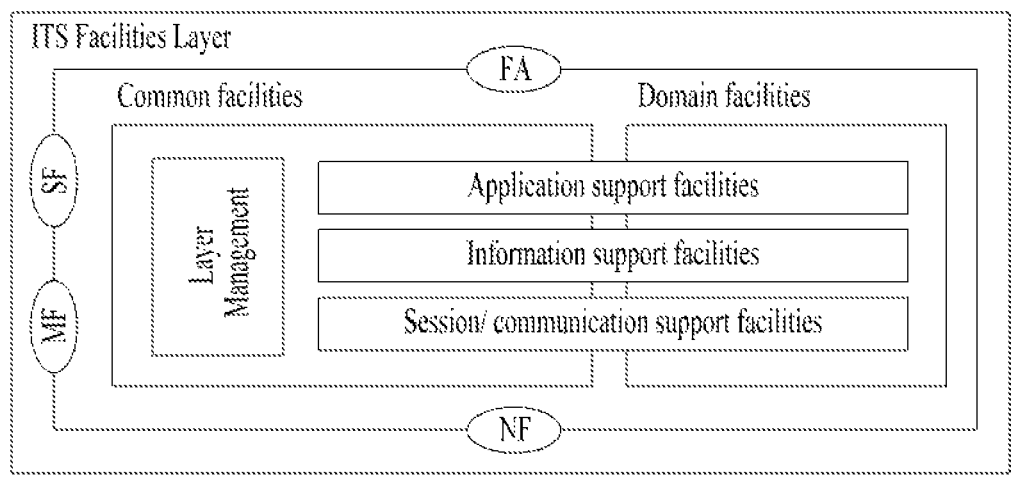
FIG. 10 discloses an exemplary structure of a facilities layer.

FIG. 10 shows an exemplary structure of a facilities layer. The facility layer basically supports the upper 3 layers of the OSI model, (e.g. session layer, presentation layer, application layer, and functions). Specifically, as shown in FIG. 10 for ITS, facilities such as application support, information support, session/communication support, etc. are provided. Here, facilities means a component that provides functionality, information, and data.

[Application support facilities]: Facilities supporting the operation of the ITS application (mainly message generation for ITS, transmission and reception with lower layers, and management thereof) include CA (Cooperative Awareness) basic service and DEN (Decentralized Environmental Notification) basic service. In the future, facilities entities for new services such as Cooperative Adaptive Cruise Control (CACC), Platooning, Vulnerable Roadside User (VRU), and Collective Perception Service (CPS) and related messages may be additionally defined.

[Information support facilities]: Facilities that provide common data information or database to be used by various ITS applications include Local Dynamic Map (LDM).

[Session/communication support facilities]: Facilities that provide services for communications and session management include addressing mode and session support.

Also, facilities can be divided into common facilities and domain facilities as shown in FIG. 10.

[Common facilities]: It is a facility that provides common services or functions necessary for various ITS applications and ITS station operation, such as time management, position management, and service managements.

[Domain facilities]: These are facilities that provide special services or functions required only for some (one or more) ITS applications, such as DEN basic service for road hazard warning applications (RHW). Domain facilities are optional functions and are not used unless supported by the ITS station.

In FIG. 10, layer management serves to manage and service information related to the operation and security of the facilities layer, and the related information includes MF (interface between management entity and facilities layer) and SF (interface between security entity and facilities layer) (or MF-SAP, SF-SAP) is transmitted and shared in both directions. The transfer of service messages and related information from the application layer to the facilities layer or from the facilities layer to the application layer is done through FA (or FA-SAP), and the bidirectional service message and related information between the facilities layer and lower networking & transport layer Information is transmitted by NF (interface between networking & transport layer and facilities layer, or NF-SAP).

Network & Transport Layer

It plays a role in composing a network for vehicle communication between homogenous or heterogeneous networks through support of various transport protocols and network protocols. For example, it provides internet access, routing, and vehicle network using internet protocols such as TCP/UDP+IPv6, and can form vehicle networks using BTP (Basic Transport Protocol) and GeoNetworking-based protocols. In this case, networking using geographic location information may also be supported. The vehicle network layer may be designed or configured depending on the technology used for the access layer (access layer technology-dependent), and regardless of the technology used for the access layer (access layer technology-independent, access layer technology agnostic) can be configured.

Figure 11:
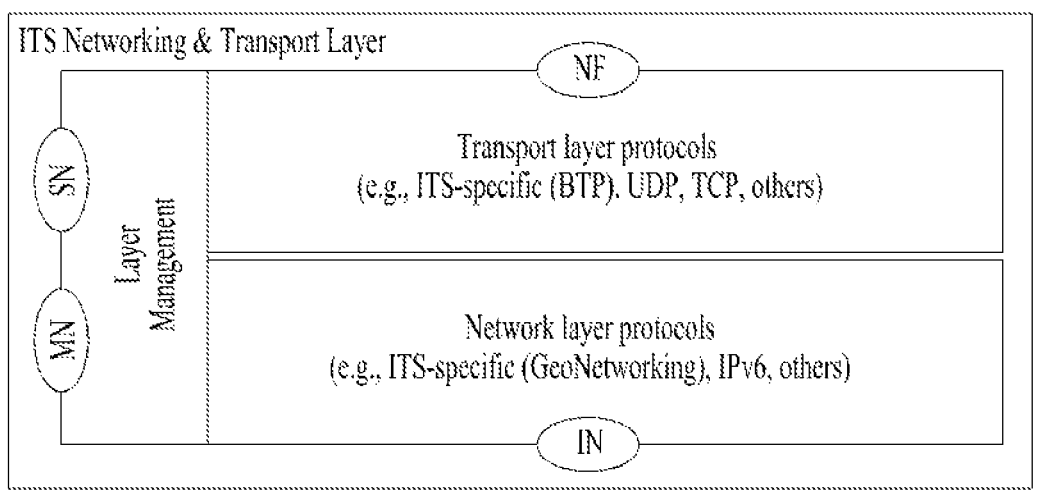
FIG. 11 is a description of a European ITS network & transport layer function.

FIG. 11 is a description of a European ITS network & transport layer function. Basically, the functions of the ITS network & transport layer are similar to or identical to those of OSI 3 layers (network layer) and 4 layers (transport layer), and have the following characteristics.

[Transport layer]: The transport layer is a connection layer that delivers service messages and related information provided from upper layers (session layer, presentation layer, application layer) and lower layers (network layer, data link layer, physical layer). It plays a role in managing so that the sent data arrives in the application process of the destination ITS station accurately. As an example, transport protocols that can be considered in European ITS include TCP and UDP used as existing Internet protocols as shown in FIG. 11, and there are transport protocols only for ITS such as BTS.

[Network layer]: The network layer plays a role in determining a logical address and packet forwarding method/path, and adding information such as the logical address and forwarding path/method of the destination to the packet provided from the transport layer to the header of the network layer. As an example of the packet method, unicast (unicast), broadcast (broadcast), multicast (multicast), etc. between ITS stations may be considered. A networking protocol for ITS can be considered in various ways, such as GeoNetworking, IPv6 networking with mobility support, and IPv6 over GeoNetworking. In addition to simple packet transmission, the GeoNetworking protocol can apply various forwarding routes or delivery ranges, such as forwarding using the location information of stations including vehicles or forwarding using the number of forwarding hops.

In FIG. 11, layer management serves to manage and service information related to operation and security of the network & transport layer, and related information includes MN (interface between management entity and networking & transport layer, or MN-SAP) and SN. It is transmitted and shared in both directions through (interface between security entity and networking & transport layer, or SN-SAP). The bidirectional service message and related information transfer between the facilities layer and the networking & transport layer is accomplished by NF (or NF-SAP), and the exchange of service messages and related information between the networking & transport layer and the access layer is performed by IN (interface between access). layer and networking & transport layer, or IN-SAP).

North American ITS network & transport layer supports IPv6 and TCP/UDP to support existing IP data like Europe, and WSMP (WAVE Short Message Protocol) is defined as a protocol only for ITS.

Figure 12:
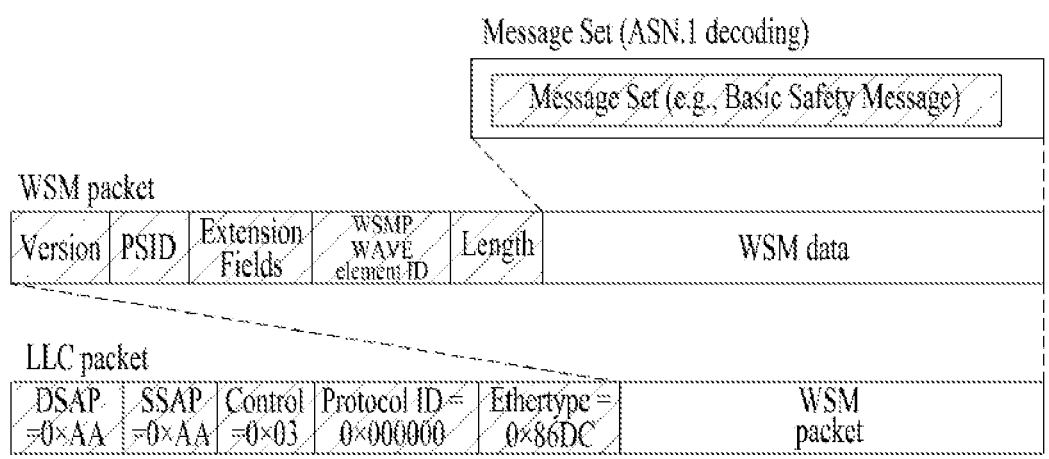
FIG. 12 discloses a packet structure of a WAVE Short Message (WSM) generated according to WSMP.

FIG. 12 is a diagram illustrating a packet structure of a WAVE Short Message (WSM) generated according to WSMP, and is composed of a WSMP Header and WSM data through which a message is transmitted. The WSMP header consists of version, PSID, WSMP header extension field, WSM WAVE element ID, and length.

Version is defined by a WsmpVersion field indicating the actual WSMP version of 4 bits and a reserved field of 4 bits.

PSID is a provider service identifier, which is allocated according to the application in the upper layer, and helps the receiver to determine the appropriate upper layer.

Extension fields are fields for extending the WSMP header, and information such as channel number, data-rate, and transmit power used is inserted.

WSMP WAVE element ID specifies the type of WAVE short message to be transmitted.

Length designates the length of WSM data transmitted through the WSMLength field of 12 bits in octets unit, and the remaining 4 bits are reserved.

The LLC Header has a function that allows to transmit IP data and WSMP data separately, and is distinguished through the Ethertype of SNAP. The structure of LLC header and SNAP header is defined in IEEE802.2. When transmitting IP data, Ethertype is set to 0x86DD to configure the LLC header. When WSMP is transmitted, Ethertype is set to 0x88DC to configure the LLC header. In the case of the receiver, the Ethertype is checked and, in case of 0x86DD, the packet is uploaded to the IP data path, and in case of Ethertype of 0x88DC, the packet is uploaded and sent to the WSMP path.

Access Layer

The access layer plays a role in transmitting the message or data received from the upper layer through the physical channel. As an access layer technology, ITS-G5 vehicle communication technology based on IEEE 802.11p, satellite/broadband wireless mobile communication technology, 2G/3G/4G (LTE (Long-Term Evolution), etc.)/5G wireless cellular communication technology, cellular-V2X vehicle-specific communication technologies such as LTE-V2X and NR-V2X (New Radio), broadband terrestrial digital broadcasting technology such as DVB-T/T2/ATSC3.0, and GPS technology can be applied.

Figure 13:
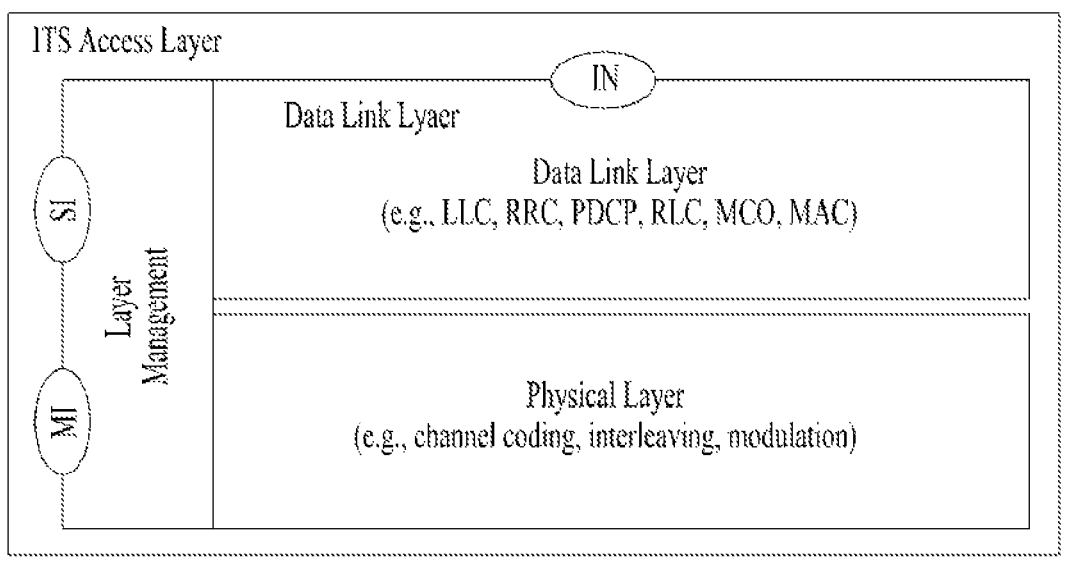
FIG. 13 discloses an ITS access layer applied to IEEE 802.11p, Cellular-V2X (LTE-V2X, NR-V2X).

FIG. 13 is a configuration of an ITS access layer that is universally applied to IEEE 802.11p, Cellular-V2X (LTE-V2X, NR-V2X), and the function is similar to OSI 1 layer (Physical layer) and 2 layer (Data Link layer). or the same and have the following characteristics:

Data Link Layer:

The data link layer is a layer that converts a noisy physical line between adjacent nodes (or between vehicles) into a communication channel without transmission error so that the upper network layer can use it. Framing function to group data by dividing it into packets (or frames) as a transmission unit, Flow Control function to compensate for the speed difference between the sending side and the receiving side, (Error and noise due to the characteristics of the physical transmission medium A function of detecting and correcting transmission errors or detecting transmission errors through timers and ACK signals at the sender using a timer and ACK signal using ARQ (Automatic Repeat Request) and retransmitting packets that have not been correctly received, etc. carry out In addition, in order to avoid confusion with the packet or ACK signal, a function to assign a sequence number (serial number) to the packet and ACK signal and the function to control the establishment, maintenance, short circuit and data transmission of data links between network entities are also performed. LLC (Logical Link Control), RRC (Radio Resource Control), PDCP (Packet Data Convergence Protocol), RLC (Radio Link Control), MAC (Medium Access Control), MCO (Multi-channel) constituting the data link layer of FIG. 13. Operation) The main functions of the sub-layer are as follows.

LLC sub-layer: It allows the use of several different lower MAC sublayer protocols, allowing communication independent of the network topology.

RRC sub-layer: Cell system information broadcast required for all terminals in the cell, paging message delivery management, RRC connection management between the terminal and E-UTRAN (establishment/maintenance/release), mobility management (handover), UE context transfer between eNodeB s during handover, terminal (UE) measurement report and control information, terminal (UE) capability management, temporary assignment of cell ID to the UE, security management including key management, and RRC message encryption.

PDCP sub-layer: It can perform IP packet header compression through compression methods such as ROHC (Robust Header Compression), and performs functions such as encryption of control messages and user data, data integrity, and data loss prevention during handover.

RLC sub-layer: Through packet segmentation/concatenation, data is transmitted by matching the packet from the upper PDCP layer to the allowable size of the MAC layer, and data transmission reliability is improved through transmission error and retransmission management, the order of received data is checked, Perform rearrangement, duplicate check, etc.

MAC sub-layer: For the use of shared media by multiple nodes, control of occurrence of collision/contention between nodes, the function of matching the packets delivered from the upper layer to the physical layer frame format, the assignment and identification of sender/receiver addresses, carrier detection, collision detection, physical media It plays a role, such as detecting disturbances in the phase.

MCO sub-layer: It makes it possible to effectively provide various services using a plurality of frequency channels, and its main function is to effectively distribute the traffic load in a specific frequency channel to other channels to prevent collision/collision of communication information between vehicles in each frequency channel. Minimize contention.

Physical layer: As the lowest layer in the ITS hierarchy, it defines the interface between the node and the transmission medium, and performs modulation, coding, and mapping of the transport channel to the physical channel for bit transmission between data link layer entities, and carrier sensing, and performs a function of notifying the MAC sublayer of whether the wireless medium is in use (busy or idle) through Clear Channel Assessment (CCA).

IEEE 802.11p MAC Sub-Layer/PHY Layer Main Features

Figure 14:
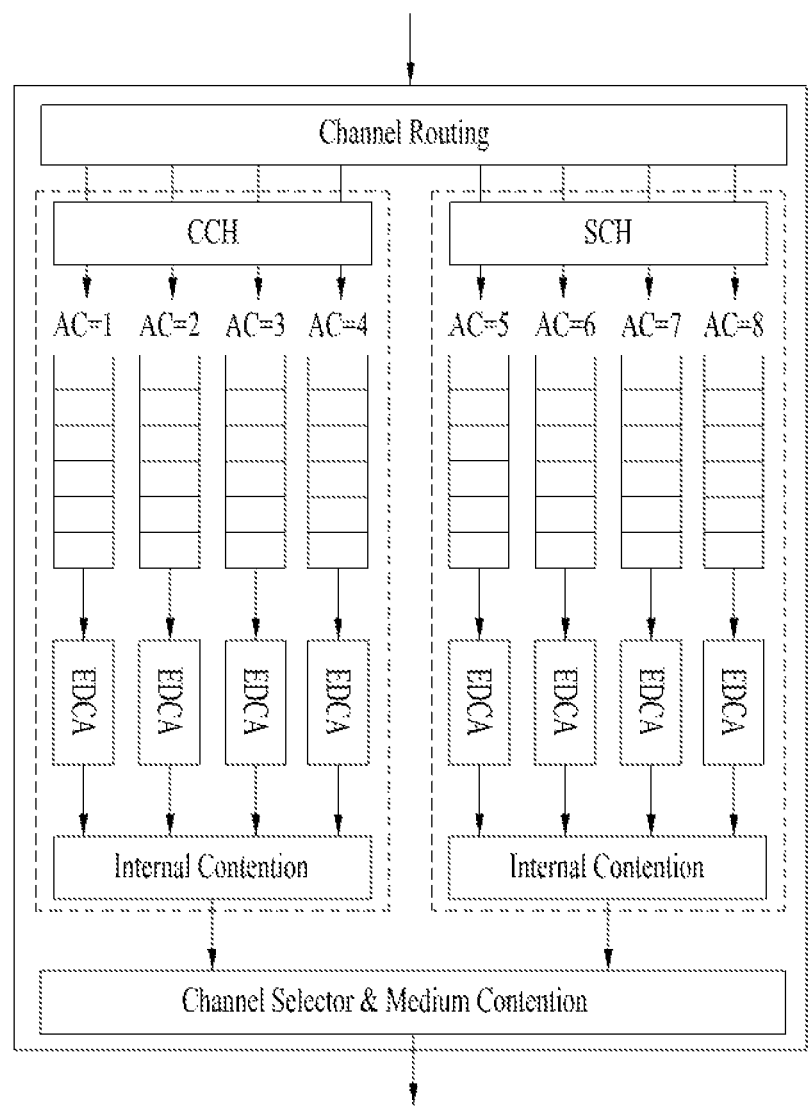
FIG. 14 is a structure for the main features of the MAC sub-layer and the PHY layer of IEEE 802.11p.

FIG. 14 is a structure for the main features of the MAC sub-layer and the PHY layer of IEEE 802.11p. The structure of FIG. 14 includes a channel coordination part where channel access is defined, a channel routing part defining an operation process of overall data and management frames between PHY-MACs, and an Enhanced Dedicated Channel (EDCA) that determines and defines the priority of a transmitted frame. Access) part, and data buffers (queues) part that stores frames input from the upper layer. A description of each part of the structure is as follows:

Channel coordination: It is divided into CCH (Control Channel) and SCH (Service Channel), and channel access can be defined.

Data buffers (queues): Performs a function of storing frames input from the upper layer according to a defined AC (Access Category), and has each data buffer for each AC as shown in FIG. 14.

Channel routing: It performs the function of transferring the data input from the upper layer to the data buffer (queue), and calls the transmission operation parameters such as Channel Coordination, the channel number for frame transmission, transmission power, and data rate in response to the transmission request of the upper layer. perform the function.

Figure 15:
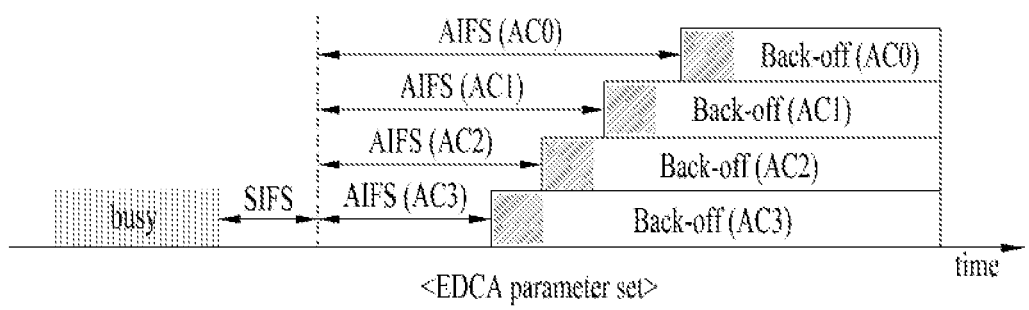
FIG. 15 discloses the structure of an Enhanced Dedicated Channel Access (EDCA).

EDCA: FIG. 15 discloses an EDCA operation structure. As a method to ensure QoS in the existing IEEE 802.11e MAC layer, it is divided into four AC (Access Category) according to the type of traffic, giving each category a differentiated priority, and assigning a differentiated parameter to each AC to ensure high priority. It is a contention-based media approach that gives more transmission opportunities to the traffic of For data transmission including priorities, EDCA assigns 8 priorities from 0-7, and maps data arriving at the MAC layer to 4 ACs according to priorities. Every AC has its own transmission queue and AC parameter, and the difference in priority between ACs is determined from the AC parameter values set differently. It has a different channel access priority because it is connected to the back-off to the AC parameter values set differently. When a collision between stations occurs during frame transmission, a new backoff counter is created. As shown in FIG. 15, the four AC-specific transmission queues defined in IEEE 802.11e MAC individually compete with each other for wireless medium access within one station. Since each AC has an independent backoff counter, a virtual collision can occur. If there are two or more ACs that have completed backoff at the same time, data is transmitted to the AC with the highest priority first, and the other ACs increase the CW value and update the backoff counter again. This conflict resolution process is called virtual conflict handling process. EDCA also allows access to a channel when transmitting data through a Transmission Opportunity (TXOP). If one frame is too long and cannot be transmitted during one TXOP, it can be cut into small frames and transmitted.

Figure 16:
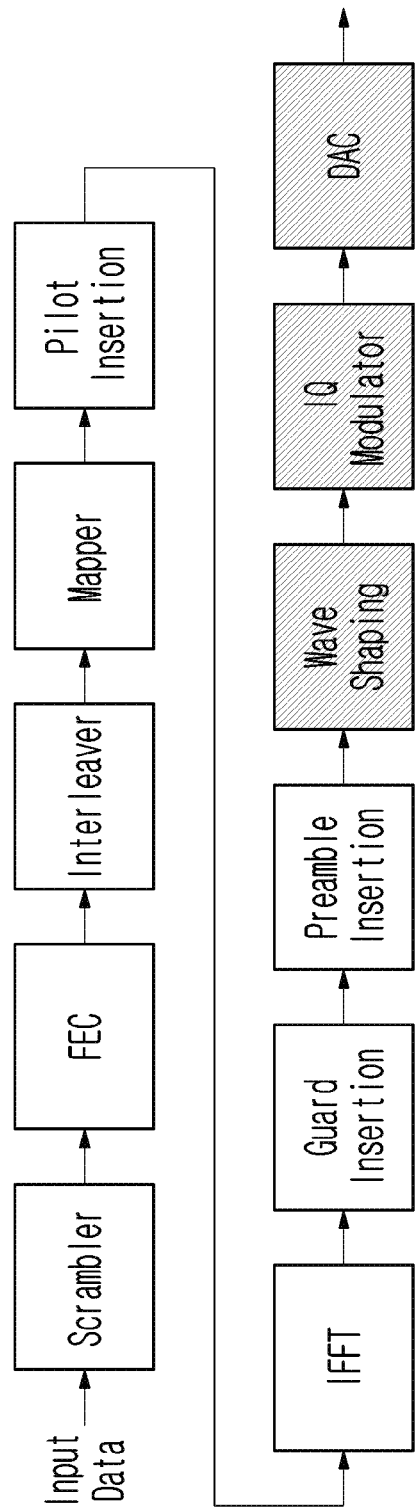
FIG. 16 discloses a structure of a transmitter of a physical layer.

FIG. 16 discloses a structure of a transmitter of a physical layer. FIG. 16 shows a signal processing block diagram of a physical layer assuming IEEE 802.11p OFDM (orthogonal frequency division multiplexing), scrambling, Forward Error Correction (FEC), interleaver, mapper, pilot insertion, IFFT (Inverse Fast Fourier Transform), PLCP sub-layer baseband signal processing composed of guard insertion, preamble insertion, etc. and PMD sub-layer RF band signal processing composed of wave shaping (including In-phase/Quadrature-phase modulation), DAC (Digital Analog Converter), etc. can be divided into parts. The function description for each block is as follows.

The scrambler block randomizes the input bit stream by XORing it with PRBS (Pseudo Random Binary Sequence). The block may be omitted or replaced by another block having a similar or identical function.

In the scrambler output bit stream, redundancy is added through a forward error coding (FEC) process, so that an error on the transmission channel can be corrected at the receiving end. The block may be omitted or replaced by another block having a similar or identical function.

(Bit) The interleaver block interleaves the input bit stream according to the interleaving rule so as to be robust against burst errors that may occur during the transmission channel. When deep fading or erasure is applied to a QAM symbol, since interleaved bits are mapped to each QAM symbol, it is possible to prevent an error from occurring in consecutive bits among all codeword bits. The block may be omitted or replaced by another block having a similar or identical function.

The constellation mapper block allocates an input bit word to one constellation, and the block may be omitted or replaced by another block having a similar or identical function.

The pilot insertion block inserts reference signals at a predetermined position for each signal block, and is used in the receiver to estimate the channel and channel distortion such as frequency offset and timing offset. The block may be omitted or replaced by another block having a similar or identical function.

The inverse waveform transform block transforms and outputs the input signal in such a way that transmission efficiency and flexibility are improved in consideration of the characteristics of the transmission channel and the system structure. As an embodiment, in the case of an OFDM system, a method of converting a frequency domain signal into a time domain using an inverse FFT operation may be used. The inverse waveform transform block may not be used in the case of a single carrier system. The block may be omitted or replaced by another block having a similar or identical function.

The guard sequence insertion block provides a guard interval between adjacent signal blocks in order to minimize the effect of delay spread of the transport channel, and inserts a specific sequence if necessary to facilitate synchronization or channel estimation of the receiver. As an embodiment, in the case of an OFDM system, a method of inserting a cyclic prefix into a guard interval of an OFDM symbol may be used. The block may be omitted or replaced by another block having a similar or identical function.

The preamble insertion block inserts a known type of signal promised between transceivers into the transmission signal so that the receiver can quickly and efficiently detect the target system signal. As an embodiment, in the case of an OFDM system, a method of defining a transmission frame composed of several OFDM symbols and inserting a preamble symbol at the beginning of each transmission frame may be used. The block may be omitted or replaced by another block having a similar or identical function.

The waveform processing block performs waveform processing on the input baseband signal to match the transmission characteristics of the channel. As an embodiment, a method of performing square-root-raised cosine (SRRC) filtering to obtain a standard of out-of-band emission of a transmission signal may be used. Waveform processing block may not be used in case of multi-carrier system. The block may be omitted or replaced by another block having a similar or identical function.

Finally, the DAC block converts an input digital signal into an analog signal and outputs it, and the DAC output signal (in this embodiment) is transmitted to an output antenna. The block may be omitted or replaced by another block having a similar or identical function.

LTE-V2X PHY/MAC Main Features

The following describes the elements of the device-to-device communication (D2D) technique, which is the main characteristic of cellular-V2X (LTE-V2X, NR-V2X) communication.

Figure 17:
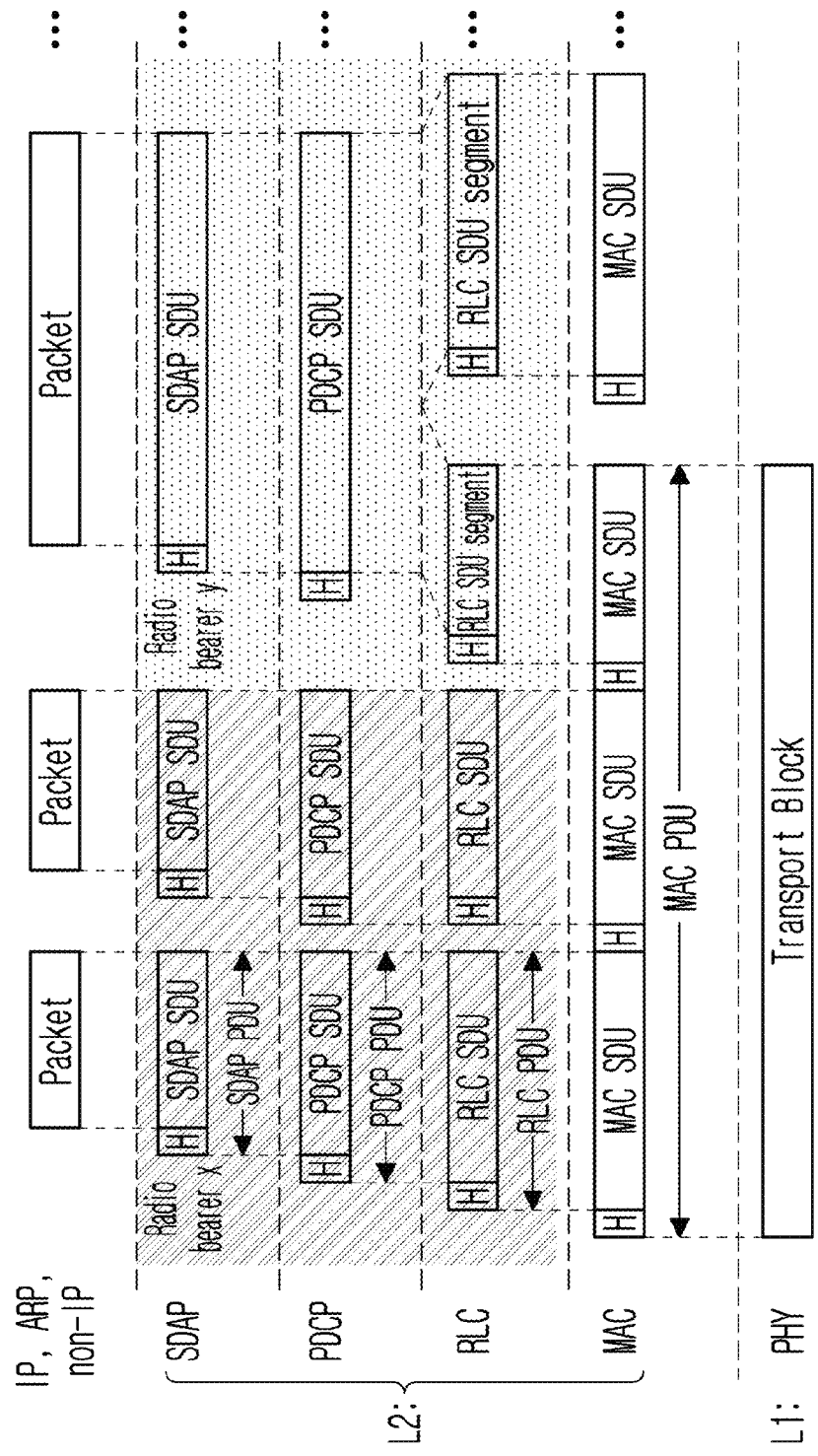
FIG. 17 discloses a data flow in the MAC layer and the PHY layer of Cellular-V2X.

The data flow in the MAC layer and the PHY layer of cellular-V2X may be configured as shown in FIG. 17 below.

In FIG. 17, "H" indicates headers and subheaders. A radio bearer is a path between a UE and a BS, used when user data or signaling passes through a network. In other words, the radio bearer is a pipe that carries user data or signaling between the UE and the BS. Radio bearers are classified into data radio bearers (DRBs) for user plane data and signaling radio bearers (SRBs) for control plane data. For example, SRBs are radio bearers used only for transmission of RRC and NAS messages, and DRBs are used to carry user data.

When the UE is the transmitting end, packets including user data generated by the application(s) of the UE are provided to layer 2 (i.e, L2) of the NR. The UE may be an MTC device, an M2M device, a D2D device, an IoT device, a vehicle, a robot, or an AI module. In implementations of the present specification, the packet containing data generated by the application of the UE may be an Internet protocol (IP) packet, an address resolution protocol (ARP) packet(s), or a non-IP packet.

Layer 2 of NR is divided into the following sublayers: medium access control (MAC), radio link control (RLC), packet data convergence protocol (PDCP) and service data Adaptation protocol (service data adaptation protocol, SDAP). SDAP, a protocol layer not found in LTE systems, provides QoS flows to NGC. For example, SDAP supports mapping between QoS flows and data radio bearers. In the LTE system, an IP PDU including an IP packet may be a PDCP SDU in the PDCP layer. PDCP in implementations of this specification may support efficient transport of IP, ARP and/or non-IP packets to/from a wireless link. The RLC generates an RLC PDU and provides the RLC PDU to the MAC. The MAC layer is located between the RLC layer and the physical layer (PHY layer) that is layer 1 (i.e, L1). The MAC layer is coupled to the RLC layer via logical channels and to the PHY layer via transport channels. The MAC generates a MAC PDU and provides it to the PHY, and the MAC PDU corresponds to a transport block in the PHY layer. The transport block is transmitted through a physical channel through signal processing.

In the case of the receiving end, a transport block obtained through a signal processing process for data received through a physical channel is transferred from the PHY layer to the layer 2. The receiving end may be a UE or a BS. The transport block is a MAC PDU in the MAC layer of layer 2. The MAC PDU is provided to the application layer through the layer 2 and IP, ARP or non-IP protocol.

The wireless protocol stack in the 3GPP system is largely divided into a protocol stack for a user plane and a protocol stack for a control plane. The user plane, also called the data plane, is used to carry user traffic (i.e, user data). The user plane handles user data such as voice and data. In contrast, the control plane handles control signaling rather than user data between the UE and the UE or between the UE and the network node. In the LTE system, the protocol stack for the user plane in the NR system includes PDCP, RLC, MAC and PHY, and the protocol stack for the user plane in the NR system includes SDAP, PDCP, RLC, MAC and PHY. The protocol stack for the control plane in the LTE system and the NR system includes PDCP, RLC, and MAC terminated at the BS at the network end, and, in addition, radio resource control (RRC), which is an upper layer of PDCP, and the upper layer of RRC includes a non-access stratum (NAS) control protocol. The NAS protocol terminates at the access and mobility management function (AMF) of the core network at the network end, and performs mobility management and bearer management. RRC supports transmission of NAS signaling, and performs efficient management of radio resources and required functions. For example, RRC supports the following functions: broadcasting of system information; Establishment (establishment), maintenance (maintenance) and release (release) of the RRC connection between the UE and the BS; establishment, establishment, maintenance and release of radio bearers; UE measurement reporting and control of reporting; detection and recovery of radio link failure; NAS message transfer to/from the NAS of the UE.

The RRC message/signaling by or from the BS in this specification is the RRC message/signaling that the RRC layer of the BS sends to the RRC layer of the UE. The UE is configured or operates based on an information element (IE) that is a set of parameter(s) or parameter(s) included in the RRC message/signaling from the BS.

Figure 18:
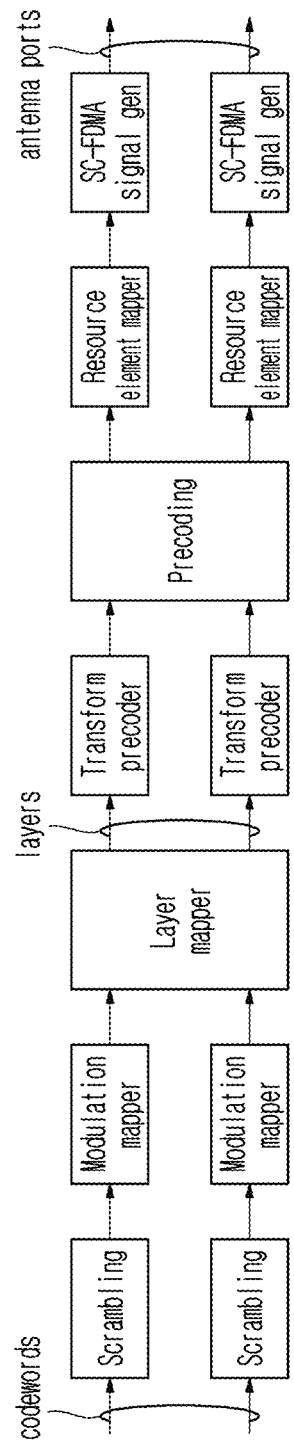
FIG. 18 discloses an example of processing for uplink transmission.

FIG. 18 discloses an example of processing for uplink transmission.

Each of the blocks shown in FIG. 18 may be performed in each module in a physical layer block of the transmission device. More specifically, the uplink signal processing in FIG. 18 may be performed by a processor of the UE/BS described in this specification. Referring to FIG. 18, uplink physical channel processing includes scrambling, modulation mapping, layer mapping, transform precoding, precoding, and resource element mapping (resource element mapping) and SC-FDMA signal generation (SC-FDMA signal generation) may be performed through the process. Each of the above processes may be performed separately or together in each module of the transmission device. The transform precoding is to spread the UL data in a special way that reduces the peak-to-average power ratio (PAPR) of the waveform, and a discrete Fourier transform (discrete Fourier transform, it is a type of DFT). OFDM using CP with transform precoding performing DFT spreading is called DFT-s-OFDM, and OFDM using CP without DFT spreading is called CP-OFDM. When enabled for UL in the NR system, transform precoding may be optionally applied. That is, the NR system supports two options for the UL waveform, one of which is CP-OFDM and the other is DFT-s-OFDM. Whether the UE should use CP-OFDM as the UL transmission waveform or DFT-s-OFDM as the UL transmission waveform is provided from the BS to the UE through RRC parameters. 18 is a conceptual diagram of uplink physical channel processing for DFT-s-OFDM, and in the case of CP-OFDM, transform precoding is omitted among the processes of FIG. 18.

In more detail, the transmission device may scramble coded bits in the codeword for one codeword by a scrambling module and then transmit it through a physical channel. Here, the codeword is obtained by encoding the transport block. The scrambled bits are modulated into complex-valued modulation symbols by a modulation mapping module. The modulation mapping module may modulate the scrambled bits according to a predetermined modulation scheme and arrange the scrambled bits as a complex value modulation symbol representing a position on a signal constellation. pi/2-Binary Phase Shift Keying (pi/2-BPSK), m-Phase Shift Keying (m-PSK), or m-Quadrature Amplitude Modulation (m-QAM) may be used for modulation of the encoded data. The complex value modulation symbol may be mapped to one or more transport layers by a layer mapping module. Complex value modulation symbols on each layer may be precoded by a precoding module for transmission on an antenna port. When transform precoding is enabled, the precoding module may perform precoding after performing transform precoding on complex value modulation symbols as shown in FIG. 18. The precoding module may process the complex value modulation symbols in a MIMO method according to multiple transmit antennas to output antenna-specific symbols, and distribute the antenna-specific symbols to a corresponding resource element mapping module. The output z of the precoding module can be obtained by multiplying the output y of the layer mapping module by the precoding matrix W of N×M. Here, N is the number of antenna ports, and M is the number of layers.

The resource element mapping module maps the demodulation value modulation symbols for each antenna port to an appropriate resource element in a resource block allocated for transmission. The resource element mapping module may map complex-valued modulation symbols to appropriate subcarriers and multiplex them according to users. The SC-FDMA signal generating module (CP-OFDM signal generating module when transform precoding is disabled) modulates a complex-valued modulation symbol using a specific modulation scheme, e.g., OFDM, in a complex-valued time domain. time domain) OFDM (Orthogonal Frequency Division Multiplexing) symbol signals may be generated. The signal generating module may perform Inverse Fast Fourier Transform (IFFT) on an antenna-specific symbol, and a CP may be inserted into a time domain symbol on which the IFFT is performed. The OFDM symbol undergoes digital-to-analog conversion, frequency upconversion, and the like, and is transmitted to the receiving device through each transmit antenna. The signal generating module may include an IFFT module and a CP inserter, a digital-to-analog converter (DAC), a frequency uplink converter, and the like.

4. C-V2X

A wireless communication system is a multiple access system that supports communication with multiple users by sharing available system resources (for example, bandwidth, transmit power, or the like). Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system, a multi-carrier frequency division multiple access (MC-FDMA) system and the like.

Sidelink refers to a communication method of establishing a direct link between user equipments (UEs) and directly exchanging voice, data, or the like between terminals without passing through a base station (BS). The sidelink is considered as one way to solve a burden of the BS due to rapidly increasing data traffic.

Vehicle-to-everything (V2X) refers to a communication technology that exchanges information with other vehicles, pedestrians, things for which infrastructure is built, and the like through wired/wireless communication. The V2X may be classified into four types such as vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

Meanwhile, as more communication devices require larger communication capacities, there is a need for improved mobile broadband communication as compared to existing radio access technology (RAT). Accordingly, a communication system considering a service or a terminal that is sensitive to reliability and latency is being discussed. Next-generation radio access technologies that consider improved mobile broadband communication, massive MTC, ultra-reliable and low-latency communication (URLLC), and the like may be referred to as new RAT or new radio (NR). Vehicle-to-everything (V2X) communication may be supported even in NR.

The following technologies may be used for various wireless communication systems such as code division multiple access (CDMA), frequency division multiple access (FDMA), time division multiple access (TDMA), orthogonal frequency division multiple access (OFDMA), and single carrier frequency division multiple access (SC-FDMA). CDMA may be implemented by wireless technologies such as universal terrestrial radio access (UTRA) and CDMA2000. TDMA may be implemented by wireless technologies such as global system for mobile communications (GSM)/general packet radio service (GPRS)/enhanced data rates for GSM evolution (EDGE). OFDMA may be implemented by wireless technologies such as institute of electrical and electronics engineers (IEEE) 802.11 (Wi-Fi), IEEE 802.16 (WiMAX), IEEE 802-20, and evolved UTRA (E-UTRA). IEEE 802.16m is an evolution of IEEE 802.16e and provides backward compatibility with systems based on IEEE 802.16e. UTRA is part of a universal mobile telecommunications system (UMTS). 3rd generation partnership project (3GPP) long term evolution (LTE) is part of evolved UMTS (E-UMTS) using evolved-UMTS terrestrial radio access (E-UTRA), and employs OFDMA on downlink and SC-FDMA on uplink. LTE-advanced (LTE-A) is an evolution of 3GPP LTE.

5G NR is a successor technology to LTE-A, and is a new clean-slate type mobile communication system having characteristics such as high performance, low latency, and high availability. 5G NR may take advantage of all available spectral resources such as a low frequency band below 1 GHz, an intermediate frequency band from 1 GHz to 10 GHz, and a high frequency (millimeter wave) band above 24 GHz.

For clarity of description, the following description focuses on LTE-A or 5G NR, but the technical idea of embodiment(s) is not limited thereto.

Figure 19:
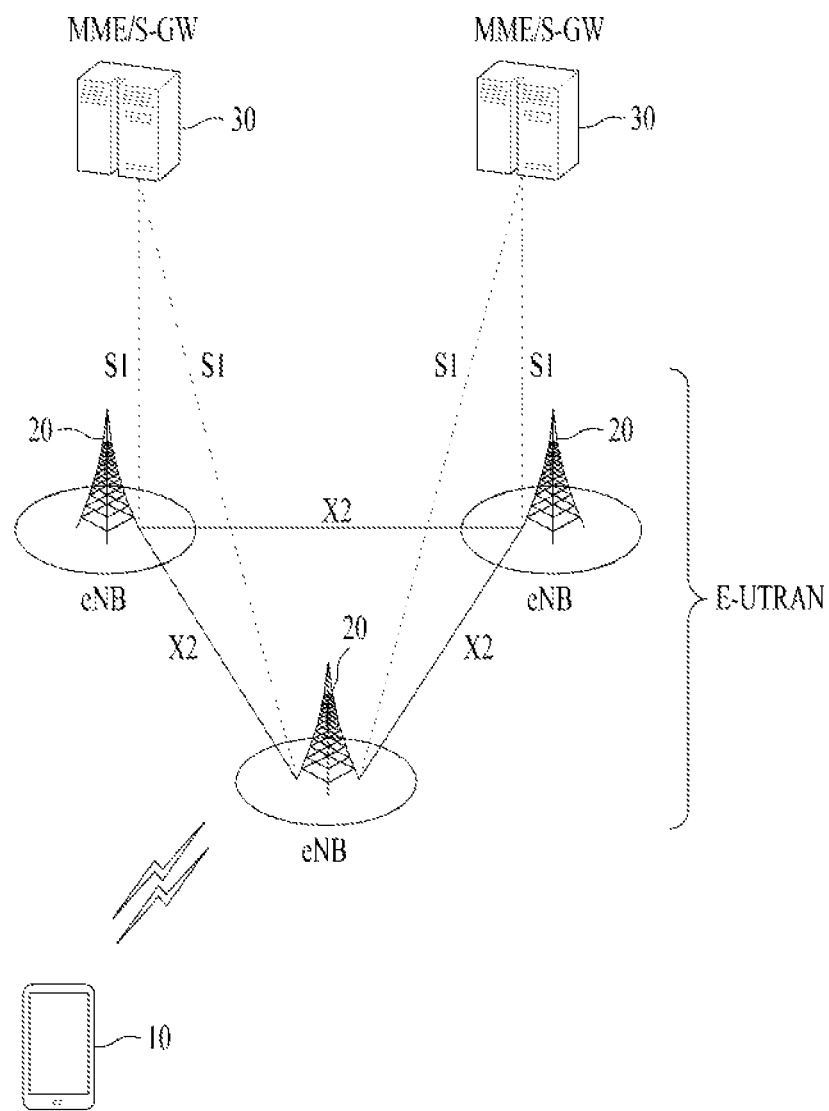
FIG. 19 discloses the structure of an LTE system to which an example or implementation example can be applied.

FIG. 19 illustrates the structure of an LTE system to which embodiment(s) are applicable. This system may be referred to as an evolved-UMTS terrestrial radio access network (E-UTRAN) or long-term evolution (LTE)/LTE-advanced (LTE-A) system.

Referring to FIG. 19, the E-UTRAN includes a base station 20 that provides a control plane and a user plan to a user equipment (UE) 10. The UE 10 may be fixed or mobile. The UE 10 may be referred to by another term, such as a mobile station (MS), a user terminal (UT), a subscriber station (SS), a mobile terminal (MT), a wireless device, etc. The BS 20 refers to a fixed station that communicates with the UE 10. The BS 20 may be referred to by another term, such as an evolved-NodeB (eNB), a base transceiver system (BTS), an access point, etc.

BSs 20 may be connected to each other through an X2 interface. The BS 20 is connected to an evolved packet core (EPC) 30 through an S1 interface, more specifically, to a mobility management entity (MME) through S1-MME and to a serving gateway (S-GW) through S1-U.

The EPC 30 includes the MME, the S-GW, and a packet data network (PDN) gateway (P-GW). The MME has access information of the UE or capability information of the UE, and such information is generally used for mobility management of the UE. The S-GW is a gateway having the E-UTRAN as an end point. The P-GW is a gateway having the PDN as an end point.

Layers of a radio interface protocol between the UE and the network may be classified into a first layer (L1), a second layer (L2), and a third layer (L3) based on the lower three layers of the open system interconnection (OSI) reference model that is well-known in a communication system. Thereamong, a physical layer belonging to the first layer provides an information transfer service using a physical channel, and a radio resource control (RRC) layer belonging to the third layer serves to control a radio resource between the UE and the network. For this, the RRC layer exchanges an RRC message between the UE and the BS.

Figure 20:
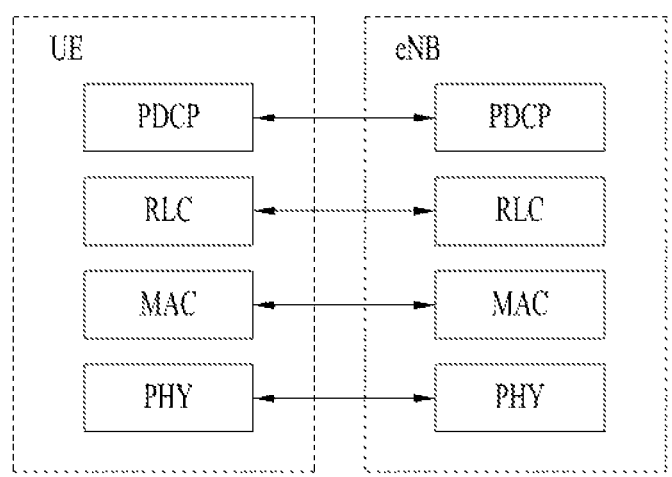
FIG. 20 discloses a radio protocol architecture for a user plane to which an example or implementation example may be applied.

FIG. 20 illustrates a radio protocol architecture for a user plane to which embodiment(s) are applicable.

Figure 21:
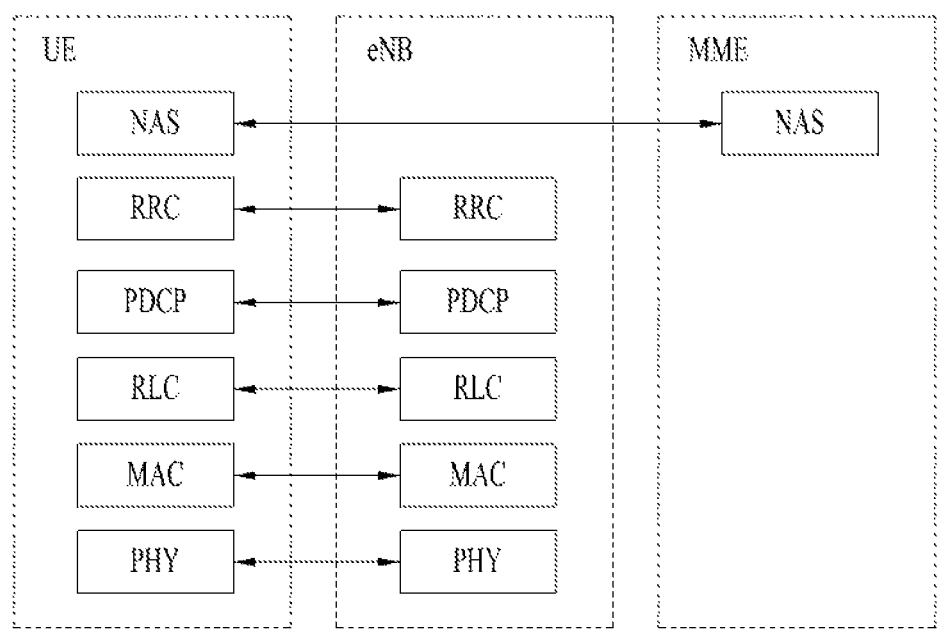
FIG. 21 discloses a radio protocol structure for a control plane to which an example or implementation example can be applied.

FIG. 21 illustrates a radio protocol architecture for a control plane to which embodiment(s) are applicable. The user plane is a protocol stack for user data transmission. The control plane is a protocol stack for control signal transmission.

Referring to FIGS. 20 and 21, a physical layer provides an upper layer with an information transfer service through a physical channel. The physical layer is connected to a media access control (MAC) layer, which is an upper layer of the physical layer, through a transport channel. Data is transferred between the MAC layer and the physical layer through the transport channel. The transport channel is classified according to how and with which characteristics data is transferred through a radio interface.

Data is moved between different physical layers, i.e., between the physical layers of a transmitter and a receiver, through a physical channel. The physical channel may be modulated according to an orthogonal frequency division multiplexing (OFDM) scheme and use time and frequency as radio resources.

The MAC layer provides a service to a radio link control (RLC) layer, which is an upper layer, through a logical channel. The MAC layer provides a mapping function from a plurality of logical channels to a plurality of transport channels. The MAC layer also provides a logical channel multiplexing function caused by mapping from a plurality of logical channels to a single transport channel. A MAC sublayer provides data transfer services on logical channels.

The RLC layer performs concatenation, segmentation, and reassembly of an RLC service data unit (SDU). In order to guarantee various types of quality of service (QoS) required by a radio bearer (RB), the RLC layer provides three operation modes: transparent mode (TM), unacknowledged mode (UM), and acknowledged mode (AM). AM RLC provides error correction through an automatic repeat request (ARQ).

The RRC layer is defined only in the control plane. The RRC layer is related to the configuration, reconfiguration, and release of RBs to serve to control logical channels, transport channels, and physical channels. The RB means a logical path provided by the first layer (physical layer) and the second layer (MAC layer, RLC layer, or PDCP layer) in order to transfer data between a UE and a network.

A function of a packet data convergence protocol (PDCP) layer in the user plane includes transfer, header compression, and ciphering of user data. A function of the PDCP layer in the control plane includes transfer and encryption/integrity protection of control plane data.

The configuration of the RB means a process of defining the characteristics of a radio protocol layer and channels in order to provide specific service and configuring each detailed parameter and operating method. The RB may be divided into two types of a signaling RB (SRB) and a data RB (DRB). The SRB is used as a passage through which an RRC message is transported in the control plane, and the DRB is used as a passage through which user data is transported in the user plane.

If RRC connection is established between the RRC layer of UE and the RRC layer of the E-UTRAN, the UE is in an RRC connected (RRC_CONNECTED) state and if not, the UE is in an RRC idle (RRC_IDLE) state. In NR, an RRC inactive (RRC_INACTIVE) state has been further defined. The UE of RRC_INACTIVE state may release connection to the BS while maintaining connection to a core network.

A downlink transport channel through which data is transmitted from the network to the UE includes a broadcast channel (BCH) through which system information is transmitted and a downlink shared channel (SCH) through which user traffic or control messages are transmitted. Traffic or a control message for a downlink multicast or broadcast service may be transmitted through the downlink SCH or may be transmitted through a separate downlink multicast channel (MCH). Meanwhile, an uplink transport channel through which data is transmitted from the UE to the network includes a random access channel (RACH) through which an initial control message is transmitted and an uplink shared channel (SCH) through which user traffic or a control message is transmitted.

Logical channels that are placed over the transport channel and mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. A resource block is a resources allocation unit and includes a plurality of OFDM symbols and a plurality of subcarriers. Each subframe may use specific subcarriers of specific OFDM symbols (e.g., the first OFDM symbol) of a corresponding subframe for a physical downlink control channel (PDCCH), that is, an L1/L2 control channel. A transmission time interval (TTI) is a unit time for subframe transmission.

Figure 22:
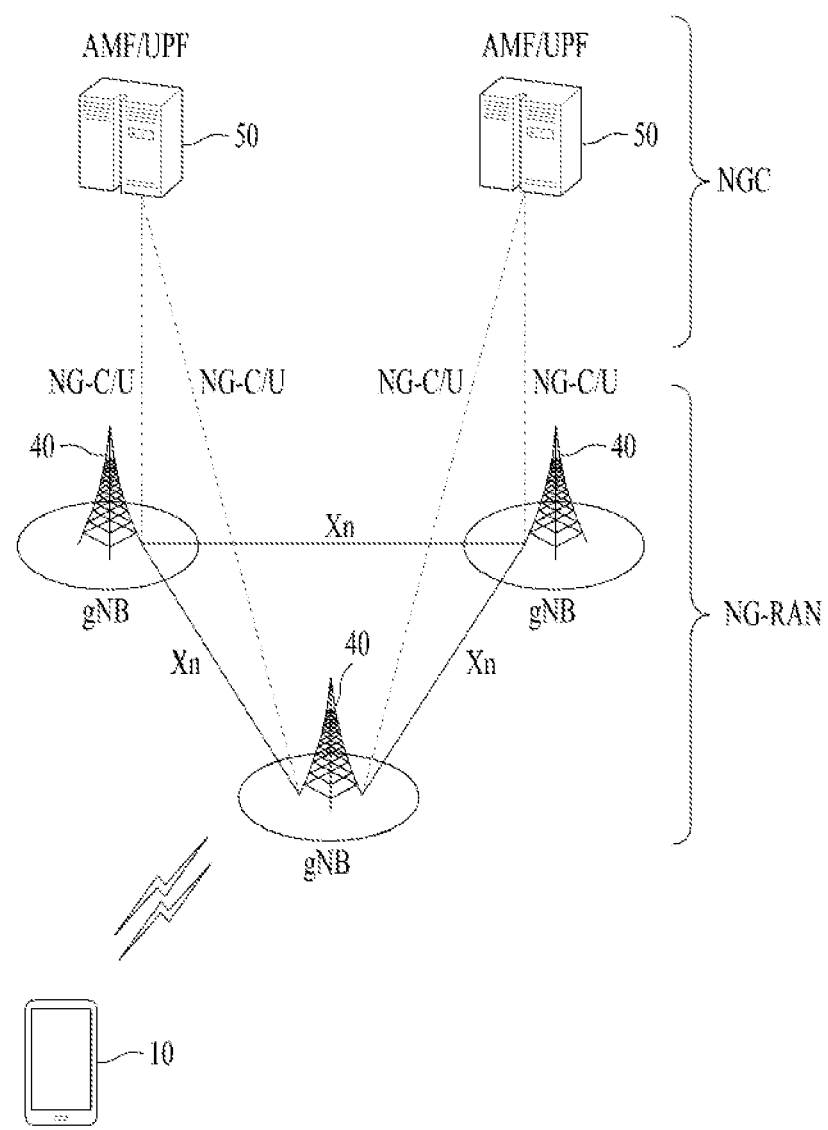
FIG. 22 discloses the structure of an NR system to which an example or implementation can be applied.

FIG. 22 illustrates the structure of an NR system to which embodiment(s) are applicable.

Referring to FIG. 22, a next generation radio access network (NG-RAN) may include a gNB and/or an eNB that provides user plane and control plane protocol terminations to a UE. FIG. 10 illustrates the case of including only gNBs. The gNB and the eNB are connected through an Xn interface. The gNB and the eNB are connected to a 5G core network (5GC) via an NG interface. More specifically, the gNB and the eNB are connected to an access and mobility management function (AMF) via an NG-C interface and connected to a user plane function (UPF) via an NG-U interface.

Figure 23:
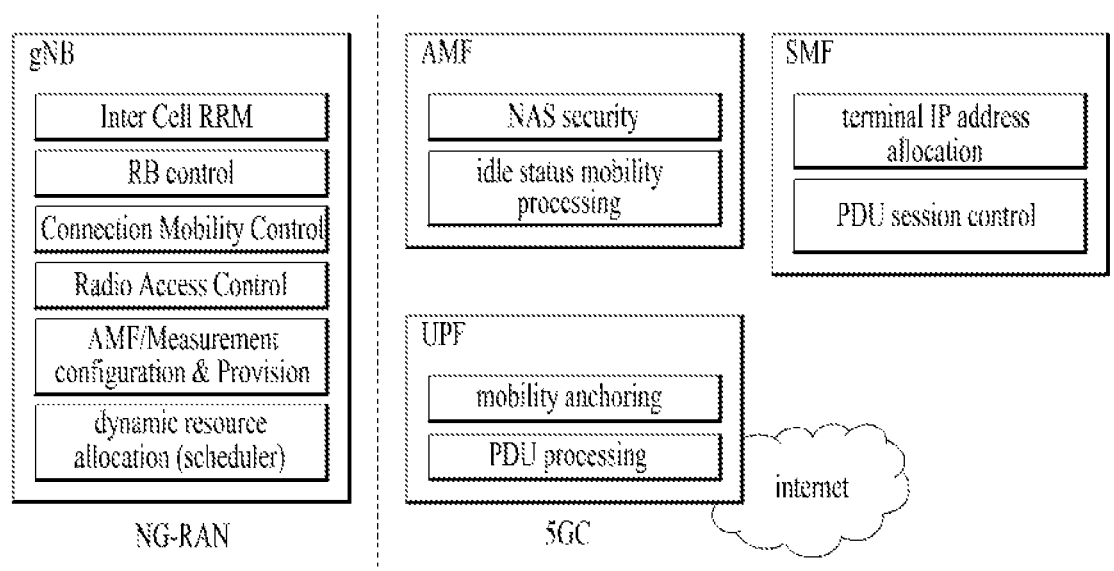
FIG. 23 discloses a functional division between NG-RAN and 5GC to which an example or implementation may be applied.

FIG. 23 illustrates functional split between an NG-RAN and a 5GC to which embodiment(s) are applicable.

Referring to FIG. 23, a gNB may provide functions, such as intercell radio resource management (RRM), RB control, connection mobility control, radio admission control, measurement configuration and provision, dynamic resource allocation, etc. An AMF may provide functions, such as NAS security, idle state mobility handling, etc. A UPF may provide functions, such as mobility anchoring, protocol data unit (PDU) handling, etc. A session management function (SMF) may provide functions, such as UE IP address allocation, PDU session control.

Figure 24:
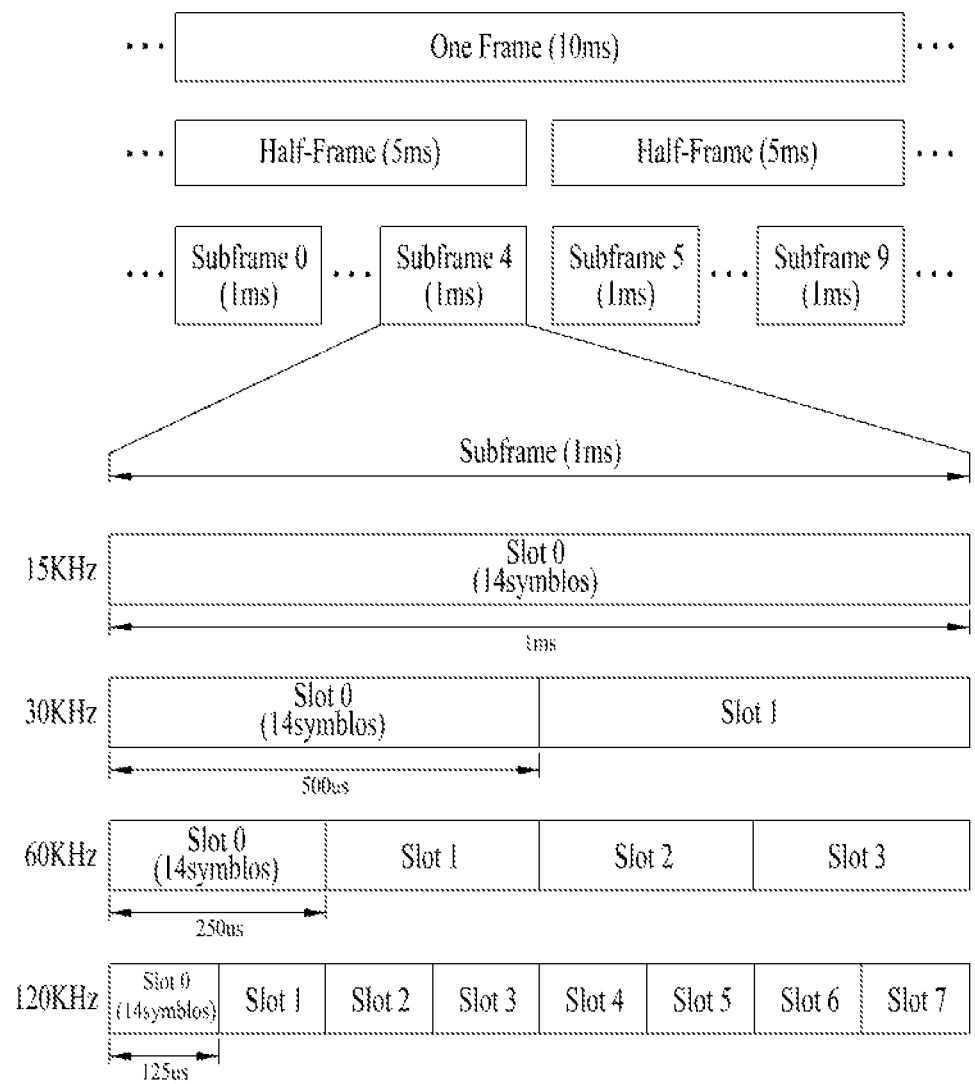
FIG. 24 discloses the structure of an NR radio frame to which an example or implementation can be applied.

FIG. 24 illustrates the structure of an NR radio frame to which embodiment(s) are applicable.

Referring to FIG. 24, a radio frame may be used for uplink and downlink transmission in NR. The radio frame is 10 ms long and may be defined as two half-frames (HFs), each 5 ms long. An HF may include 5 subframes (SFs), each 1 ms long. An SF may be split into one or more slots. The number of slots in the SF may be determined based on a subcarrier spacing (SCS). Each slot may include 12 or 14 OFDM(A) symbols depending on a cyclic prefix (CP).

When a normal CP is used, each slot may include 14 symbols. When an extended CP is used, each slot may include 12 symbols. Here, a symbol may include an OFDM symbol (or CP-OFDM symbol) or an SC-FDMA symbol (or DFT-s-OFDM symbol).

Table 1 below shows the number of symbols, $N^{slot}_{symb}$, per slot, the number of slots, $N^{frame,u}_{slot}$, per frame, and the number of slots, $N^{subframe,u}_{slot}$, per subframe according to SCS configuration $\mu$ when the normal CP is used.

TABLE 1

| SCS (15 * 2u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows the number of symbols per slot, the number of slots per frame, and the number of slots per subframe according to SCS when the extended CP is used.

TABLE 2

| SCS (15 * 2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, different OFDM(A) numerologies (e.g., SCSs and CP lengths) may be configured in a plurality of cells aggregated for one UE. Then, an (absolute time) duration of a time resource (e.g., a subframe, a slot, or a TTI) consisting of the same number of symbols (for convenience, referred to as a time unit (TU)) may be differently configured in the aggregated cells.

Figure 25:
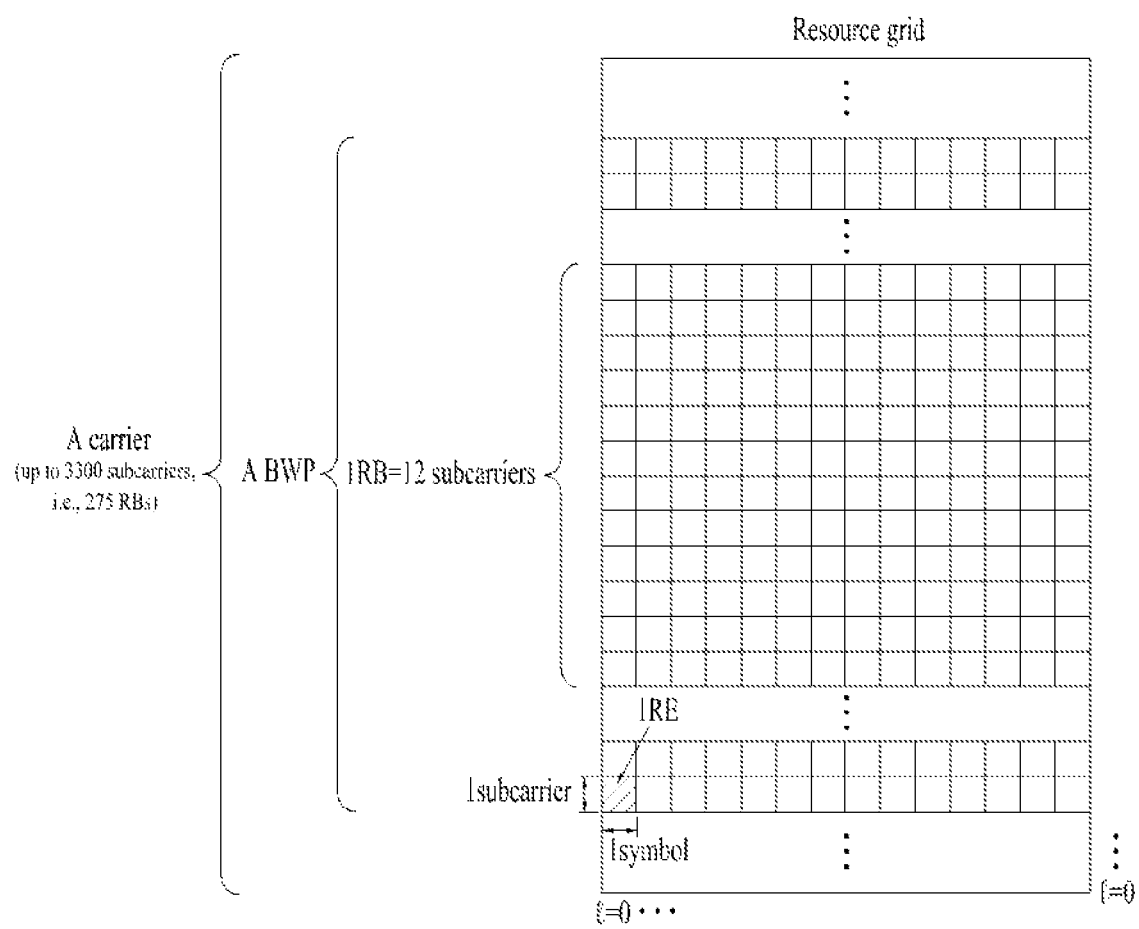
FIG. 25 discloses a slot structure of an NR frame to which an example or implementation can be applied.

FIG. 25 illustrates the structure of a slot of an NR frame to which embodiment(s) are applicable.

Referring to FIG. 25, a slot includes a plurality of symbols in the time domain. For example, one slot may include 14 symbols in the case of a normal CP and 12 symbols in the case of an extended CP. Alternatively, one slot may include 7 symbols in the case of the normal CP and 6 symbols in the case of the extended CP.

A carrier includes a plurality of subcarriers in the frequency domain. A resource block (RB) may be defined as a plurality of consecutive subcarriers (e.g., 12 subcarriers) in the frequency domain. A bandwidth part (BWP) may be defined as a plurality of consecutive (P)RBs in the frequency domain and correspond to one numerology (e.g., SCS or CP length). The carrier may include a maximum of N (e.g., 5) BWPs. Data communication may be performed through activated BWPs. Each element may be referred to as a resource element (RS) in a resource grid and one complex symbol may be mapped thereto.

Figure 26:
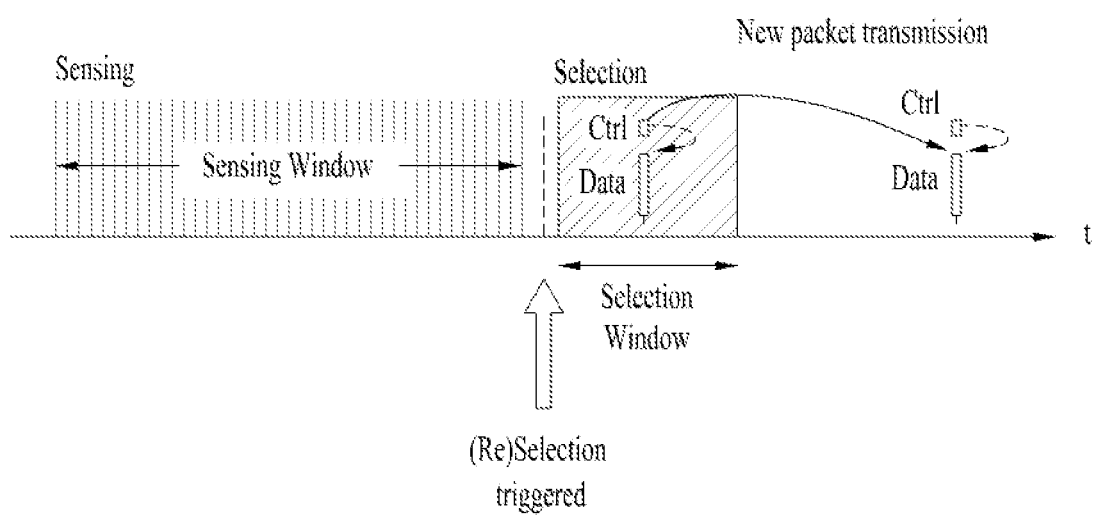
FIG. 26 discloses an example in which a transmission resource to which an example or implementation example can be applied is selected.

As illustrated in FIG. 26, a scheme of reserving a transmission resource of a subsequent packet may be used for transmission resource selection.

FIG. 26 illustrates an example of selecting a transmission resource to which embodiments(s) are applicable.

In V2X communication, two transmissions may be performed per MAC PDU. For example, referring to FIG. 26, during resource selection for initial transmission, a resource for retransmission may be reserved with a predetermined time gap. A UE may discern transmission resources reserved by other UEs or resources that are being used by other UEs through sensing within a sensing window and randomly select a resource having less interference from among resources that remain after excluding the resources that are reserved or being used by other UEs within a selection window.

For example, the UE may decode a physical sidelink control channel (PSCCH) including information about periodicity of the reserved resources within the sensing window and measure physical sidelink shared channel (PSSCH) reference signal received power (RSRP) on periodically determined resources based on the PSCCH. The UE may exclude resources on which PSSCH RSRP exceeds a threshold from resources that are selectable in the selection window. Next, the UE may randomly select a sidelink resource from among resources that remain within the selection window.

Alternatively, the UE may measure a received signal strength indicator (RSSI) of periodic resources within the sensing window to determine resources having less interference (e.g., resources having low interference corresponding to 20% or less). Then, the UE may randomly select a sidelink resource from resources included in the selection window among the periodic resources. For example, upon failing to decode the PSCCH, the UE may use this method.

FIG. 27 illustrates an example of transmitting a PSCCH in sidelink transmission mode 3 or 4 to which embodiment(s) are applicable.

In V2X communication, i.e., in sidelink transmission mode 3 or 4, a PSCCH and a PSSCH are transmitted through frequency division multiplexing (FDM) as opposed to sidelink communication. In V2X communication, since it is important to reduce latency in consideration of characteristics of vehicle communication, the PSCCH and the PSSCH may be transmitted through FDM on different frequency resources of the same time resource in order to reduce latency. Referring to FIG. 27, the PSCCH and the PSSCH may be non-adjacent as illustrated in (a) of FIG. 27 or may be adjacent as illustrated in (b) of FIG. 27. A basic unit of such transmission is a subchannel. The subchannel may be a resource unit having one or more RBs in size on the frequency axis on a predetermined time resource (e.g., time resource unit). The number of RBs included in the subchannel (i.e., the size of the subchannel and a start position of the subchannel on the frequency axis) may be indicated through higher layer signaling. An embodiment of FIG. 27 may also be applied to NR sidelink resource allocation mode 1 or 2.

Hereinafter, a cooperative awareness message (CAM) and a decentralized environmental notification message (DENM) will be described.

In V2V communication, a CAM of a periodic message type and a DENM of an event triggered message type may be transmitted. The CAM may include basic vehicle information, including vehicle dynamic state information such as direction and speed, vehicle static data such as dimension, an external light state, and a path history. The size of the CAM may be 50 to 300 bytes. The CAM may be broadcast and latency should be less than 100 ms. The DENM may be a message generated during an unexpected situation such as breakdown or accident of a vehicle. The size of the DENM may be shorter than 3000 bytes and all vehicles in the range of message transmission may receive the DENM. The DENM may have a higher priority than the CAM.

Hereinafter, carrier reselection will be described.

Carrier reselection for V2X/sidelink communication may be performed in a MAC layer based on a channel busy ratio (CBR) of configured carriers and a ProSe-per-packet priority (PPPP) of a V2X message to be transmitted.

The CBR may mean the portion of subchannels in a resource pool, sidelink RSSI (S-RSSI) of which measured by a UE is sensed as exceeding a preset threshold. There may be PPPP related to each logical channel. The value of PPPP should be set in consideration of latency required by both a UE and a BS. During carrier reselection, the UE may select one or more carriers from among candidate carriers in ascending order from the lowest CBR.

Hereinafter, physical layer processing will be described.

A data unit to which embodiment(s) are applicable may be a target of physical layer processing in a transmitting side before the data unit is transmitted through a radio interface. A radio signal carrying the data unit to which embodiment(s) are applicable may be a target of physical layer processing at a receiving side.

Figure 28:
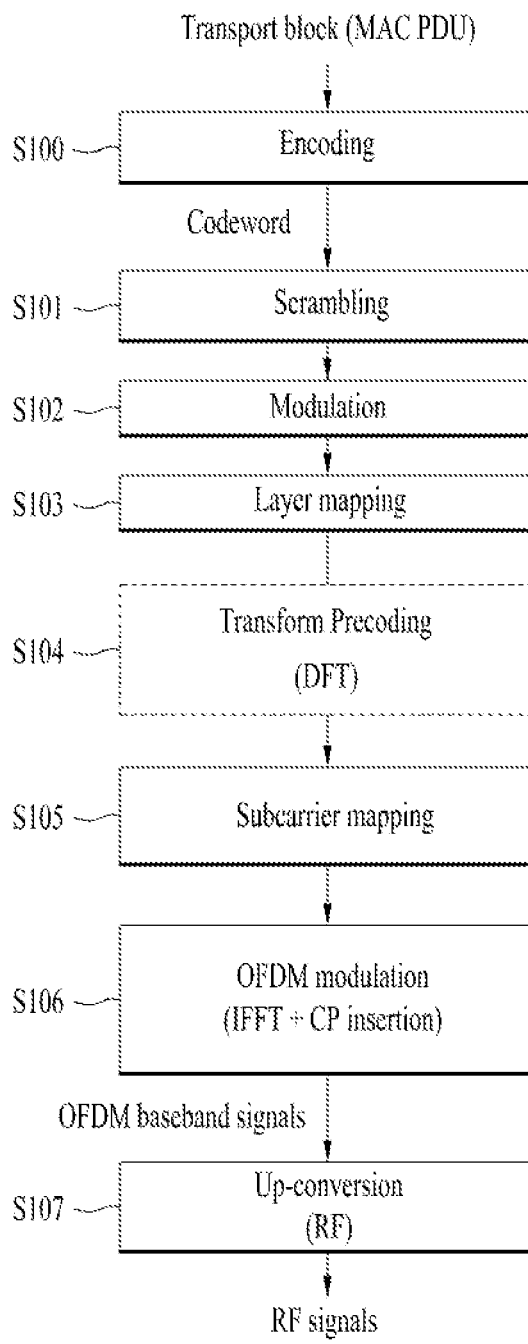
FIG. 28 discloses an example of physical layer processing at the transmission side to which an example or implementation is applied.

FIG. 28 illustrates an example of physical processing at a transmitting side to which embodiment(s) are applicable.

Table 3 shows a mapping relationship between an uplink transport channel and a physical channel and Table 4 shows a mapping relationship between uplink control channel information and a physical channel.

TABLE 3

| Transport Channel | Physical Channel |
| --- | --- |
| UL-SCH | PUSCH |
| RACH | PRACH |

TABLE 4

| Control Information | Physical Channel |
| --- | --- |
| UCI | PUCCH, PUSCH |

Table 5 shows a mapping relationship between a downlink transport channel and a physical channel and Table 6 shows a mapping relationship between downlink control channel information and a physical channel.

TABLE 5

| Transport Channel | Physical Channel |
| --- | --- |
| DL-SCH | PDSCH |
| BCH | PBCH |
| PCH | PDSCH |

TABLE 6

| Control Information | Physical Channel |
| --- | --- |
| DCI | PDCCH |

Table 7 shows a mapping relationship between a sidelink transport channel and a physical channel and Table 8 shows a mapping relationship between sidelink control channel information and a physical channel.

TABLE 7

| Transport Channel | Physical Channel |
| --- | --- |
| SL-SCH | PSSCH |
| SL-BCH | PSBCH |

TABLE 8

| Control Information | Physical Channel |
| --- | --- |
| SCI | PSCCH |

Referring to FIG. 28, the transmitting side may perform encoding on a transport block (TB) in step S100. Data and a control stream from a MAC layer may be encoded to provide transport and control services through a radio transmission link in a physical layer. For example, the TB from the MAC layer may be encoded to a codeword at the transmitting side. A channel coding scheme may be a combination of error detection, error correction, rate matching, interleaving, and control information or a transport channel separated from the physical channel. Alternatively, the channel coding scheme may be a combination of error detection, error correction, rate matching, interleaving, and control information or a transport channel mapped to the physical channel.

In an NR LTE system, the following channel coding scheme may be used for different types of transport channels and different types of control information. For example, the channel coding scheme for each transport channel type may be listed in Table 9. For example, the channel coding scheme for each control information type may be listed in Table 10.

TABLE 9

| Transport Channel | Channel Coding Scheme |
| --- | --- |
| UL-SCH | LDPC (Low Density Parity Check) |
| DL-SCH | |
| SL-SCH | |
| PCH | |
| BCH | Polar code |
| SL-BCH | |

TABLE 10

| Control Information | Channel Coding Scheme |
| --- | --- |
| DCI | Polar code |
| SCI | |
| UCI | Block code, Polar code |

For transmission of the TB (e.g., MAC PDU), the transmitting side may attach a cyclic redundancy check (CRC) sequence to the TB. Therefore, the transmitting side may provide error detection to the receiving side. In sidelink communication, the transmitting side may be a transmitting UE and the receiving side may be a receiving UE. In the NR system, a communication device may use an LDPC code to encode/decode an uplink (UL)-SCH and a downlink (DL)-SCH. The NR system may support two LDPC base graphs (i.e., two LDPC base matrices). The two LDPC base graphs may be LDPC base graph 1 optimized for a small TB and LDPC base graph 2 optimized for a large TB. The transmitting side may select LDPC base graph 1 or 2 based on the size of the TB and a code rate R. The code rate may be indicated by a modulation and coding scheme (MCS) index I_MCS. The MCS index may be dynamically provided to the UE by a PDCCH that schedules a PUSCH or a PDSCH. Alternatively, the MCS index may be dynamically provided to the UE by a PDCCH that (re)initializes or activates UL configured grant 2 or DL semi-persistent scheduling (SPS). The MCS index may be provided to the UE by RRC signaling related to UL configured grant type 1. If the TB to which the CRC is attached is greater than a maximum code block size for the selected LDPC base graph, the transmitting side may segment the TB to which the CRC is attached into a plurality of code blocks. The transmitting side may attach an additional CRC sequence to each code block. A maximum code block size for LDPC base graph 1 and a maximum code block size for LDPC base graph 2 may be 8448 bits and 3480 bits, respectively. If the TB to which the CRC is attached is not greater than the maximum code block size for the selected LDPC base graph, the transmitting side may encode the TB to which the CRC is attached using the selected LDPC base graph. The transmitting side may encode each code block of the TB using the selected LDPC base graph. LDPC coded blocks may be individually rate-matched. Code block concatenation may be performed to generate a codeword for transmission on the PDSCH or the PUSCH. For the PDSCH, a maximum of two codewords (i.e., a maximum of two TBs) may be simultaneously transmitted on the PDSCH. The PUSCH may be used to transmit UL-SCH data and layer 1 and/or 2 control information. Although not illustrated in FIG. 17, the layer 1 and/or 2 control information may be multiplexed with a codeword for the UL-SCH data.

In steps S101 and S102, the transmitting side may perform scrambling and modulation for the codeword. Bits of the codeword may be scrambled and modulated to generate a block of complex-valued modulation symbols.

In step S103, the transmitting side may perform layer mapping. The complex-valued modulation symbols of the codeword may be mapped to one or more multiple input multiple output (MIMO) layers. The codeword may be mapped to a maximum of 4 layers. The PDSCH may carry two codewords and thus the PDSCH may support up to 8-layer transmission. The PUSCH may support a single codeword and thus the PUSCH may support up to 4-layer transmission.

In step S104, the transmitting side may perform transform precoding. A DL transmission waveform may be a normal CP-OFDM waveform. Transform precoding (i.e., discrete Fourier transform (DFT)) may not be applied to DL.

A UL transmission waveform may be legacy OFDM using a CP having a transform precoding function performing DFT spreading, which may be disabled or enabled. In the NR system, if the transform precoding function is enabled on UL, transform precoding may be selectively applied. Transform precoding may spread UL data in a special manner in order to reduce a peak-to-average power ratio (PAPR) of a waveform. Transform precoding may be one type of DFT. That is, the NR system may support two options for a UL waveform. One option may be CP-OFDM (which is the same as a DL waveform) and the other option may be DFT spread OFDM (DFT-s-OFDM). Whether the UE should use CP-OFDM or DFT-s-OFDM may be determined by the BS through an RRC parameter.

In step S105, the transmitting side may perform subcarrier mapping. A layer may be mapped to an antenna port. On DL, transparent manner (non-codebook-based) mapping may be supported for layer-to-antenna port mapping. How beamforming or MIMO precoding is performed may be transparent to the UE. On UL, both non-codebook-based mapping and codebook-based mapping may be supported for antenna port mapping.

For each antenna port (i.e., layer) used for transmission of a physical channel (e.g., a PDSCH, a PUSCH, or a PSSCH), the transmitting side may map complex-valued modulation symbols to subcarriers in an RB allocated to the physical channel.

In step S106, the transmitting side may perform OFDM modulation. A communication device of the transmitting side may generate a subcarrier spacing configuration u for a time-continuous OFDM baseband signal on an antenna port p and an OFDM symbol 1 in a TTI for the physical channel by adding the CP and performing inverse fast Fourier transform (IFFT). For example, the communication device of the transmitting side may perform IFFT on a complex-valued modulation symbol mapped to an RB of a corresponding OFDM symbol with respect to each OFDM symbol. The communication device of the transmitting side may add the CP to an IFFT signal in order to generate the OFDM baseband signal.

In step S107, the transmitting side may perform up-conversion. The communication device of the transmitting side may perform up-conversion on the OFDM baseband signal for the antenna port p, the subcarrier spacing configuration u, and the OFDM symbol into a carrier frequency f0 of a cell to which the physical channel is allocated.

Figure 44:
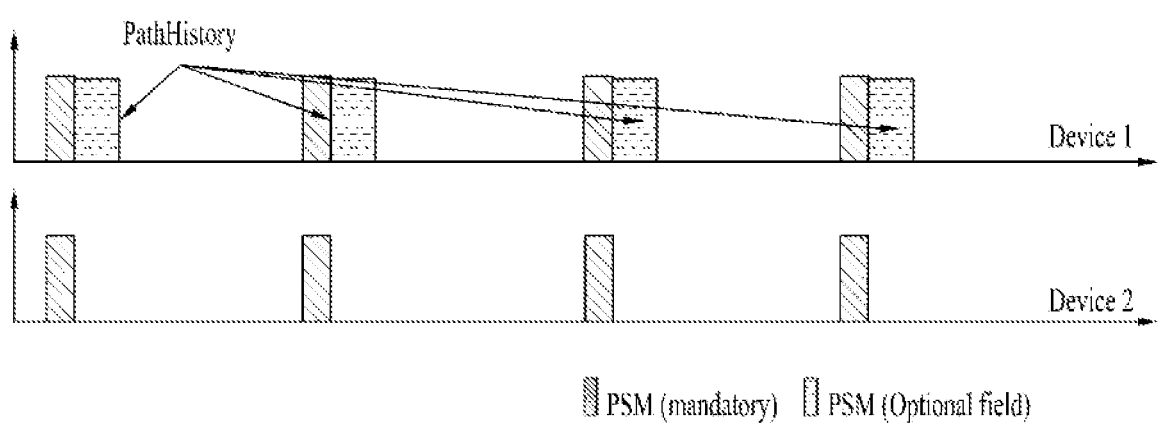

Processors 102 and 202 of FIG. 44 may be configured to perform encoding, scrambling, modulation, layer mapping, transform precoding (on UL), subcarrier mapping, and OFDM modulation.

Figure 29:
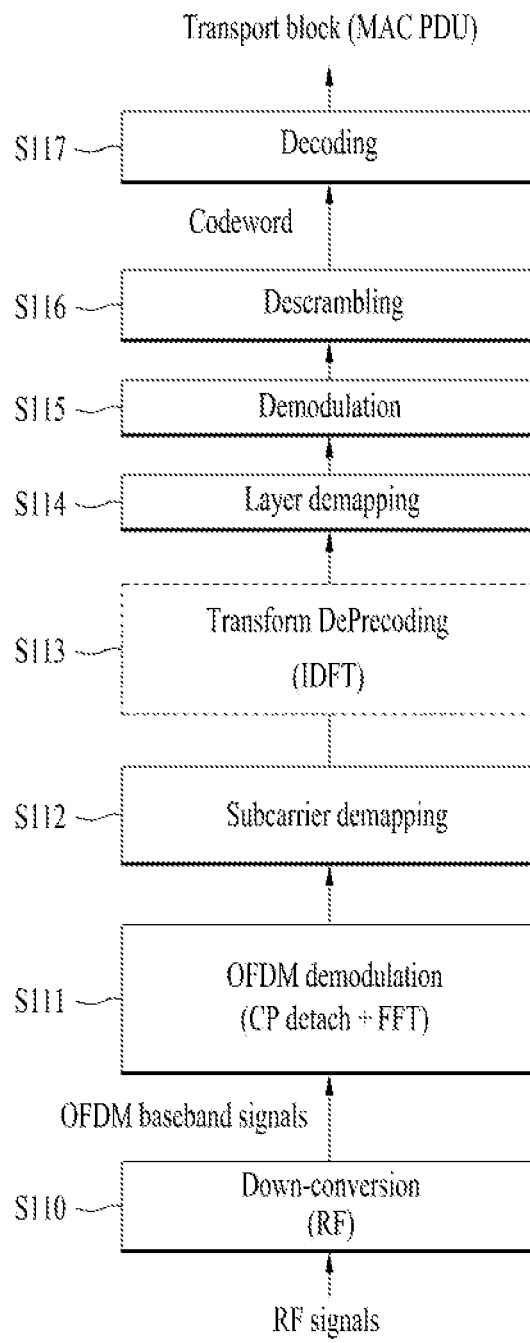
FIG. 29 discloses an example of physical layer processing at the receiving side to which an example or implementation is applied.

FIG. 29 illustrates an example of physical layer processing at a receiving side to which embodiment(s) are applicable.

Physical layer processing at the receiving side may be basically the reverse of physical layer processing at the transmitting side.

In step S110, the receiving side may perform frequency down-conversion. A communication device of the receiving side may receive an RF signal of a carrier frequency through an antenna. Transceivers 9013 and 9023 for receiving the RF signal in the carrier frequency may down-convert the carrier frequency of the RF signal into a baseband signal in order to obtain an OFDM baseband signal.

In step S111, the receiving side may perform OFDM demodulation. The communication device of the receiving side may acquire a complex-valued modulation symbol through CP detachment and FFT. For example, the communication device of the receiving side may detach a CP from the OFDM baseband signal with respect to each OFDM symbol. The communication device of the receiving side may perform FFT on the CP-detached OFDM baseband signal in order to acquire the complex-valued modulation symbol for an antenna port p, a subcarrier spacing u, and an OFDM symbol 1.

In step S112, the receiving side may perform subcarrier demapping. Subcarrier demapping may be performed on the complex-valued modulation symbol in order to acquire a complex-valued modulation symbol of a corresponding physical channel. For example, the processor of the UE may acquire a complex-valued modulation symbol mapped to a subcarrier belonging to a PDSCH among complex-valued modulation symbols received in a bandwidth part (BWP).

In step S113, the receiving side may perform transform deprecoding. If transform precoding is enabled with respect to a UL physical channel, transform deprecoding (e.g., inverse discrete Fourier transform (IDFT)) may be performed on a complex-valued modulation symbol of the UL physical channel. Transform deprecoding may not be performed on a DL physical channel and a UL physical channel for which transform precoding is disabled.

In step S114, the receiving side may perform layer demapping. A complex-valued modulation symbol may be demapped to one or two codewords.

In steps S115 and S116, the receiving side may perform demodulation and descrambling, respectively. A complex-valued modulation symbol of a codeword may be demodulated and may be descrambled to a bit of the codeword.

In step S117, the receiving side may perform decoding. A codeword may be decoded to a TB. For a UL-SCH and a DL-SCH, LDPC base graph 1 or 2 may be selected based on the size of a TB and a code rate R. The codeword may include one or multiple coded blocks. Each coded block may be decoded to a code block to which a CRC is attached or a TB to which the CRC is attached using the selected LDPC base graph. If the transmitting side performs code block segmentation on the TB to which the CRC is attached, a CRC sequence may be eliminated from each of code blocks to which the CRC is attached and code blocks may be acquired. A code block may be concatenated to the TB to which the CRC is attached. A TB CRC sequence may be detached from the TB to which the CRC is attached and then the TB may be acquired. The TB may be transmitted to a MAC layer.

The processors 102 and 202 of FIG. 44 may be configured to perform OFDM demodulation, subcarrier demapping, layer demapping, demodulation, descrambling, and decoding.

In physical layer processing at the transmitting/receiving side described above, time and frequency domain resource related to subcarrier mapping (e.g., an OFDM symbol, a subcarrier, or a carrier frequency), and OFDM modulation and frequency up/down-conversion may be determined based on resource allocation (e.g., UL grant or DL allocation).

Hereinafter, synchronization acquisition of a sidelink UE will be described.

In a time division multiple access (TDMA) and frequency division multiples access (FDMA) system, accurate time and frequency synchronization is essential. If time and frequency synchronization is not accurately established, system performance may be deteriorated due to inter-symbol interference (ISI) and inter-carrier interference (ICI). This is equally applied even to V2X. For time/frequency synchronization in V2X, a sidelink synchronization signal (SLSS) may be used in a physical layer and master information block-sidelink-V2X (MIB-SL-V2X) may be used in a radio link control (RLC) layer.

Figure 30:
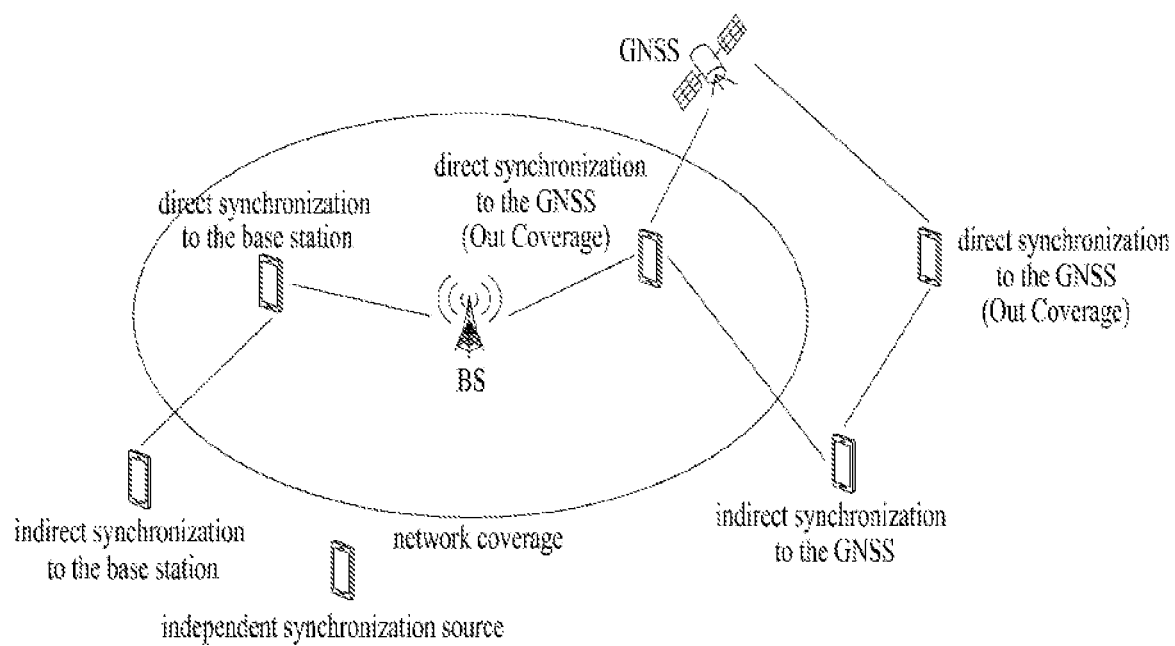
FIG. 30 discloses a synchronization source or synchronization reference in V2X to which an example or implementation is applied.

FIG. 30 illustrates a synchronization source or synchronization reference in V2X to which embodiment(s) are applicable.

Referring to FIG. 30, in V2X, a UE may be directly synchronized with a global navigation satellite system (GNSS) or may be indirectly synchronized with the GNSS through the UE (in network coverage or out of network coverage) that is directly synchronized with the GNSS. If the GNSS is configured as a synchronization source, the UE may calculate a direct frame number (DFN) and a subframe number using coordinated universal time (UTC) and a (pre)configured DFN offset.

Alternatively, the UE may be directly synchronized with a BS or may be synchronized with another UE that is synchronized in time/frequency with the BS. For example, the BS may be an eNB or a gNB. For example, when the UE is in network coverage, the UE may receive synchronization information provided by the BS and may be directly synchronized with the BS. Next, the UE may provide the synchronization information to adjacent another UE. If a timing of the BS is configured as the synchronization reference, the UE may conform to a cell related to a corresponding frequency (when the UE is in cell coverage in the frequency) or a primary cell or a serving cell (when the UE is out of cell coverage in the frequency), for synchronization and DL measurement.

The BS (e.g., serving cell) may provide a synchronization configuration for a carrier used for V2X/sidelink communication. In this case, the UE may conform to the synchronization configuration received from the BS. If the UE fails to detect any cell in the carrier used for V2X/sidelink communication and fails to receive the synchronization configuration from the serving cell, the UE may conform to a preset synchronization configuration.

Alternatively, the UE may be synchronized with another UE that has failed to directly or indirectly acquire the synchronization information from the BS or the GNSS. A synchronization source and a preference degree may be preconfigured for the UE. Alternatively, the synchronization source and the preference degree may be configured through a control message provided by the BS.

The sidelink synchronization source may be associated with a synchronization priority level. For example, a relationship between the synchronization source and the synchronization priority level may be defined as shown in Table 11. Table 11 is purely exemplary and the relationship between the synchronization source and the synchronization priority level may be defined in various manners.

TABLE 11

| Priority Level | GNSS-based Synchronization | eNB/gNB-based Synchronization |
|---|---|---|
| P0 | GNSS | eNB/gNB |
| P1 | All UEs directly synchronized with GNSS | All UEs directly synchronized with eNB/gNB |
| P2 | All UEs indirectly synchronized with GNSS | All UEs indirectly synchronized with eNB/gNB |
| P3 | All other UEs | GNSS |
| P4 | N/A | All UEs directly synchronized with GNSS |
| P5 | N/A | All UEs indirectly synchronized with GNSS |
| P6 | N/A | All other UEs |

Whether to use GNSS-based synchronization or eNB/gNB-based synchronization may be (pre)configured. In a single-carrier operation, the UE may derive a transmission timing thereof from an available synchronization reference having the highest priority.

Hereinafter, the BWP (Bandwidth Part) and the resource pool will be described.

If BA (Bandwidth Adaptation) is used, the reception bandwidth and transmission bandwidth of the terminal need not be as large as the bandwidth of the cell, and the reception bandwidth and transmission bandwidth of the terminal may be adjusted. For example, the network/base station may inform the terminal of bandwidth adjustment. For example, the terminal may receive information/configuration for bandwidth adjustment from the network/base station. In this case, the terminal may perform bandwidth adjustment based on the received information/configuration. For example, the bandwidth adjustment may include reducing/expanding the bandwidth, changing the location of the bandwidth, or changing the subcarrier spacing of the bandwidth.

For example, bandwidth may be reduced during periods of low activity to conserve power. For example, the location of the bandwidth may shift in the frequency domain. For example, the location of the bandwidth may be shifted in the frequency domain to increase scheduling flexibility. For example, subcarrier spacing of the bandwidth may be changed. For example, the subcarrier spacing of the bandwidth may be changed to allow for different services. A subset of the total cell bandwidth of a cell may be referred to as a BWP (Bandwidth Part). BA may be performed by the base station/network setting the BWP to the terminal, and notifying the terminal of the currently active BWP among the BWPs in which the base station/network is set.

Figure 31:
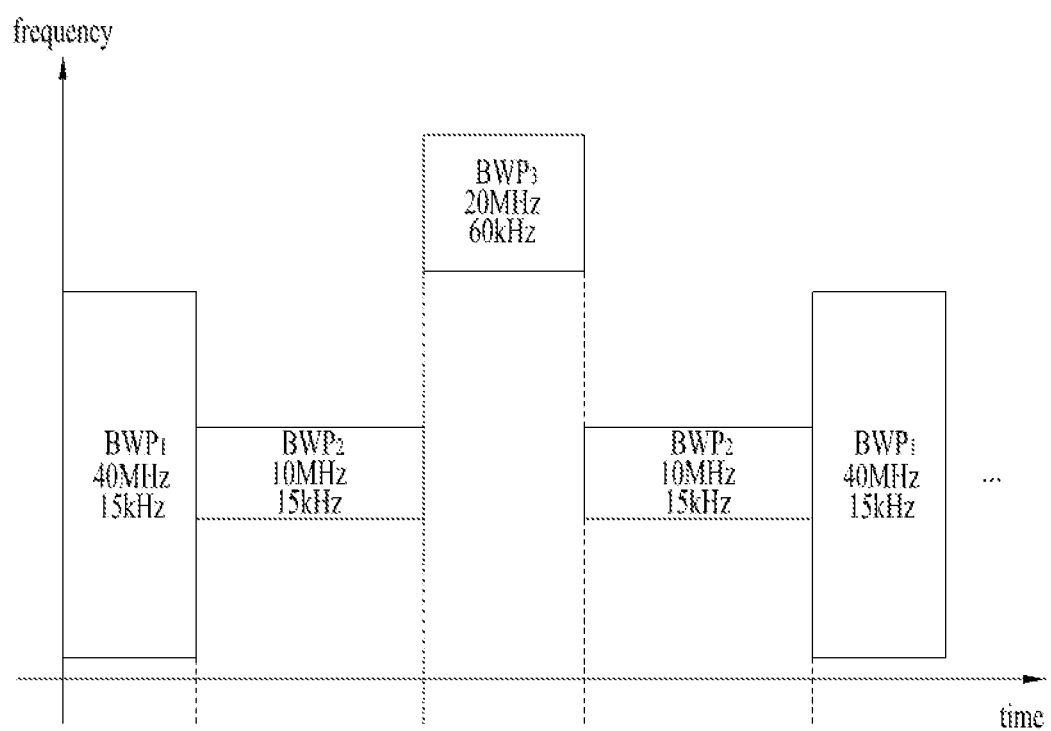
FIG. 31 discloses an example of a scenario in which a BWP to which an example or implementation is applied is set.

FIG. 31 discloses an example of a scenario in which a BWP to which an example or implementation example can be applied is set.

Referring to FIG. 31, BWP1 having a bandwidth of 40 MHz and subcarrier spacing of 15 kHz, BWP2 having a bandwidth of 10 MHz and subcarrier spacing of 15 kHz, and BWP3 having a bandwidth of 20 MHz and subcarrier spacing of 60 kHz may be configured.

BWP may be defined for sidelinks. The same sidelink BWP can be used for transmission and reception. For example, the transmitting terminal may transmit a sidelink channel or a sidelink signal on a specific BWP, and the receiving terminal may receive a sidelink channel or a sidelink signal on the specific BWP. In a licensed carrier, the sidelink BWP may be defined separately from the Uu BWP, and the sidelink BWP may have separate configuration signaling from the Uu BWP. For example, the terminal may receive the configuration for the sidelink BWP from the base station/network. The sidelink BWP may be configured (in advance) for the out-of-coverage NR V2X terminal and the RRC_IDLE terminal within the carrier. For a UE in RRC_CONNECTED mode, at least one sidelink BWP may be activated in a carrier.

A resource pool may be a set of time-frequency resources that may be used for sidelink transmission and/or sidelink reception. From the perspective of a terminal, a time domain resource in a resource pool may not be continuous. A plurality of resource pools may be set to a terminal in a single carrier (beforehand).

In order to solve an existing problem of VRU terminals that operate separately, the present disclosure relates to a system of providing a VRU public safety service through a Uu interface. In order to improve the existing problem of VRU terminals that operate separately, a system is disclosed which informs each VRU of risk factors (elements) through an Uu interface in each specific zone where a hazard is anticipated. As information is provided which a VRU (or a VRU terminal) in each specific zone is expected to be aware of, the VRU terminal may advise a user walking in the zone to avoid a dangerous area or alert the user by notifying a public safety message. Furthermore, the public safety service controls an operation of a VRU terminal to more actively operate transmission of the VRU terminal or a corresponding V2X device, thereby efficiently supporting VRU safety.

[Configuration of Device]

Figure 32:
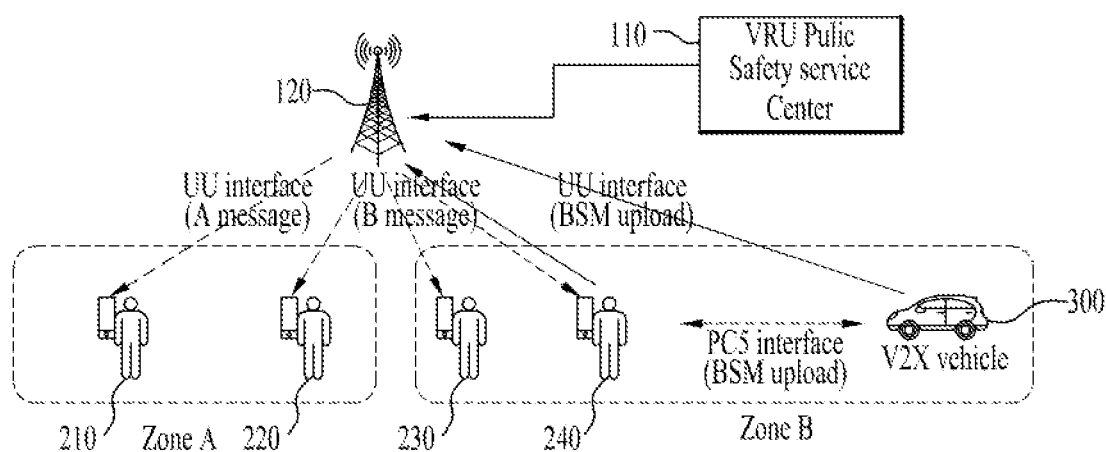
FIG. 32 discloses a configuration of a system providing a VRU public safety service.

FIG. 32 discloses a configuration of a system providing a VRU public safety service according to the present disclosure. The system may be composed of a VRU public safety service center 110 and VRU terminals 210, 220, 230 and 240, which are capable of a public safety service. Unless stated otherwise, a center may mean the VRU public safety service center. The center 110 and the VRU terminals may be connected via a Uu interface and are connected via eNB 120. In order to provide a safety service to a VRU in real time, the center may receive a BSM directly from a vehicle 300 running nearby via the Uu interface, or a VRU receiving information via a PC5 interface may deliver the information to the center via the Uu interface.

[Embodiment: Zone-Based VRU Public Safety Guidance]

Figure 33:
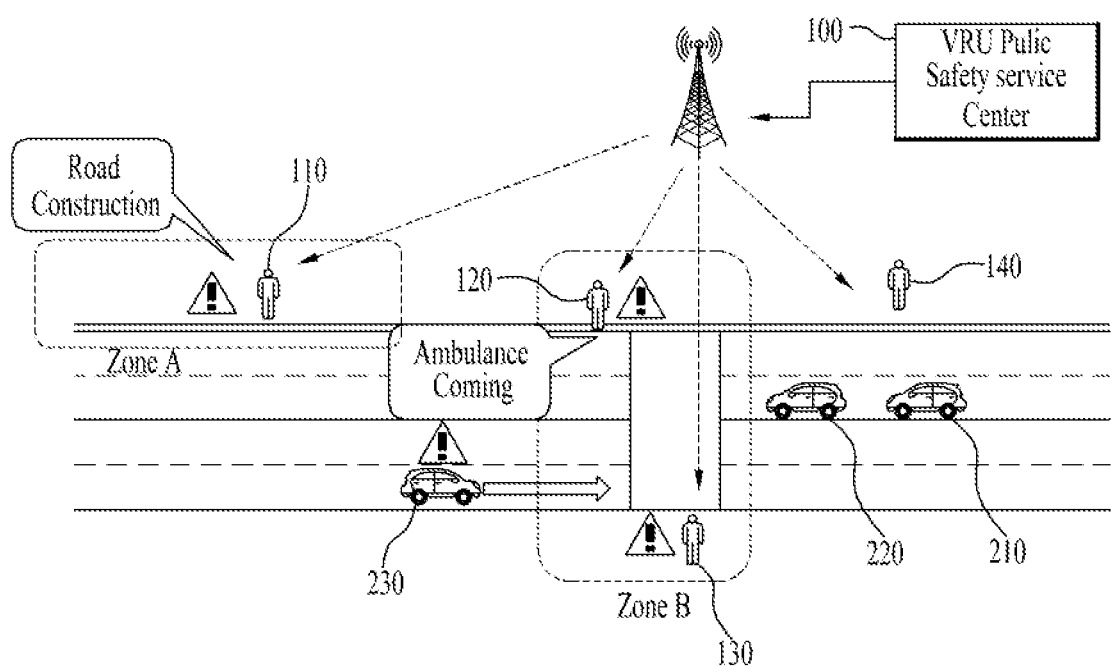
FIG. 33 illustrates an example of a VRU public safety service.

FIG. 33 illustrates an example of a VRU public safety service. A center providing the VRU public safety service may receive information on an ambulance in operation or information on a construction site in advance from a system such as a national safety network or the Ministry of Land, Infrastructure and Transport. Using the information, the center may provide a safety service to a VRU in a corresponding zone via a Uu interface. For example, when a sidewalk in Zone A is under construction, the VRU public safety service center may transmit information on the construction site to a VRU 110 which is running in a neighboring zone. Alternatively, since an emergency vehicle 230 like an ambulance, a fire engine and a patrol car may ignore a crosswalk signal, it may be a risk factor to a VRU. In order to protect a VRU, the center may provide a warning message for notifying the danger to a VRU in a zone where the emergency vehicle is running, so that the safety of the VRU waling in the zone may be ensured. Since a VRU 140 located outside the dangerous zone does not receive a specific message from the center 100, it may recognize the absence of a special issue nearby and use the information for walking.

[Operation of a Device]

Figure 34:
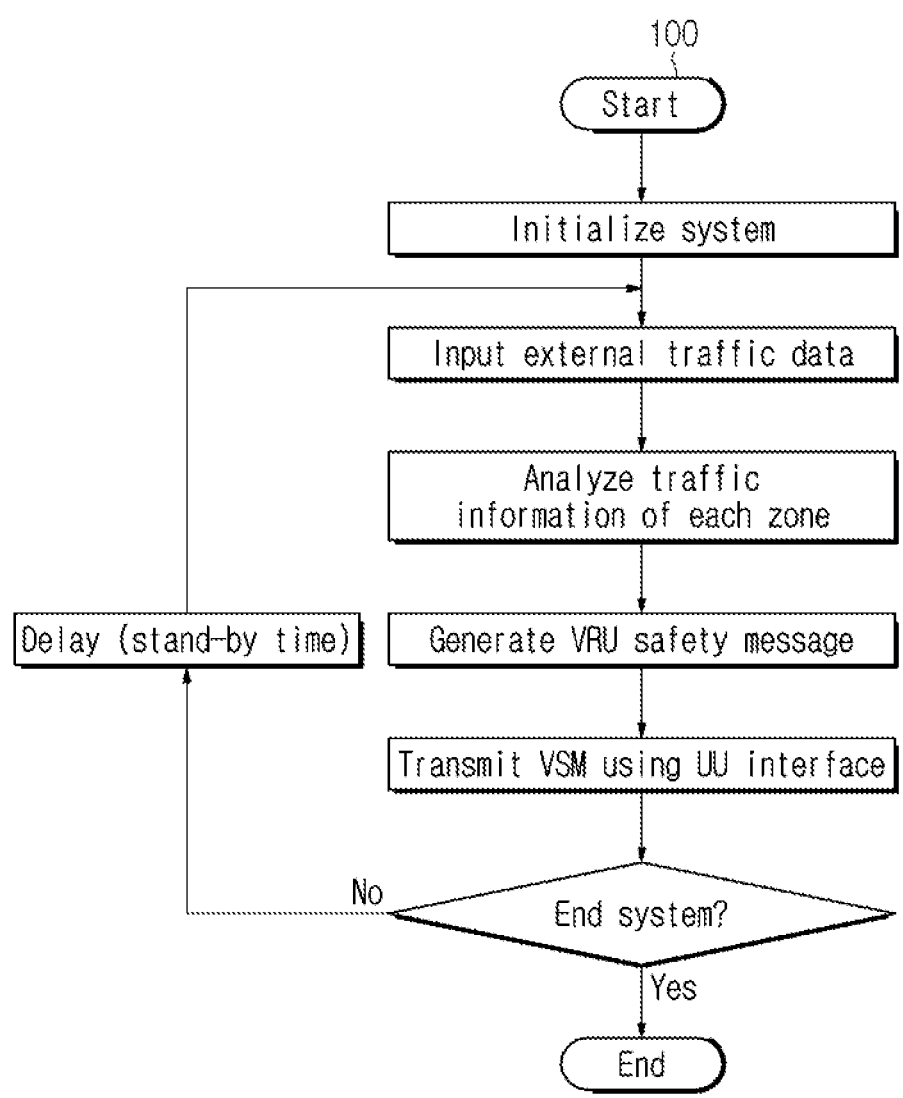
FIGS. 34 to 35 disclose an operation of a VRU public safety service center for a zone-based VRU public safety guidance service and an operation of a VRU terminal.
Figure 35:
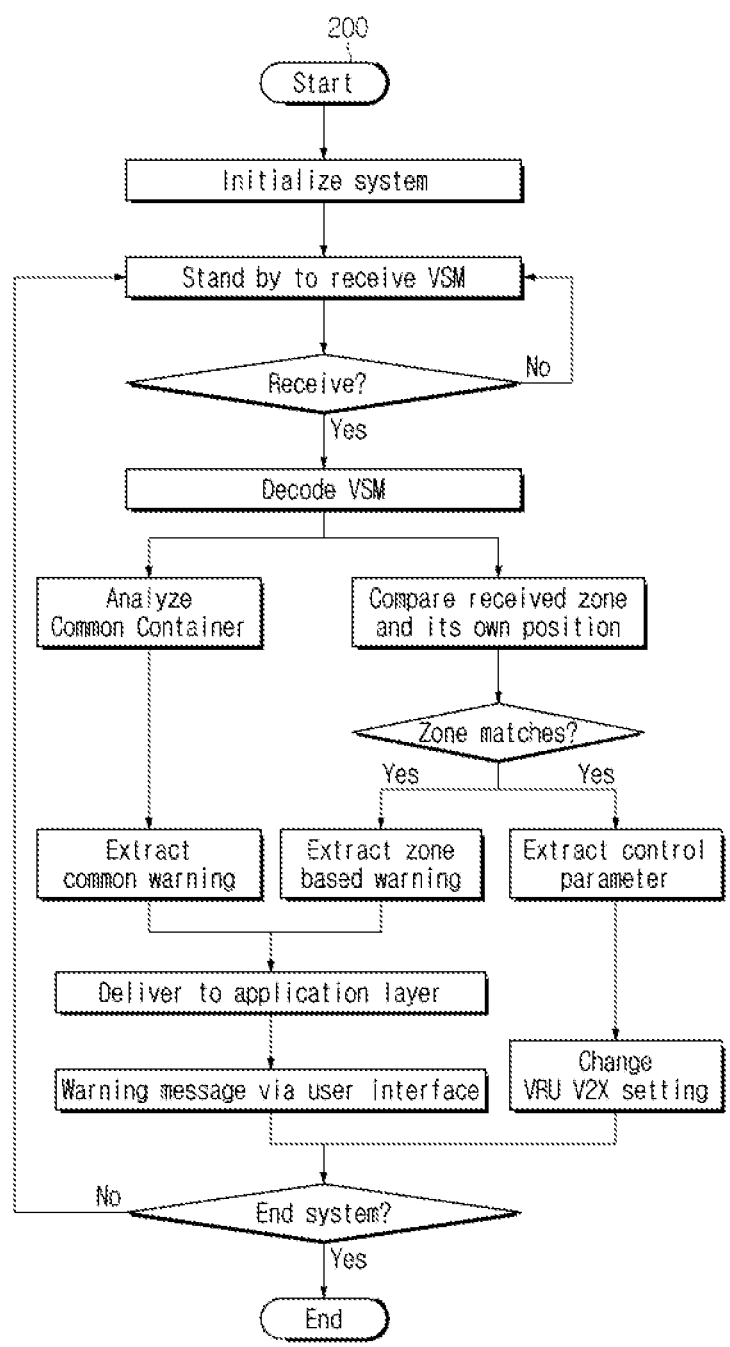

FIGS. 34 to 35 disclose an operation 100 of a VRU public safety service center for a regional VRU public safety guidance service and an operation 200 of a VRU terminal.

Referring to FIG. 34, the VRU public safety service center initializes a system. The center receives traffic information from an external road authority (RA). The center classifies traffic information according to zones. Based on this, the center generates a basic container, a common safety container, and a zone based safety container respectively and then finally generates a VRU safety message (VSM). The center transmits the VSM to a VRU terminal via an Uu interface. The system stands by during a VSM transmission period, and an operation of updating external traffic information again may be performed.

Referring to FIG. 35, a VRU terminal performs an initializing operation of a system of a device when the system starts. The VRU terminal stands by to receive a VSM using a V2X communication modem. The VRU terminal receives and decodes the VSM. The VRU terminal extracts a message from a common safety container, delivers the message to an application layer and warns a user of the VRU terminal of a danger through a user interface. When a zone based container exists in a VSM, the VRU terminal compares a received position of a zone and a position of a VRU. In case the VRU terminal is included in the zone, the VRU terminal extracts a zone based warning, delivers it to an application layer and gives warning to the VRU via the user interface. Furthermore, the VRU terminal may modify a setting of a VRU V2X by extracting a control parameter.

[Zone Setting Technique]

FIG. 36 illustrates an example of a method of expressing a zone. FIG. 36 may be two examples of expressing a zone. ZoneType of a VSM, ZonePointA and ZonePointB may be used to express a zone. In the case of ZoneType=1, a zone is expressed as a rectangular type, that is, a rectangular shape. ZonePointA and ZonePointB represent points of a rectangle. Meanwhile, in the case of ZoneType=2, a zone is expressed as a circle type, that is, a circular shape. ZonePointA represents a center of circle, and ZonePointB has a value on the circle. For convenient expression, XB is set to a value equal to XA, and YB is set by using a value of YA-radius (r). Meanwhile, when YA of ZonePointA is equal to YB of ZonePointB, a zone may be known as a circle type, not a rectangular type. Thus, indication of zone type may be skipped.

[VSM Configuration]

Figure 37:
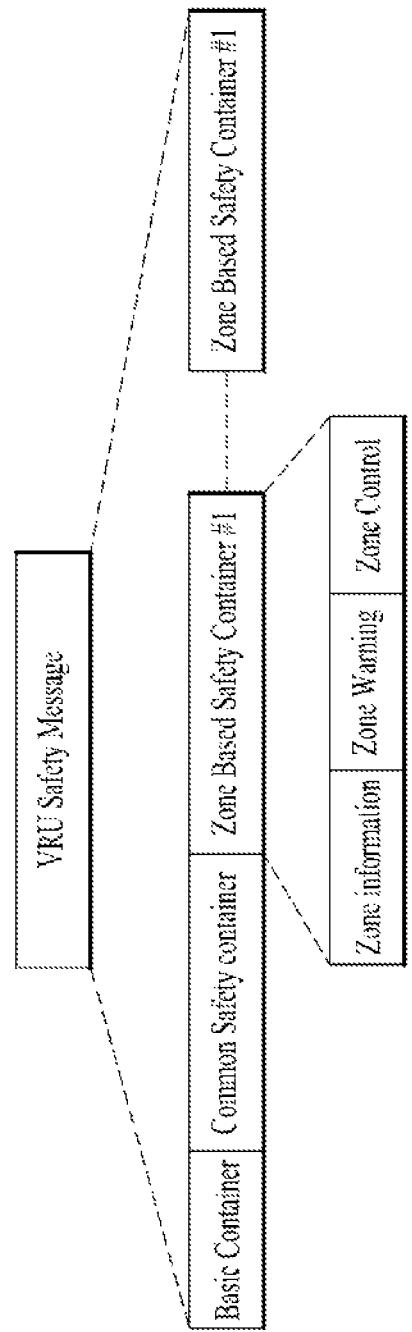

FIG. 37 shows a VSM configuration for an operation according to the present disclosure. In a VSM, there may be BasicContainer describing a basic feature, Common Container capable of warning every VRU and as many as 10 ZoneBasedSafetyContainers capable of of giving warnings according to zones.

The structure of ASN.1 message may be illustrated as in FIGS. 38 to 39. Referring to FIG. 38, BasicContainer consists of StationID identifying a center, MessageID identifying a message, and MessageGenTime notifying a message generation time. CommonSafetyContainer consists of WarningID identifying a safety warning, WarningCode representing a type of warning, and WarningSubCode capable of representing a further detailed warning. ZoneBasedSafetyContainer consists of ZoneID distinguishing zones to give a warning according to specific zones, ZoneType, ZonePointA and ZonePointB, which indicate zones, WarningCode and WarningSubCode, which notify a danger warning that occurs in a corresponding zone, and ControlType and ControlData capable of controlling a setting of a VRU terminal present in a corresponding zone.

[Setting Change Control of VRU Terminal]

As described above, a system is proposed which is capable of providing a suitable danger warning to a VRU according to zones through a VRU public safety service center. Additionally, for a more active response of a VRU, a method of controlling to change a setting of a V2X device of a VRU terminal is proposed. The control may be performed through ControlType and ControlData in a VSM. Furthermore, a method of adjustment in an application layer and a facility layer is proposed. Specifically, an AlwaysWakeUp control technique is disclosed which controls a power saving technique that turns on/off a system in the application layer. In addition, in the facility layer, a genTime control technique of adjusting a period of updating a message and a technique of controlling an optional field on/off when generating a message are proposed.

[AlwaysWakeUp Setting Change]

Figure 40:
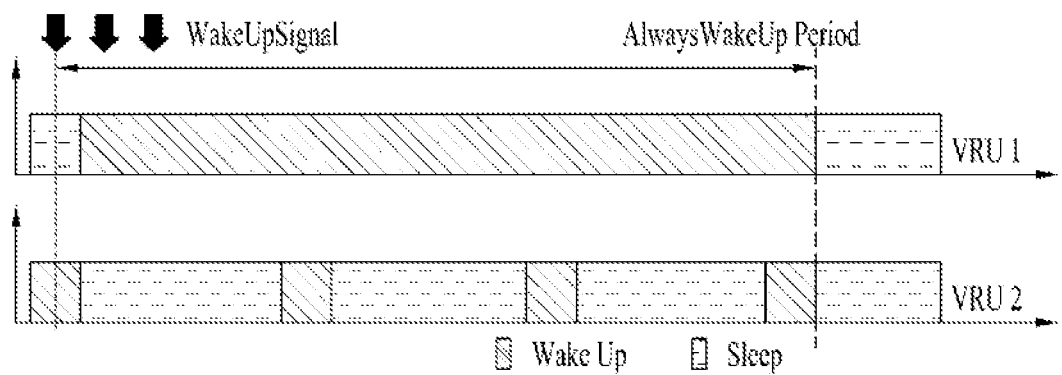
FIG. 40 is a view for explaining power saving control based on VSM.

When a fire engine passes a specific Zone A, a center warns a VRU waling nearby of a danger. Generally, a battery-powered VRU terminal periodically repeats Sleep & WakeUp for power saving. According to the present disclosure, a VRU terminal located in the dangerous Zone A may be set to stay continuously in a WakeUp state for a specific time without performing sleeping due to a power saving operation. FIG. 40 is a view for explaining power saving control based on VSM. It is assumed that VRU 1 is present in a dangerous zone and VRU 2 is outside the dangerous zone. A center transmits a code corresponding to PowerSaving in ControlType through ZoneControl container and transmits a time corresponding to AlwaysWakeUp period in ControlData. Thus, VRU 1 responds to a dangerous situation around it without sleeping for AlwaysWakeUp period. On the other hand, since VRU 2 is outside the dangerous zone, it repeats Sleep operation and WakeUp operation.

FIG. 41 is a view for explaining a configuration of ControlType and ControlData. For example, when ControlType is set to 201, a time of holding AlwaysWakeUp is notified to ControlData by means of a code that sets AlwaysWakeUp. The value may be in msecs, and the value may be set to 10,000 for example for stopping power saving for 10 seconds. When the danger stops during the service, the center transmits a 202 (AlwaysWakeUp release) signal as ControlType to end AlwaysWakeUp, thereby enabling the VRU terminal to hold power saving. In this case, no ControlData may be transmitted.

[MessageGenTime Setting Change]

In a facility layer, data is newly updated at a message generation interval. According to a conventional system, data of a message is updated at a fixed message generation interval that is internally set. However, according to the conventional system, a message generation interval may be set irrespective of a situation of VRU, which is problematic. Accordingly, the present disclosure proposes a method of changing MessageGenTime of a VRU terminal through ControlType and ControlData at a VRU public safety center. In the example of FIG. 42, when the center transmits 301 to ControlType and 100 to ControlData, the VRU terminal changes a genTime setting of an internal facility layer to 100 msec.

[PSM Optional Field Setting Change]

Figure 43:
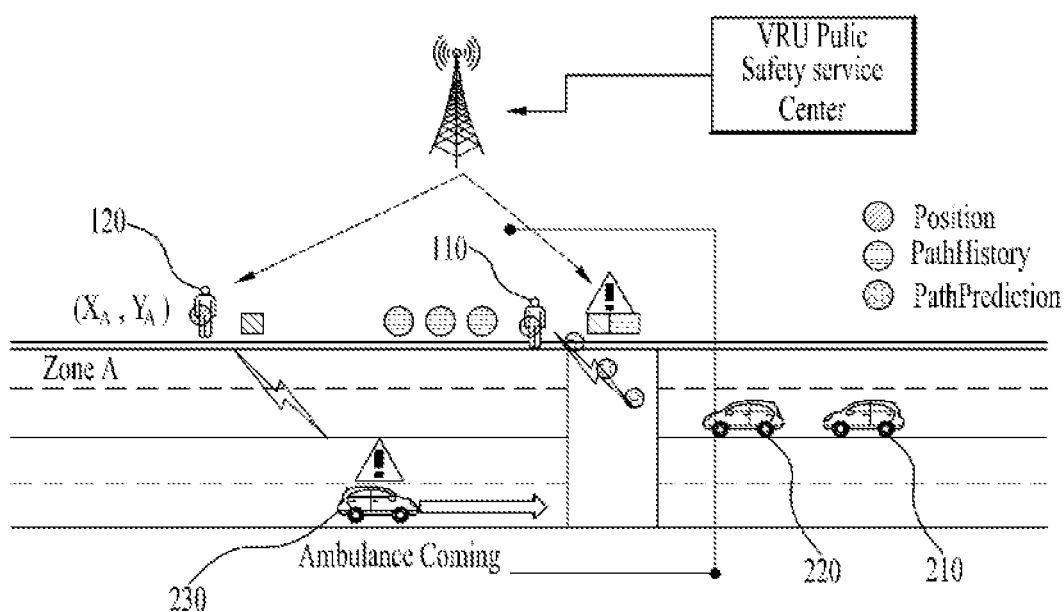
FIG. 43 is an example related to a controlling method for changing a setting of an optional field.

A facility layer generates a personal safety message (PSM). The PSM is composed of a mandate field and an optional field. The mandate filed is field that is mandatorily transmitted, while the optional field is generated and transmitted according to a situation of a VRU. FIG. 43 is an example related to a controlling method for changing a setting of an optional field. When an ambulance runs with urgency, it is desirable that a VRU 110 crossing at a crosswalk ahead of a VRU 120 receives more state information. For this, the VRU public safety service center may set a location, in which the ambulance is running, as a danger zone and control an optional field of VRU terminals present in the zone. Specifically, the center does not transmit an optional field but only Position (X, Y), which is a mandate field, to a terminal of the VRU 120 outside the danger zone. On the other hand, in order to track a moving path of the VRU 110 existing in the zone, the center may mandatorily transmit PathHistory and PathPrediction in the optional field, thereby enabling the ambulance to track a path of the VRU 110 ahead of it more easily.

FIG. 44 shows a transmission method with an optional field being on/off according to zones. VRUs are configured for periodical transmission through a PSM. In a message configuration, Device 2 (120 of FIG. 43) outside a zone transmits a mandatory field as default like in the conventional method and transmits an optional field when necessary. On the other hand, Device 1 (110 of FIG. 43) is operated to additionally transmit a PathHistory value of the optional field, when a PSM is generated later. Since the size of the PSM is changeable, in order to efficiently handle this, Device 1 internally delivers the size of the PSM so that a physical layer may be flexibly transmitted.

Meanwhile, for On/Off control of an optional field, a center configures ControlType and ControlData as illustrated in FIG. 45. When ControlType is 401, an optional field corresponding to a text value of ControlData is mandatorily generated to make OptionalField ON. On the other hand, when ControlType is 402, an optional field corresponding to a text value of ControlData is mandatorily generated to make OptionalField OFF. Meanwhile, when ControlType is 403, as a control message for ending an OptionalField control service, ControlData has a TimeOut value corresponding to a time of release. When controlData has a value of 0, the control is immediately ended to transmit an optional field in the conventional way. Meanwhile, when multiple optional fields are adjusted, the center sets as many ZoneBasedControlContainers as the number of optional fields and transmits the containers. In this case, zone configurations of two containers have a same value.

A method of receiving, by a terminal of a vulnerable road user (VRU), a signal in a wireless communication system according to the present disclosure may include: receiving a message related to a safety service of the VRU from a network; and outputting a warning message based on comparing a field defining a geographic area, in which the safety service is provided, in the message and a position of the terminal. In addition, the warning message may be output based on determining that the terminal exists within the geographical area.

Meanwhile, the field defining the geographic area may include a value related to a type or size of the geographic area.

Meanwhile, the message may include a field related to a wakeup setting of the terminal. In addition, based on the field related to the wakeup setting, the terminal may maintain a wakeup state for a predetermined time in the geographic area.

Meanwhile, the message may include a field that enables the terminal to modify a creation interval of a message for the safety of the VRU. In addition, based on the field for modifying the creation interval of the message, the terminal may create a message for the safety of the VRU in the geographic area at a modified creation interval.

The message may include a field that requests a moving path of the terminal. In addition, based on the field that requests the moving path, the terminal may transmit, to the network, a message including a position of the terminal within the geographic area, a moving path for a predetermined time or an expected moving path in the predetermined time.

A method of transmitting, by a network, a signal to a terminal in a wireless communication system according to the present disclosure may include: receiving traffic information in a preset geographic area from a server; and based on the traffic information, transmitting a message related to a safety service of a vulnerable road user (VRU) within the geographic area.

Meanwhile, the message may include a field defining the geographic area, and the field defining the geographic area may include a value related to a type or size of the geographic area.

Meanwhile, the message may include a field related to a wakeup setting of the terminal, and the field related to the wakeup setting may indicate that the terminal will maintain a wakeup state for a predetermined time in the geographic area.

Meanwhile, the message may include a field that enables the terminal to modify a creation interval of a message for safety of the VRU, and the field for modifying the creation interval of the message may indicate that the terminal will create the message for safety of the VRU in the geographic area at a modified creation interval.

Meanwhile, the message may include a field that requests a moving path of the terminal, and the field, which requests the moving path, may indicate that the terminal will transmit a message including a position of the terminal within the geographic area, a moving path for a predetermined time or an expected moving path after the predetermined time.

Hereinafter, an apparatus to which an example or implementation example may be applied will be described.

Figure 46:
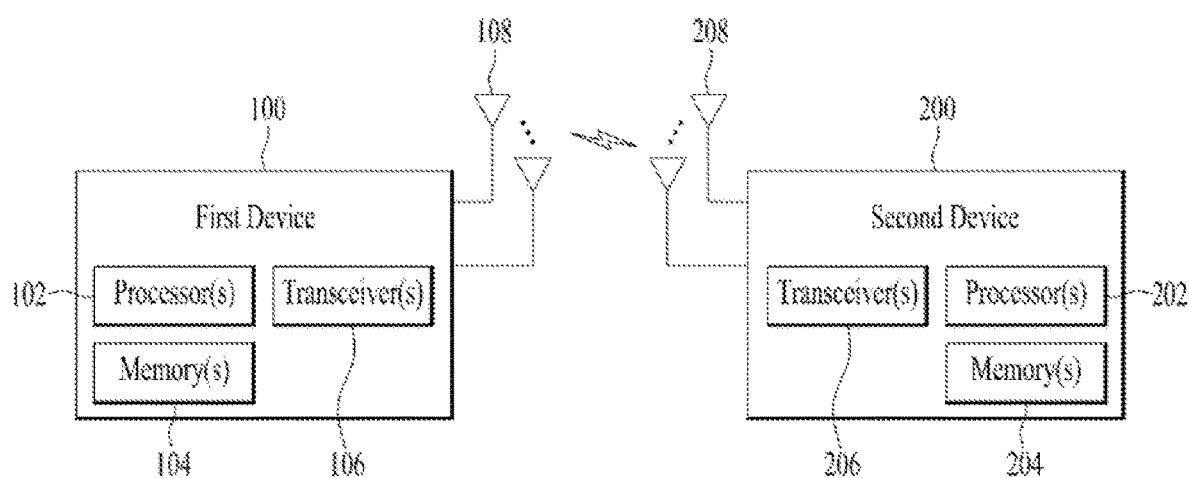
FIG. 46 to FIG. 47 disclose a wireless communication device according to an example or implementation.

FIG. 46 illustrates a wireless device that may be applied to an example or implementation. Referring to FIG. 46, the first wireless device 100 and the second wireless device 200 may transmit/receive wireless signals through various wireless access technologies (e.g, LTE, NR). Here, {first wireless device 100, second wireless device 200} is {wireless device 100x, base station 200} of FIG. 53 and/or {wireless device 100x, wireless device 100x)} can be matched.

The first wireless device 100 includes one or more processors 102 and one or more memories 104, and may further include one or more transceivers 106 and/or one or more antennas 108. The processor 102 controls the memory 104 and/or the transceiver 106 and may be configured to implement the descriptions, functions, procedures, suggestions, methods, and/or operational flow charts disclosed herein. For example, the processor 102 may process information in the memory 104 to generate first information/signal, and then transmit a wireless signal including the first information/signal through the transceiver 106. In addition, the processor 102 may receive the radio signal including the second information/signal through the transceiver 106, and then store the information obtained from the signal processing of the second information/signal in the memory 104. The memory 104 may be connected to the processor 102 and may store various information related to the operation of the processor 102. For example, the memory 104 may provide instructions for performing some or all of the processes controlled by the processor 102, or for performing the descriptions, functions, procedures, suggestions, methods, and/or operational flowcharts disclosed herein. may store software code. The processor 102 and the memory 104 may be part of a communication modem/circuit/chip designed to implement a wireless communication technology (e.g., LTE, NR). A transceiver 106 may be coupled to the processor 102 and may transmit and/or receive wireless signals via one or more antennas 108. The transceiver 106 may include a transmitter and/or a receiver. The transceiver 106 may be used interchangeably with a radio frequency (RF) unit. In one example or implementation, a wireless device may refer to a communication modem/circuit/chip.

The second wireless device 200 includes one or more processors 202, one or more memories 204, and may further include one or more transceivers 206 and/or one or more antennas 208. The processor 202 controls the memory 204 and/or the transceiver 206 and may be configured to implement the descriptions, functions, procedures, suggestions, methods, and/or flow charts disclosed herein. For example, the processor 202 may process the information in the memory 204 to generate third information/signal, and then transmit a wireless signal including the third information/signal through the transceiver 206. In addition, the processor 202 may receive the radio signal including the fourth information/signal through the transceiver 206, and then store information obtained from signal processing of the fourth information/signal in the memory 204. The memory 204 may be connected to the processor 202 and may store various information related to the operation of the processor 202. For example, the memory 204 may provide instructions for performing some or all of the processes controlled by the processor 202, or for performing the descriptions, functions, procedures, suggestions, methods, and/or operational flowcharts disclosed herein. may store software code. The processor 202 and the memory 204 may be part of a communication modem/circuit/chip designed to implement a wireless communication technology (e.g, LTE, NR). The transceiver 206 may be coupled to the processor 202 and may transmit and/or receive wireless signals via one or more antennas 208. Transceiver 206 may include a transmitter and/or receiver. Transceiver 206 may be used interchangeably with an RF unit. In one example or implementation, a wireless device may refer to a communication modem/circuit/chip.

Hereinafter, hardware elements of the wireless devices 100 and 200 will be described in more detail. Although not limited thereto, one or more protocol layers may be implemented by one or more processors 102, 202. For example, one or more processors 102, 202 may implement one or more layers (e.g, functional layers such as PHY, MAC, RLC, PDCP, RRC, SDAP). The one or more processors 102, 202 may be configured to process one or more Protocol Data Units (PDUs) and/or one or more Service Data Units (SDUs) according to the description, function, procedure, proposal, method and/or operational flowcharts disclosed. One or more processors 102, 202 may generate messages, control information, data, or information according to the description, function, procedure, proposal, method, and/or flow charts disclosed herein. The one or more processors 102 and 202 generate a signal (e.g., a baseband signal) including PDUs, SDUs, messages, control information, data or information according to the functions, procedures, proposals and/or methods disclosed in this document to one or more transceivers 106 and 206. One or more processors 102, 202 may receive signals (e.g, baseband signals) from one or more transceivers 106, 206, and may be described, functions, procedures, proposals, methods, and/or operational flowcharts disclosed herein. PDU, SDU, message, control information, data, or information may be acquired according to the above.

One or more processors 102, 202 may be referred to as a controller, microcontroller, microprocessor, or microcomputer. One or more processors 102, 202 may be implemented by hardware, firmware, software, or a combination thereof. For example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in one or more processors 102, 202. The descriptions, functions, procedures, suggestions, methods, and/or flowcharts of operations disclosed in this document may be implemented using firmware or software, and the firmware or software may be implemented to include modules, procedures, functions, and the like. The descriptions, functions, procedures, suggestions, methods, and/or flow charts disclosed in this document provide that firmware or software configured to perform is included in one or more processors 102, 202, or stored in one or more memories 104, 204. It may be driven by the above processors 102 and 202. The descriptions, functions, procedures, suggestions, methods, and/or flowcharts of operations disclosed herein may be implemented using firmware or software in the form of code, instructions, and/or a set of instructions.

One or more memories 104, 204 may be coupled with one or more processors 102, 202 and may store various forms of data, signals, messages, information, programs, code, instructions, and/or instructions. One or more memories 104, 204 may be comprised of ROM, RAM, EPROM, flash memory, hard drives, registers, cache memory, computer readable storage media, and/or combinations thereof. One or more memories 104, 204 may be located inside and/or external to one or more processors 102, 202. Additionally, one or more memories 104, 204 may be coupled to one or more processors 102, 202 through various technologies, such as wired or wireless connections.

One or more transceivers 106, 206 may transmit user data, control information, radio signals/channels, etc. referred to in the methods and/or operational flowcharts of this document to one or more other devices. The one or more transceivers 106, 206 may receive user data, control information, radio signals/channels, etc. referred to in the descriptions, functions, procedures, suggestions, methods and/or flow charts, etc. disclosed herein, from one or more other devices. there is. For example, one or more transceivers 106, 206 may be coupled to one or more processors 102, 202 and may transmit and receive wireless signals. For example, one or more processors 102, 202 may control one or more transceivers 106, 206 to transmit user data, control information, or wireless signals to one or more other devices. In addition, one or more processors 102, 202 may control one or more transceivers 106, 206 to receive user data, control information, or wireless signals from one or more other devices. Further, one or more transceivers 106, 206 may be coupled to one or more antennas 108, 208, and the one or more transceivers 106, 206 may be coupled via one or more antennas 108, 208 to the descriptions, functions, and functions disclosed may be set to transmit and receive user data, control information, radio signals/channels, etc. mentioned in procedures, proposals, methods and/or operation flowcharts. In this document, one or more antennas may be a plurality of physical antennas or a plurality of logical antennas (e.g, antenna ports). The one or more transceivers 106, 206 convert the received radio signal/channel, etc. from the RF band signal to process the received user data, control information, radio signal/channel, etc. using the one or more processors 102, 202. It can be converted into a baseband signal. One or more transceivers 106 and 206 may convert user data, control information, radio signals/channels, etc. processed using one or more processors 102 and 202 from baseband signals to RF band signals. To this end, one or more transceivers 106, 206 may include (analog) oscillators and/or filters.

Figure 47:
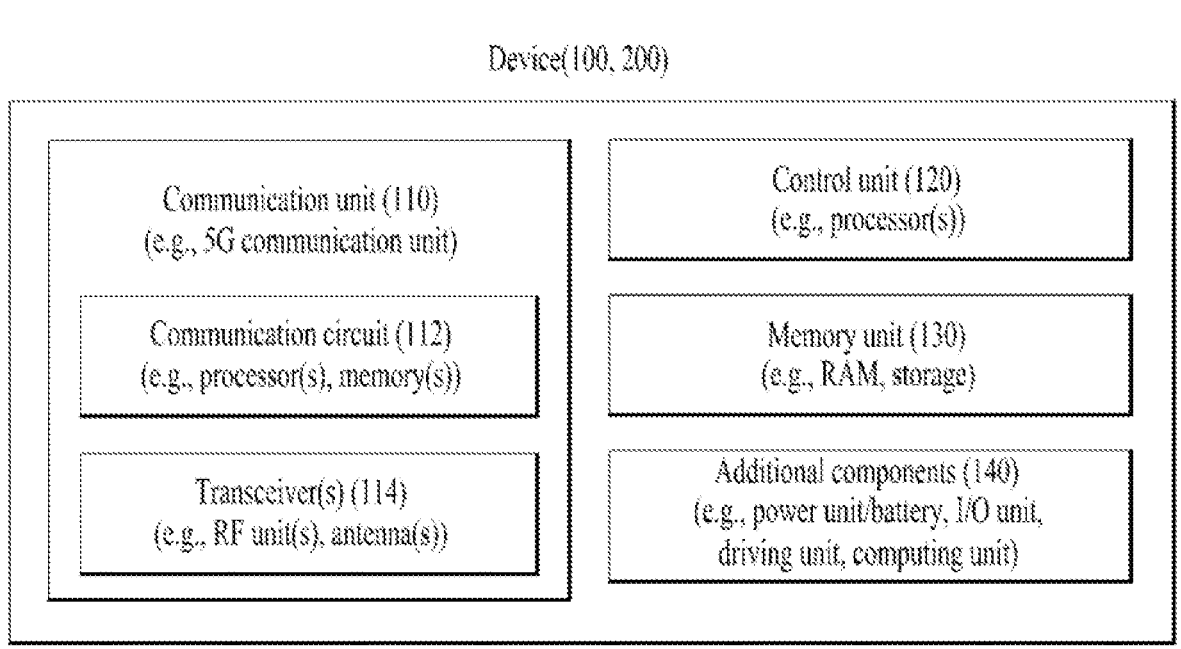

FIG. 47 shows another example of a wireless device applied to an example or implementation example. The wireless device may be implemented in various forms according to use-examples/services.

Referring to FIG. 47, wireless devices 100 and 200 correspond to wireless devices 100 and 200 of FIG. 46, and include various elements, components, units/units, and/or modules.) can be composed. The wireless devices 100 and 200 may include a communication unit 110, a control unit 120, a memory unit 130, and an additional element 140. The communication unit may include communication circuitry 112 and transceiver(s) 114. For example, communication circuitry 112 may include one or more processors 102, 202 and/or one or more memories 104, 204 of FIG. 46. For example, transceiver(s) 114 may include one or more transceivers 106, 206 and/or one or more antennas 108, 208 of FIG. 46. The control unit 120 is electrically connected to the communication unit 110, the memory unit 130, and the additional element 140, and controls general operations of the wireless device. For example, the controller 120 may control the electrical/mechanical operation of the wireless device based on the program/code/command/information stored in the memory unit 130. In addition, the control unit 120 transmits the information stored in the memory unit 130 to the outside (e.g, another communication device) through the communication unit 110 through a wireless/wired interface, or externally (e.g, through the communication unit 110) Information received through a wireless/wired interface from another communication device) may be stored in the memory unit 130.

The additional element 140 may be configured in various ways according to the type of the wireless device. For example, the additional element 140 may include at least one of a power unit/battery, an input/output unit (I/O unit), a driving unit, and a computing unit. Although not limited thereto, wireless devices include, but are not limited to, robots (FIG. 53 and 100*a*), vehicles (FIG. 53, 100*b*-1 and 100*b*-2), XR devices (FIG. 53 and 100*c*), mobile devices (FIG. 53 and 100*d*), and home appliances. (FIG. 53, 100*e*), IoT device (FIG. 53, 100*f*), digital broadcasting terminal, hologram device, public safety device, MTC device, medical device, fintech device (or financial device), security device, climate/environment device, It may be implemented in the form of an AI server/device (FIG. 53 and 400), a base station (FIG. 53 and 200), and a network node. The wireless device may be mobile or used in a fixed location depending on the use-example/service.

In FIG. 47, various elements, components, units/units, and/or modules in the wireless devices 100 and 200 may be entirely interconnected through a wired interface, or at least some of them may be wirelessly connected through the communication unit 110. For example, in the wireless devices 100 and 200, the control unit 120 and the communication unit 110 are connected by wire, and the control unit 120 and the first unit (eg, 130, 140) are connected to the communication unit 110 through the communication unit 110. It can be connected wirelessly. In addition, each element, component, unit/unit, and/or module within the wireless device 100, 200 may further include one or more elements. For example, the controller 120 may be configured with one or more processor sets. For example, the control unit 120 may be configured as a set of a communication control processor, an application processor, an electronic control unit (ECU), a graphic processing processor, a memory control processor, and the like. As another example, the memory unit 130 may include random access memory (RAM), dynamic RAM (DRAM), read only memory (ROM), flash memory, volatile memory, and non-volatile memory. volatile memory) and/or a combination thereof.

Figure 48:
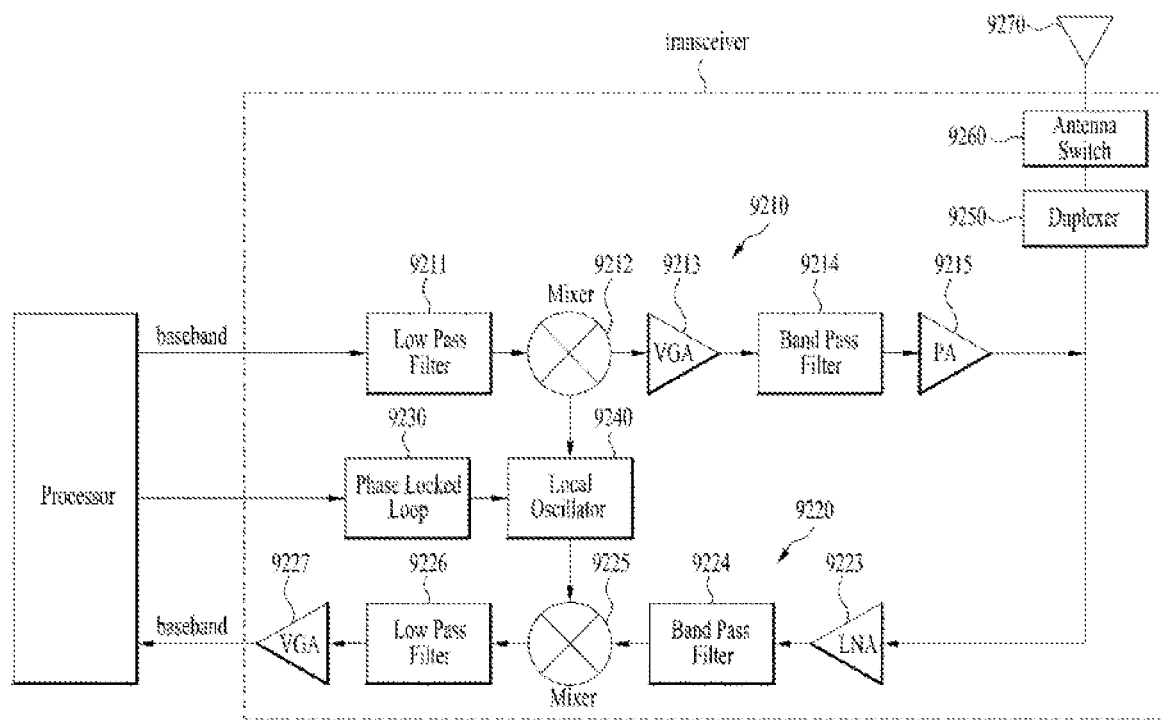
FIG. 48 to 49 disclose a transceiver of a wireless communication device according to an example or implementation.

FIG. 48 illustrates a transceiver of a wireless communication device according to an embodiment. For example, FIG. 48 may illustrate an example of a transceiver that may be implemented in a frequency division duplex (FDD) system.

On a transmission path, at least one processor, such as the processor described with reference to FIGS. 46 and 47, may process data to be transmitted and transmit a signal such as an analog output signal to a transmitter 9210.

In the above example, in the transmitter 9210, the analog output signal may be filtered by a low-pass filter (LPF) 9211 in order to eliminate noise caused by, for example, previous digital-to-analog conversion (ADC), up-converted into an RF signal from a baseband signal by an up-converter (e.g., a mixer) 9212, and then amplified by an amplifier such as a variable gain amplifier (VGA) 9213. The amplified signal may be filtered by a filter 9214, amplified by a power amplifier (PA) 9215, routed by a duplexer 9250/antenna switches 9260, and then transmitted through an antenna 9270.

On a reception path, the antenna 9270 may receive a signal in a wireless environment. The received signal may be routed by the antenna switches 9260/duplexer 9250 and then transmitted to a receiver 9220.

In the above example, in the receiver 9220, the received signal may be amplified by an amplifier such as a low-noise amplifier (LNA) 9223, filtered by a band-pass filter (BPF) 9224, and then down-converted into the baseband signal from the RF signal by a down-converter (e.g., a mixer) 9225.

The down-converted signal may be filtered by an LPF 9226 and amplified by an amplifier such as a VGA 9227 in order to obtain an analog input signal. The analog input signal may be provided to one or more processors.

Furthermore, a local oscillator (LO) 9240 may generate an LO signal for transmission and reception and transmit the LO signal to the up-converter 9212 and the down-converter 9224.

In some implementations, a phase-locked loop (PLL) 9230 may receive control information from the processor and transmit control signals to the LO 9240 so that the LO 9240 may generate LO signals for transmission and reception at an appropriate frequency.

Implementations are not limited to a specific arrangement illustrated in FIG. 48 and various components and circuits may be arranged differently from the example illustrated in FIG. 48.

Figure 49:
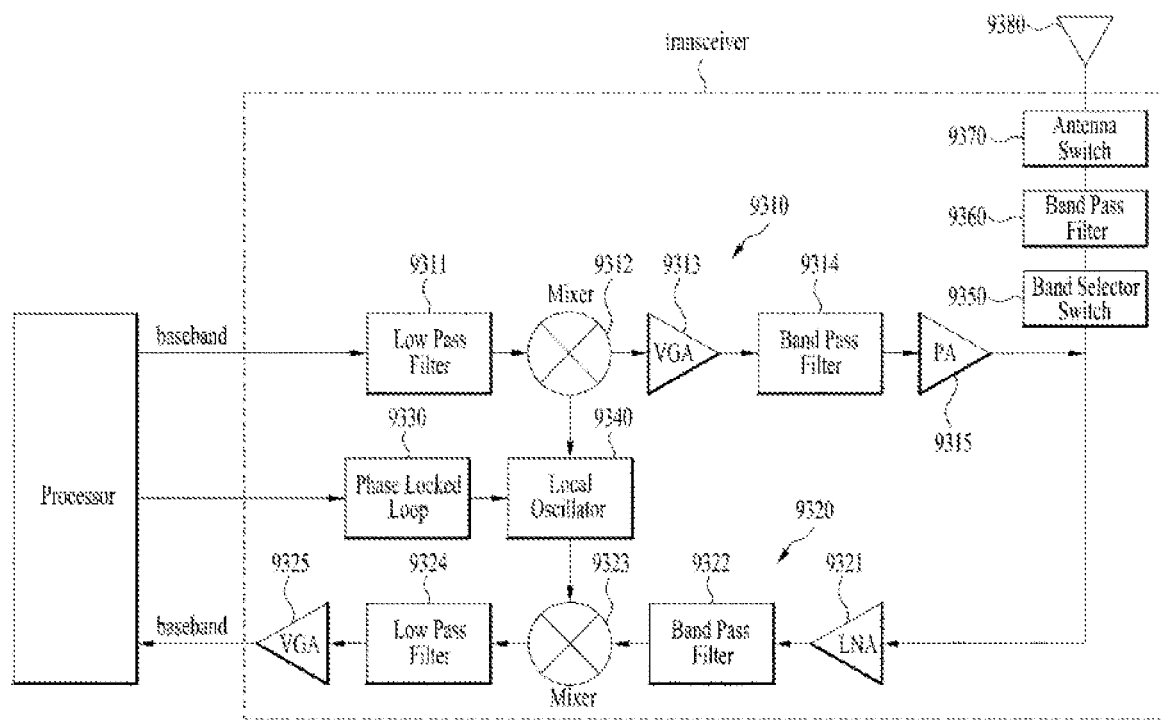

FIG. 49 illustrates a transceiver of a wireless communication device according to an embodiment. For example, FIG. 49 may illustrate an example of a transceiver that may be implemented in a time division duplex (TDD) system.

In some implementations, a transmitter 9310 and a receiver 9320 of the transceiver of the TDD system may have one or more features similar to the transmitter and receiver of the transceiver of the FDD system. Hereinafter, the structure of the transceiver of the TDD system will be described.

On a transmission path, a signal amplified by a PA 9315 of the transmitter may be routed through a band select switch 9350, a BPF 9360, and antenna switch(s) 9370 and then transmitted through an antenna 9380.

On a reception path, the antenna 9380 receives a signal in a wireless environment. The received signal may be routed through the antenna switch(s) 9370, the BPF 9360, and the band select switch 9350 and then provided to the receiver 9320.

Figure 50:
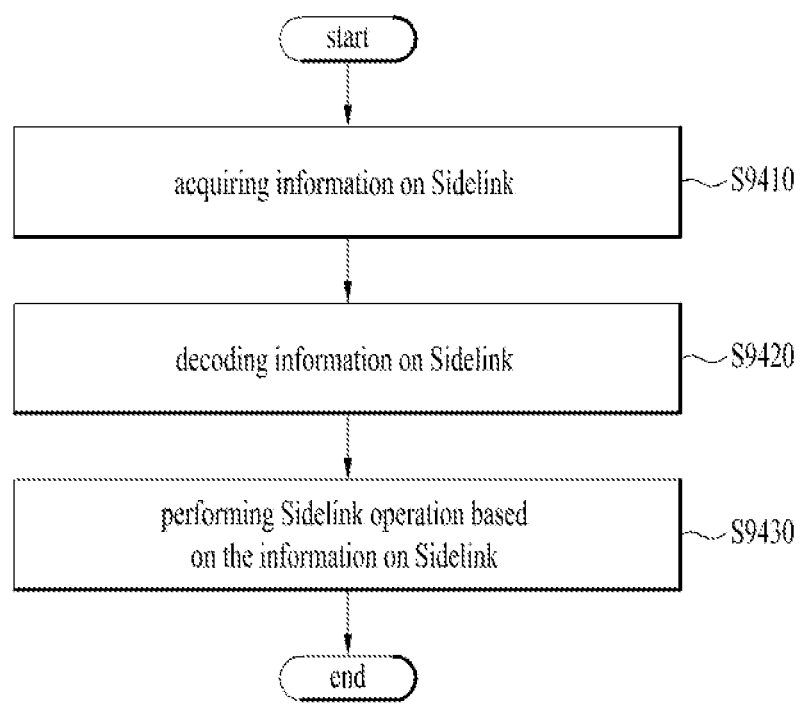
FIG. 50 discloses an operation of a wireless device related to sidelink communication according to an example or implementation.

FIG. 50 illustrates an operation of a wireless device related to sidelink communication, according to an embodiment. The operation of the wireless device related to sidelink described in FIG. 50 is purely exemplary and sidelink operations using various techniques may be performed by the wireless device. Sidelink may be a UE-to-UE interface for sidelink communication and/or sidelink discovery. Sidelink may correspond to a PC5 interface. In a broad sense, a sidelink operation may be transmission and reception of information between UEs. Sidelink may carry various types of information.

Referring to FIG. 50, in step S9410, the wireless device may acquire information related to sidelink. The information related to sidelink may be one or more resource configurations. The information related to sidelink may be obtained from other wireless devices or network nodes.

After acquiring the information related to sidelink, the wireless device may decode the information related to the sidelink in step S9420.

After decoding the information related to the sidelink, the wireless device may perform one or more sidelink operations based on the information related to the sidelink in step S9430. The sidelink operation(s) performed by the wireless device may include the one or more operations described in the present specification.

Figure 51:
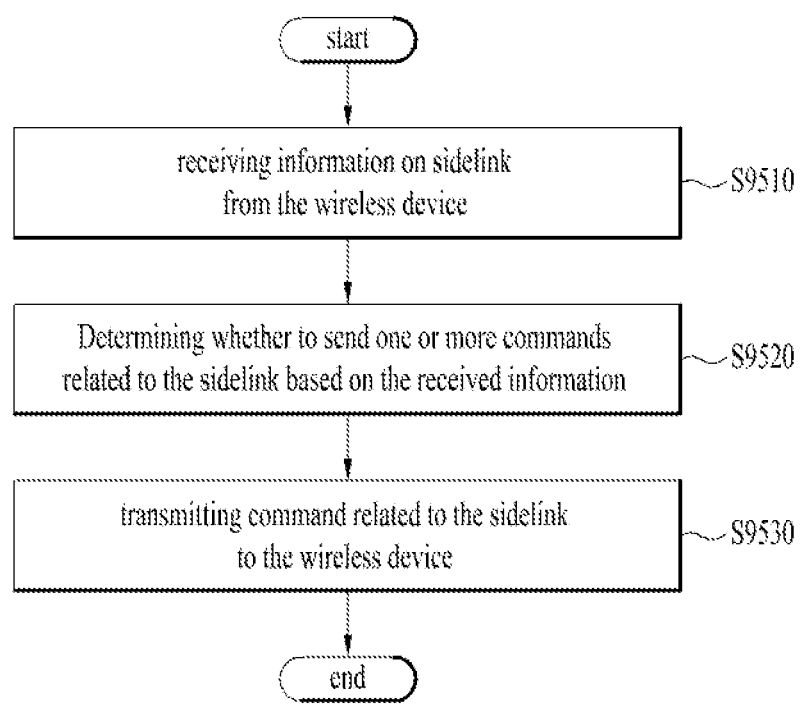
FIG. 51 discloses an operation of a network node related to a sidelink according to an example or implementation.

FIG. 51 illustrates an operation of a network node related to sidelink according to an embodiment. The operation of the network node related to sidelink described in FIG. 51 is purely exemplary and sidelink operations using various techniques may be performed by the network node.

Referring to FIG. 51, in step S9510, the network node may receive information about sidelink from a wireless device. For example, the information about sidelink may be sidelink UE information used to inform the network node of sidelink information.

After receiving the information, in step S9520, the network node may determine whether to transmit one or more commands related to sidelink based on the received information.

According to the determination of the network node to transmit the command(s), the network node may transmit the command(s) related to sidelink to the wireless device in step S9530. In some implementations, after receiving the command(s) transmitted by the network node, the wireless device may perform one or more sidelink operations based on the received command(s).

Figure 52:
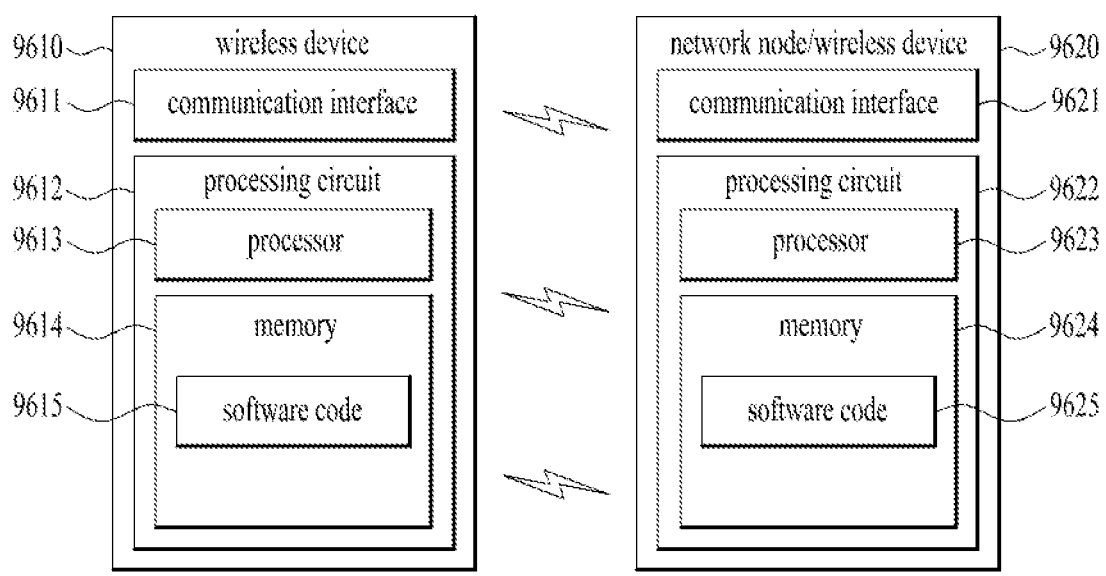
FIG. 52 discloses an implementation of a wireless device and a network node according to an example or implementation.

FIG. 52 illustrates implementation of a wireless device and a network node according to one embodiment. The network node may be replaced with a wireless device or a UE.

Referring to FIG. 52, a wireless device 9610 may include a communication interface 9611 to communicate with one or more other wireless devices, network nodes, and/or other elements in a network. The communication interface 9611 may include one or more transmitters, one or more receivers, and/or one or more communication interfaces. The wireless device 9610 may include a processing circuit 9612. The processing circuit 9612 may include one or more processors such as a processor 9613, and one or more memories such as a memory 9614.

The processing circuit 9612 may be configured to control the arbitrary methods and/or processes described in the present specification and/or to allow, for example, the wireless device 9610 to perform such methods and/or processes.

The processor 9613 may correspond to one or more processors for performing the wireless device functions described in the present specification. The wireless device 9610 may include the memory 9614 configured to store data, program software code, and/or other information described in the present specification.

In some implementations, the memory 9614 may be configured to store software code 9615 including instructions for causing the processor 9613 to perform a part or all of the above-described processes according to the present disclosure when one or more processors, such as the processor 9613, are executed.

For example, one or more processors, such as the processor 9613, that control one or more transceivers, such as a transceiver 2223, for transmitting and receiving information may perform one or more processes related to transmission and reception of information.

A network node 9620 may include a communication interface 9621 to communicate with one or more other network nodes, wireless devices, and/or other elements on a network. Here, the communication interface 9621 may include one or more transmitters, one or more receivers, and/or one or more communication interfaces. The network node 9620 may include a processing circuit 9622. Here, the processing circuit 9622 may include a processor 9623 and a memory 9624.

In some implementations, the memory 9624 may be configured to store software code 9625 including instructions for causing the processor 9623 to perform a part or all of the above-described processes according to the present disclosure when one or more processors, such as the processor 9623, are executed.

For example, one or more processors, such as processor 9623, that control one or more transceivers, such as a transceiver 2213, for transmitting and receiving information may perform one or more processes related to transmission and reception of information.

Figure 53:
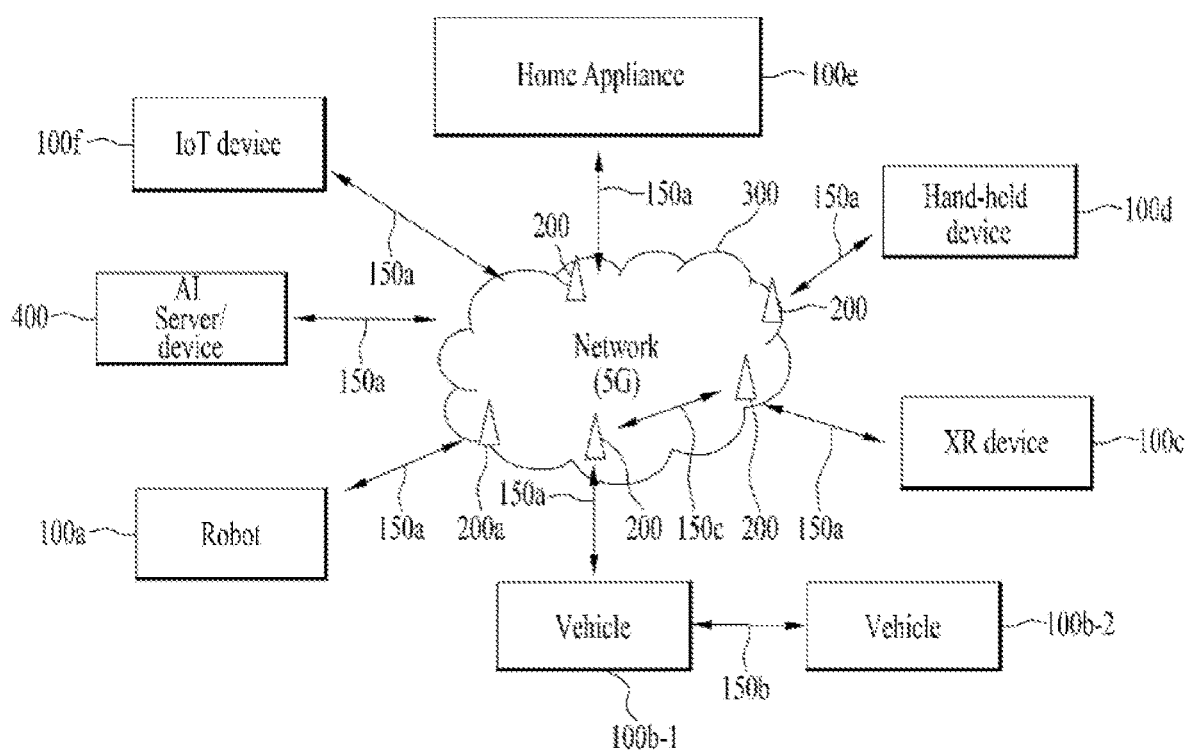
FIG. 53 discloses a communication system according to an example or implementation.

FIG. 53 illustrates a communication system applied to an example or implementation.

Referring to FIG. 53, a communication system 1 applied to an example or implementation includes a wireless device, a base station, and a network. Here, the wireless device means a device that performs communication using a wireless access technology (e.g, 5G NR (New RAT), LTE (Long Term Evolution)), and may be referred to as a communication/wireless/5G device. Although not limited thereto, the wireless device includes a robot 100*a*, a vehicle 100*b*-1, 100*b*-2, an eXtended Reality (XR) device 100*c*, a hand-held device 100*d*, and a home appliance 100*e*), an Internet of Thing (IoT) device 100*f*, and an AI device/server 400. For example, the vehicle may include a vehicle equipped with a wireless communication function, an autonomous driving vehicle, a vehicle capable of performing inter-vehicle communication, and the like. Here, the vehicle may include an Unmanned Aerial Vehicle (UAV) (e.g, a drone). XR devices include AR (Augmented Reality)/VR (Virtual Reality)/MR (Mixed Reality) devices, and include a Head-Mounted Device (HIVID), a Head-Up Display (HUD) provided in a vehicle, a television, a smartphone, It may be implemented in the form of a computer, a wearable device, a home appliance, a digital signage, a vehicle, a robot, and the like. The portable device may include a smart phone, a smart pad, a wearable device (e.g, a smart watch, smart glasses), a computer (e.g, a laptop computer), and the like. Home appliances may include a TV, a refrigerator, a washing machine, and the like. The IoT device may include a sensor, a smart meter, and the like. For example, the base station and the network may be implemented as a wireless device, and the specific wireless device 200*a* may operate as a base station/network node to other wireless devices.

The wireless devices 100*a* to 100*f* may be connected to the network 300 through the base station 200. Artificial intelligence (AI) technology may be applied to the wireless devices 100*a* to 100*f*, and the wireless devices 100*a* to 100*f* may be connected to the AI server 400 through the network 300. The network 300 may be configured using a 3G network, a 4G (e.g., LTE) network, or a 5G (e.g., NR) network. The wireless devices 100*a* to 100*f* may communicate with each other through the base station 200/network 300, but may also communicate directly (e.g. sidelink communication) without passing through the base station/network. For example, the vehicles 100*b*-1 and 100*b*-2 may perform direct communication (e.g., Vehicle to Vehicle (V2V)/Vehicle to everything (V2X) communication). In addition, the IoT device (e.g, sensor) may directly communicate with other IoT devices (e.g, sensor) or other wireless devices 100*a* to 100*f*.

Wireless communication/connection 150*a*, 150*b*, and 150*c* may be performed between the wireless devices 100*a* to 100*f*/base station 200 and the base station 200/base station 200. Here, the wireless communication/connection includes uplink/downlink communication 150*a* and sidelink communication 150*b* (or D2D communication), and communication between base stations 150*c* (eg relay, IAB (Integrated Access Backhaul)). This can be done through technology (eg 5G NR) Wireless communication/connection 50*a*, 150*b*, 150*c* allows the wireless device and the base station/radio device, and the base station and the base station to transmit/receive wireless signals to each other. To this end, based on various proposals of an example or implementation example, various configuration information setting processes for wireless signal transmission/reception, various signal processing processes (eg, channel encoding/decoding, modulation/demodulation, resource mapping/demapping, etc.), a resource allocation process, etc. may be performed.

The aforementioned implementations are achieved by combinations of structural elements and features in various manners. Each of the structural elements or features may be considered selective unless specified otherwise. Each of the structural elements or features may be carried out without being combined with other structural elements or features. In addition, some structural elements and/or features may be combined with one another to constitute implementations. Operation orders described in implementations may be rearranged. Some structural elements or features of one implementation may be included in another embodiment or may be replaced with corresponding structural elements or features of another implementation.

The implementations of the present disclosure may be embodied through various techniques, for example, hardware, firmware, software, or combinations thereof. In a hardware configuration, a method according to the implementations may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), one or more processors, one or more controllers, one or more microcontrollers, one or more microprocessors, etc.

In a firmware or software configuration, the implementations may be embodied as a module, a procedure, or a function. Software code may be stored in a memory and executed by a processor. The memory is located at the interior or exterior of the processor and may transmit and receive data to and from the processor by various methods.

It is apparent that ordinary persons skilled in the art may perform various modifications and variations that can be made in the present disclosure without departing from the spirit or scope of the disclosure. While the present disclosure has been described with reference to an example applied to a 3GPP LTE/LTE-A system or a 5G system (or NR system), the present disclosure is applicable to various other wireless communication systems.

What is claimed is:

1. A method of performed by a user equipment (UE) in a wireless communication system, the method comprising:
    receiving, from a network, information related to synchronization;
    obtaining the synchronization based on the information related to the synchronization;
    receiving, from the network, a first message including first information related to a geographic area and second information related to a configuration of the UE from a network;
    outputting a warning message based on comparison a position of the UE and the geographic area; and
    transmitting, to another UE, a second message for safety of the UE based on the second information,
    wherein the second information includes information related to a generation interval of the second message determined by the network.

2. The method of claim 1, wherein the first information includes a value related to a type or a size of the geographic area.

3. The method of claim 1, wherein the first message includes a field related to a wakeup setting of the UE, and
    wherein the UE maintains a wakeup state for a predetermined time in the geographic area, based on the field related to the wakeup setting.

4. The method of claim 1, wherein the first message includes a field that requests a moving path of the UE, and
    wherein the second message includes the includes a position of the UE within the geographic area, the moving path for a predetermined time or an expected moving path after the predetermined time.

5. The method of claim 1, wherein the UE is a terminal of a vulnerable road user(VRU), the first message is a VRU Safety Message (VSM) and the second message is a personal safety message (PSM), and
    wherein the PSM includes a mandate field and an optional field, the optional field is included in the PSM based on information of the UE.

6. A method performed by a network in a wireless communication system, the method comprising:
    transmitting, to a user equipment (UE), information related to synchronization;
    receiving traffic information in a preset geographic area from a server; and
    transmitting, based on the traffic information, a first message including first information related to the geographic area and second information related to a configuration of the UE,
    wherein the first message is determined based on comparison a position of the UE and the geographic area,
    wherein the second information includes information related to a generation interval of a second message determined by the network,
    wherein the second message includes information related to safety of the UE, and
    wherein the second message is generated by the UE and transmitted to another UE based on the second information.

7. The method of claim 6, wherein the first message includes the field defining the geographic area, and
    wherein the first information includes a value related to a type or a size of the geographic area.

8. The method of claim 6, wherein the first message includes a field related to a wakeup setting of the UE, and
    wherein the field related to the wakeup setting indicates that the UE will maintain a wakeup state for a predetermined time in the geographic area.

9. The method of claim 6, wherein the first message includes a field that requests a moving path of the UE, and
    wherein the second message includes the position of the UE within the geographic area, the moving path for a predetermined time or an expected moving path after the predetermined time.

10. The method of claim 6, wherein the UE is a terminal of a vulnerable road user(VRU), wherein the first message is a VRU Safety Message (VSM) and the second message is a personal safety message (PSM), and
    wherein the PSM includes a mandate field and an optional field, the optional field is included in the PSM based on information of the UE.

11. A user equipment (UE) in a wireless communication system, the UE comprising:
    a transceiver; and
    a processor coupled with the transceiver,
    wherein the processor is configured to:
    receive, from a network, information related to synchronization;
    obtain the synchronization based on the information related to the synchronization;
    receive, from the network, a first message including first information related to a geographic area and second information related to a configuration of the UE from a network; and
    output a warning message based on comparison a position of the UE and the geographic area, and
    transmit, to another UE, a second message for safety of the UE based on the second information,
    wherein the second information includes information related to a generation interval of the second message determined by the network.

12. The UE of claim 11, wherein the first information includes a value related to a type or a size of the geographic area.

13. The UE of claim 11, wherein the first message includes a field related to a wakeup setting of the UE, and
    wherein the processor is further configured to maintain a wakeup state for a predetermined time in the geographic area, based on the field related to the wakeup setting.

14. The UE of claim 11, wherein the first message includes a field that requests a moving path of the UE, and
    wherein the second message includes the position of the UE within the geographic area, the moving path for a predetermined time or an expected moving path after the predetermined time, based on the field that requests the moving path.

15. The UE of claim 11, wherein the first message is a VRU Safety Message (VSM) and the second message is a personal safety message (PSM), and
    wherein the PSM includes a mandate field and an optional field, the optional field is included in the PSM based on information of the VRU.

16. A network in a wireless communication system, the network comprising:
- a transceiver; and
- a processor coupled with the transceiver,
- wherein the processor is configured to:
- receive, from a server, traffic information in a preset geographic area through the transceiver; and
- transmit, to a user equipment (UE), information related to synchronization;
- receive traffic information in a preset geographic area from a server; and
- transmit, based on the traffic information, a first message including first information related to the geographic area and second information related to a configuration of the UE,
- wherein the first message is determined based on comparison a position of the UE and the geographic area,
- wherein the second information includes information related to a generation interval of a second message determined by the network,
- wherein the second message includes information related to safety of the UE, and
- wherein the second message is generated by the UE and transmitted to another UE based on the second information.

17. The network of claim 16, wherein the first information includes a value related to a type or a size of the geographic area.

18. The network of claim 16, wherein the first message includes a field related to a wakeup setting of the UE, and
- wherein the field related to the wakeup setting indicates that the UE will maintain a wakeup state for a predetermined time in the geographic area.

19. The network of claim 16, wherein the first message includes a field that requests a moving path of the UE, and
- wherein the second message includes the position of the UE within the geographic area, the moving path for a predetermined time or an expected moving path after the predetermined time.

20. The network of claim 16, wherein the first message is a VRU Safety Message (VSM) and the second message is a personal safety message (PSM), and
- wherein the PSM includes a mandate field and an optional field, the optional field is included in the PSM based on information of the VRU.

* * * * *